United States Patent [19]

Brown, Jr. et al.

[11] Patent Number: 5,761,083

[45] Date of Patent: *Jun. 2, 1998

[54] ENERGY MANAGEMENT AND HOME AUTOMATION SYSTEM

[76] Inventors: Robert J. Brown, Jr., Suite 29F, 529 S. Flagler Dr., West Palm Beach, Fla. 33401; James D. Romanowiz, 2919 Banyan Rd., Boca Raton, Fla. 33432

[*] Notice: The term of this patent shall not extend beyond the expiration date of Pat. No. 5,544,036.

[21] Appl. No.: 633,677

[22] Filed: Apr. 17, 1996

Related U.S. Application Data

[63] Continuation-in-part of Ser. No. 185,285, Jan. 24, 1994, abandoned, Ser. No. 857,312, Mar. 25, 1992, Pat. No. 5,544,036, and Ser. No. 857,393, Mar. 25, 1992.

[51] Int. Cl.$^6$ .............. G05B 11/01; G05B 23/02
[52] U.S. Cl. .......... 364/492; 364/145; 364/492; 364/493; 364/505; 340/825.06; 340/825.69
[58] Field of Search .................. 364/140, 141, 364/143, 145, 480, 481, 483, 492, 493, 556, 557; 307/11, 38–39, 31, 35, 41; 340/286.01, 310.01, 825.44, 825.47, 825.52; 236/46 R, 51

[56] References Cited

U.S. PATENT DOCUMENTS

| | | | |
|---|---|---|---|
| 2,263,473 | 11/1941 | Rogers | 126/340 |
| 3,656,112 | 4/1972 | Paull | |
| 3,896,871 | 7/1975 | Pecoraro ce al. | |
| 3,900,842 | 8/1975 | Calabro et al. | |
| 4,058,253 | 11/1977 | Munk et al. | 236/46 R |
| 4,153,936 | 5/1979 | Schmitz et al. | |
| 4,153,945 | 5/1979 | Actor et al. | |

(List continued on next page.)

Primary Examiner—James P. Trammell
Assistant Examiner—Cuong H. Nguyen
Attorney, Agent, or Firm—Richard C. Litman

[57] ABSTRACT

An energy management and home automation system includes one or more controllers in each facility being managed and one or more energy consuming devices attached to each controller. Each controller responds to digital paging signals from a central command center which establish a schedule of event effecting the operation of each device and the controller schedules each device to be operated pursuant to the programmed schedule. The user of the system, by appropriate communication with the command center, may cause a paging message to be provided at any time changing the pre-programmed schedule. The heating/cooling system is controlled by set-point temperatures, for each of a plurality of different modes of occupancy, whereby the most energy is consumed when the facility is occupied and lesser amounts of energy are consumed when the facility is empty. Intermediate amounts of energy are consumed when the facility is not fully operational because people are asleep or maintenance or cleaning is being done. Prior to a mode change which demands more energy, the controller calculates the time required to bring the facility to the set-points for the new mode and operates the heating/cooling unit at the calculated time prior to the scheduled mode change. The calculation is based upon the time required for the heating/cooling being controlled to change the temperature in the facility being managed. The energy consumption of the facility may also be reduced by paging messages from the utility company as a part of an emergency load reduction program.

19 Claims, 11 Drawing Sheets

U.S. PATENT DOCUMENTS

| | | | |
|---|---|---|---|
| 4,173,754 | 11/1979 | Feiker . | |
| 4,200,910 | 4/1980 | Hall | 364/505 |
| 4,213,182 | 7/1980 | Eichelberger et al. . | |
| 4,217,646 | 8/1980 | Caltagirone et al. . | |
| 4,264,034 | 4/1981 | Hyltin et al. | 236/46 R |
| 4,264,960 | 4/1981 | Gurr | 374/492 |
| 4,298,946 | 11/1981 | Hartsell et al. | 364/557 |
| 4,362,270 | 12/1982 | Cleary et al. | 236/46 R |
| 4,375,637 | 3/1983 | Desjardins . | |
| 4,386,649 | 6/1983 | Hines et al. . | |
| 4,454,509 | 6/1984 | Buennagel et al. | 340/825.69 |
| 4,530,008 | 7/1985 | McVoy . | |
| 4,567,557 | 1/1986 | Burns . | |
| 4,632,177 | 12/1986 | Beckey . | |
| 4,837,731 | 6/1989 | Levine et al. | 364/145 |
| 4,847,781 | 7/1989 | Brown, III et al. | 364/492 |
| 4,898,230 | 2/1990 | Tsuchiyama et al. . | |
| 4,918,615 | 4/1990 | Suzuki et al. | 364/505 |
| 4,967,382 | 10/1990 | Hall | 364/557 |
| 5,119,412 | 6/1992 | Attallah . | |
| 5,168,170 | 12/1992 | Hartig | 307/35 |
| 5,181,653 | 1/1993 | Foster et al. | 236/49.3 |
| 5,544,036 | 8/1996 | Brown, Jr. et al. . | |

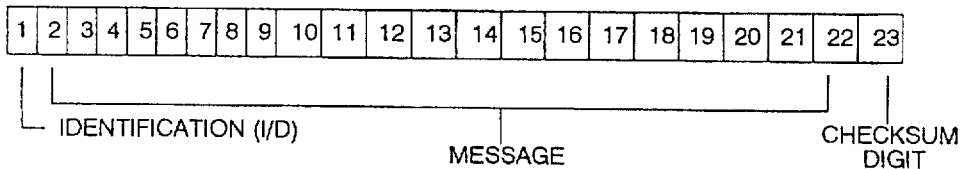
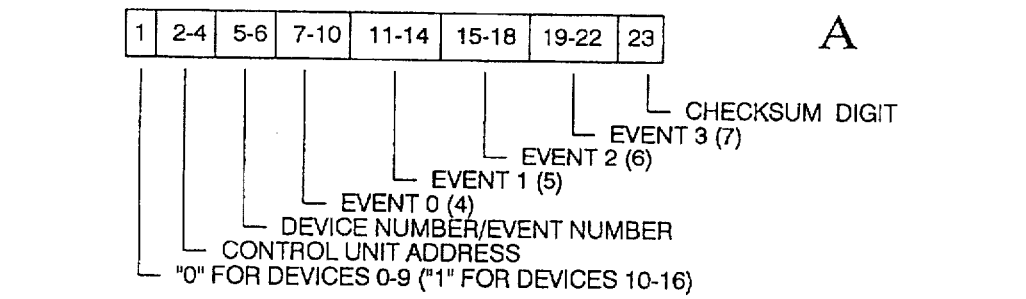
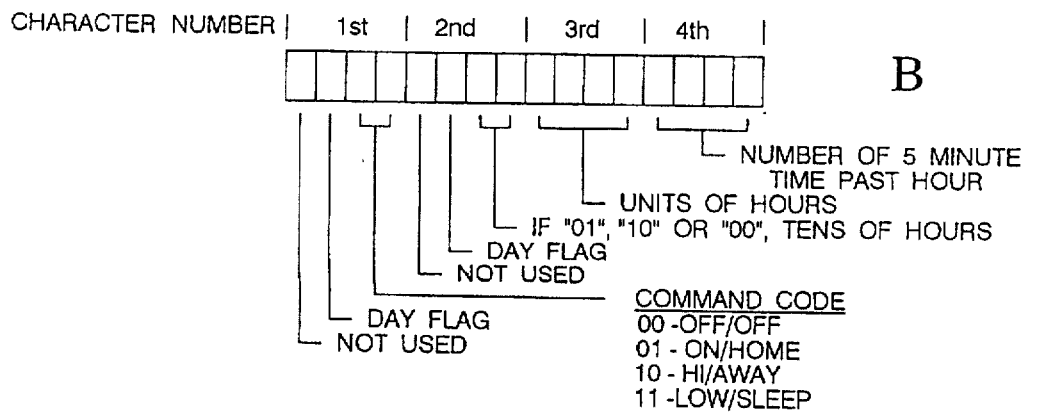
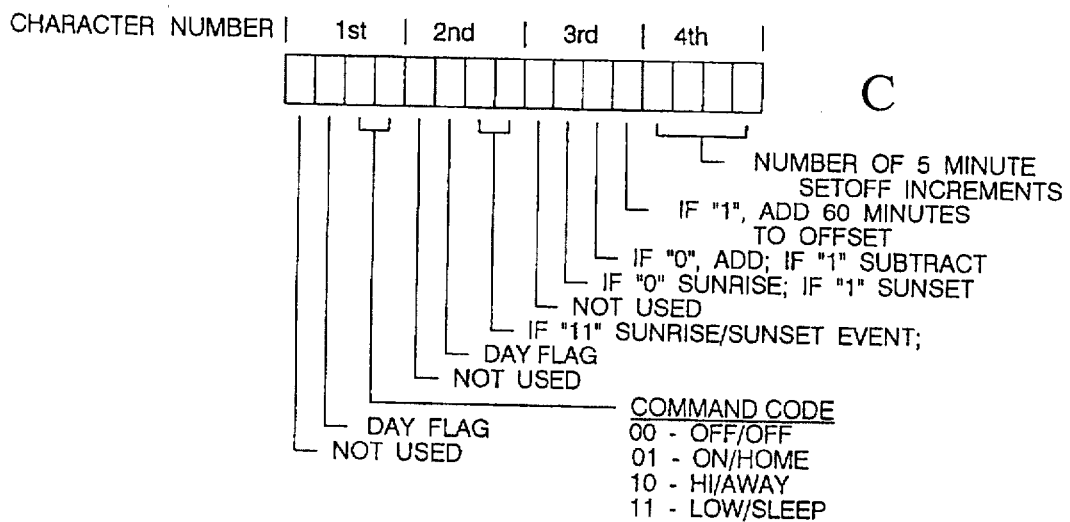
FIGURE 6

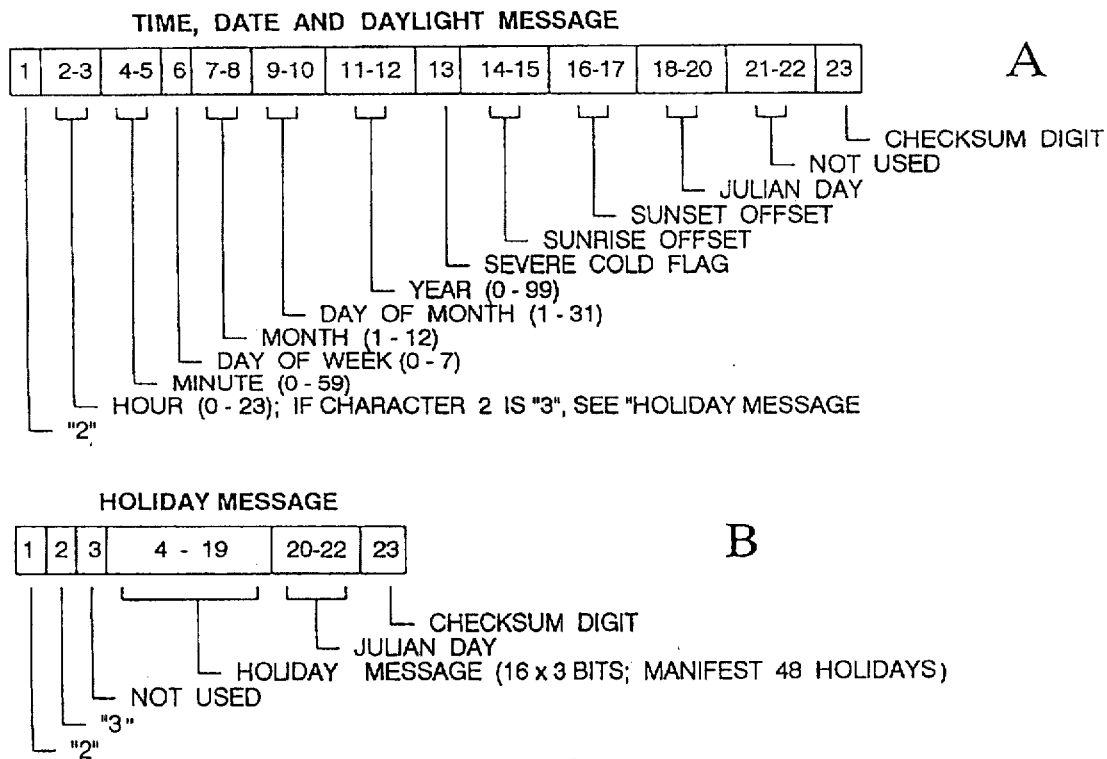
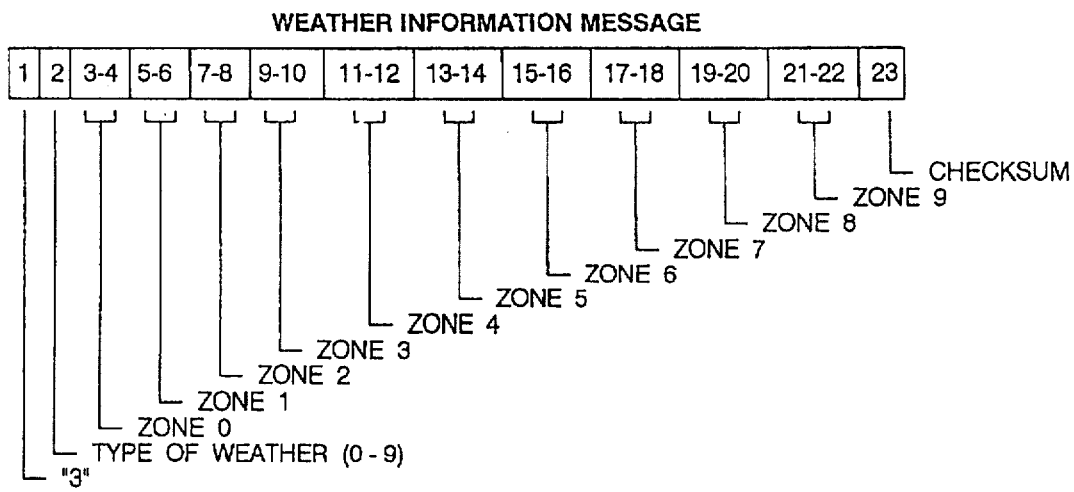
FIGURE 8

SYSTEM PARAMETER MESSAGE
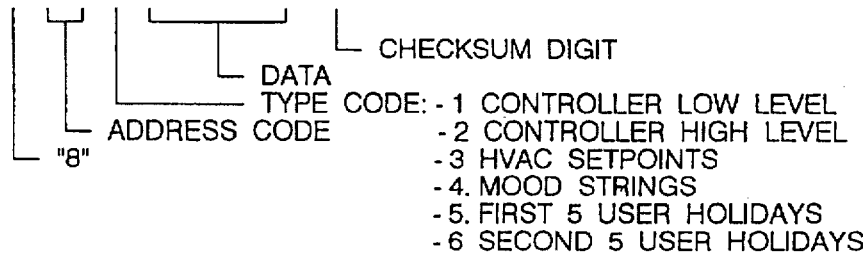
TYPE 1 AND 2 CONTROL LEVEL DATA
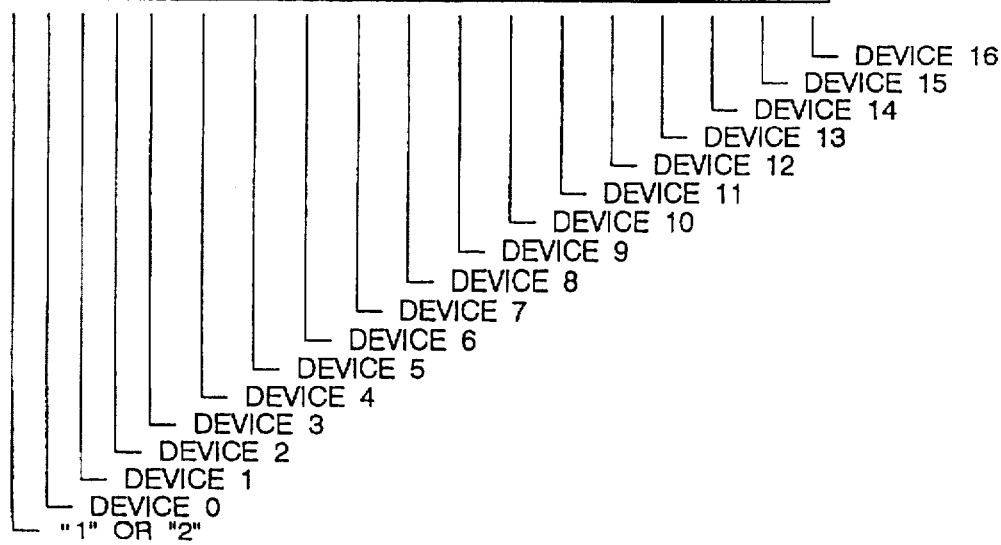
TYPE 3 - HVAC SETPOINT DATA
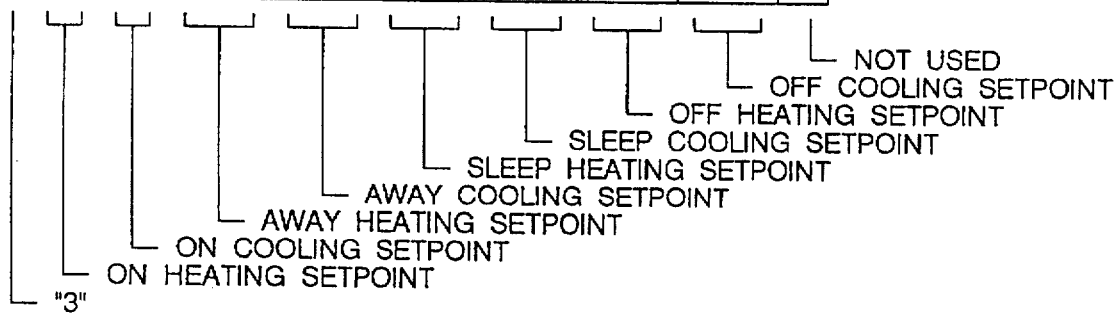
FIGURE 13A

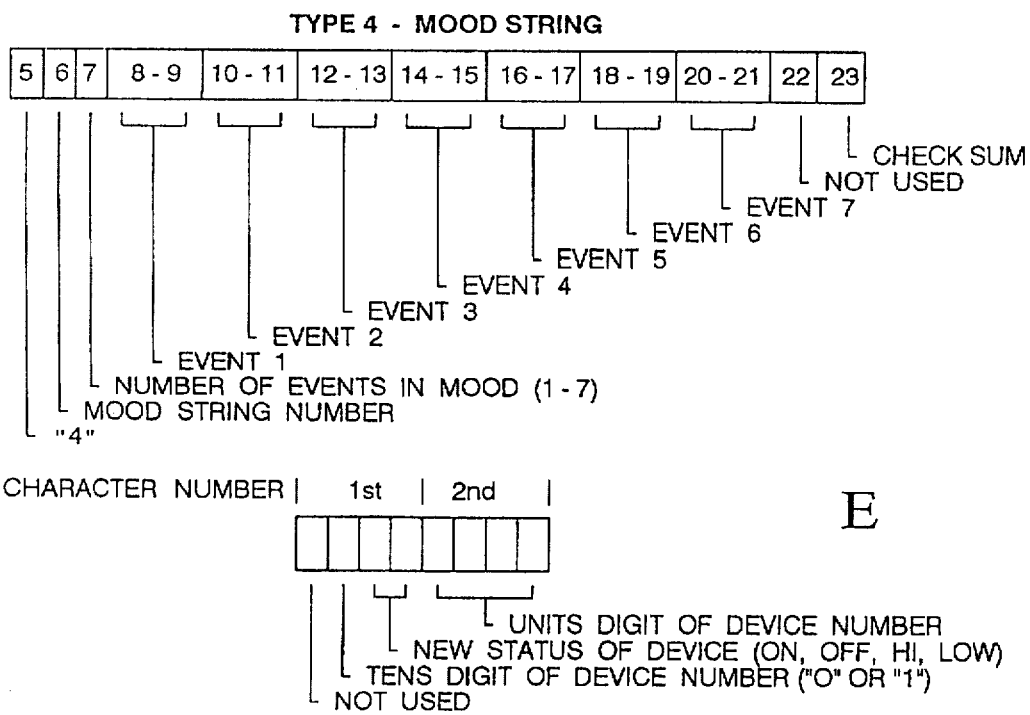
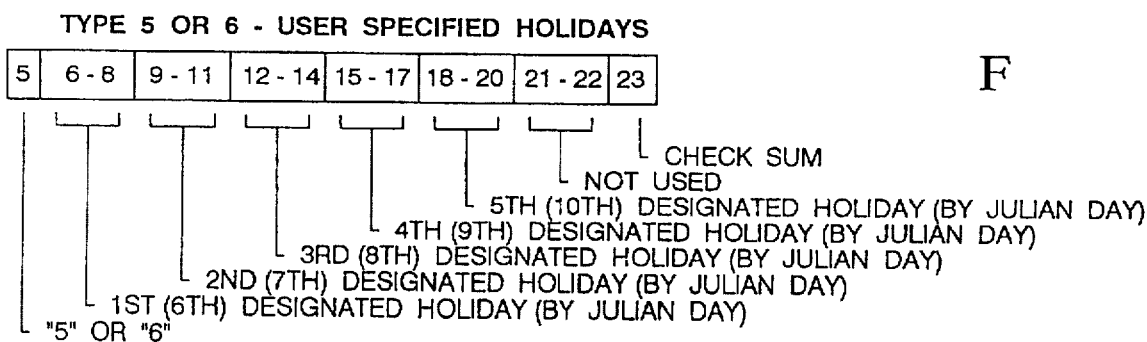
FIGURE 13B
FIGURE 14

| | | SLEEP TIMES | | | | | | | |
|---|---|---|---|---|---|---|---|---|---|
| | | 10:00PM 5:00AM | 11:00PM 5:00AM | 10:00PM 6:00AM | 11:00PM 6:00AM | 10:00PM 7:00AM | 11:00PM 7:00AM | 12:00AM 7:00AM | 12:00AM 8:00AM |
| | ALWAYS HOME | 001 | 020 | 038 | 052 | 066 | 076 | 086 | 096 |
| U N O C C U P I E D | 6:00AM to 4:00PM | 003 | 022 | | | | | | |
| | 6:00AM to 5:00PM | 005 | 024 | | | | | | |
| | 7:00AM to 3:00PM | 007 | 026 | 040 | 054 | | | | |
| | 7:00AM to 5:00PM | 009 | 028 | 042 | 056 | | | | |
| | 8:00AM to 5:00PM | 011 | 030 | 044 | 058 | 068 | 078 | 088 | |
| | 8:00AM to 6:00PM | 013 | 032 | 046 | 060 | 070 | 080 | 090 | |
| | 9:00AM to 5:00PM | 016 | 034 | 048 | 062 | 072 | 082 | 092 | 098 |
| | 9:00AM to 6:00PM | 018 | 036 | 050 | 064 | 074 | 084 | 094 | 100 |

FIGURE 15A

| | | MORNINGS | | | | | | |
|---|---|---|---|---|---|---|---|---|
| | | ALWAYS ON | NONE | 4:00AM TO 8:00AM | 4:00AM TO 8:00AM / 11:00AM TO 1:00PM | 6:00AM TO 9:00AM | 6:00AM TO 9:00AM / 11:00AM TO 1:00PM | 7:00AM TO 10:00AM | 7:00AM TO 10:00AM / 12:00PM TO 2:00PM |
| ALWAYS ON | | 000 | | | | | | | |
| E V E N I N G S | NONE | | 128 | 129 | 130 | 131 | 132 | 133 | 134 |
| | 3:00PM TO 7:00PM | | 135 | 136 | 137 | 138 | 139 | 140 | 141 |
| | 4:00PM TO 9:00PM | | 142 | 143 | 144 | 145 | 146 | 147 | 148 |
| | 5:00PM TO 10:00PM | | 149 | 150 | 151 | 152 | 153 | 154 | 155 |
| | 6:00PM TO 11:00PM | | 156 | 157 | 158 | 159 | 160 | 161 | 162 |

ENERGY MANAGEMENT AND HOME AUTOMATION SYSTEM

REFERENCE TO RELATED APPLICATIONS

This application is a Continuation-in-Part of Ser. No. 08/185,285, filed Jan. 24, 1992; Ser. No. 07/857,312, filed Mar. 25, 1992; and Ser. No. 07/857,393, filed Mar. 25, 1992.

BACKGROUND OF THE INVENTION

1. FIELD OF THE INVENTION

This invention relates generally to energy management and facility automation systems, and more particularly, to such a system having one or more controllers in each home for managing various devices in response to messages from a central controller, which may be programmed by each user to individually and uniquely control each device through a facility controller and which may be further programmed by a utility company to permit load reduction limited to selected devices for short periods of time.

2. DESCRIPTION OF THE PRIOR ART

In recent years, various attempts have been made to provide both energy management systems and home automation systems for controlling various appliances in the home. Such appliances include heating and air conditioning systems, water heaters, lights, various motors and the like. Similar attempts have been extended to commercial facilities, such as offices, stores, ware-houses and factories. Generally, the prior art efforts have been local systems which are expensive on a per facility basis because of the high cost of the main controller. Further, such systems are limited in their applicability and operation, and cannot be readily changed by the user to take into account changing circumstances.

A common problem faced by the utility company is the necessity to reduce demand for electricity, during certain time periods, such as during extremely hot or cold weather, or when an equipment breakdown occurs. Traditionally, the manner by which the utility company has reduced consumption by cutting service to entire neighborhoods or sectors of a grid, thereby totally eliminating all utility loads. In the case of an electric utility company, reducing consumption, when excess demand occurs, can better be accomplished by eliminating or reducing the demand by selected high energy consuming appliances, such as heating and air conditioning units, or water heaters, while leaving the more necessary items, such as lights, and small appliances or equipment, in a home, or business still operating. This type of an approach would greatly reduce the inconvenience to the homeowner and business owner, siLnce life as usual could continue for short times without heat or air conditioning, or unlimited hot water. Moreover, this type of approach has not adequately been addressed in the prior art.

U.S. Pat. No. 4,153,936, issued on May 8, 1979, to William D. Schmitz et al., describes an energy management system for monitoring and controlling energy-consuming loads.

U.S. Pat. No. 4,153,945, issued on May 8, 1979, to Elliol J. Actor et al., describes a control subsystem for controlling sensorbased systems.

U.S. Pat. No. 4,173,754, issued on Nov. 6, 1979, to George E. Feiker, describes a distributed control system in which a function code is sent from a central location to distributed receivers.

U.S. Pat. No. 4,213,182, issued on Jul. 15, 1980, to Charles W. Eichelberger et al., describes an energy load controller that sets various energy loads to various predetermined levels. The controller responds to information provided by a user-input device.

U.S. Pat. No. 4,217,646, issued on Aug. 12, 1980, to Anthony V. Caltagirone et al., describes an automatic control system for a building. The system of this patent sends control signals to devices in various regions of a building.

U.S. Pat. No. 4,375,637, issued on Mar. 1, 1983, to Paul A. Desjardins, describes an integrated alarm, communication, and building management system.

U.S. Pat. No. 4,530,008, issued on Jul. 16, 1985, to David S. McVoy, describes a secured communications system that prevents unauthorized access.

U.S. Pat. No. 4,567,557, issued on Jan. 28, 1986, to Martin J. Bruns, describes a building intelligence system with an uninterruptible power supply.

U.S. Pat. No. 5,119,412, issued on Jun. 2, 1992, to Arnaldo Attallah, describes a system for regulating and monitoring devices by telephone.

None of the above inventions and patents, taken either singly or in combination, is seen to describe the instant invention as claimed.

SUMMARY OF THE INVENTION

In accordance with one aspect of the invention, there is provided a utility commodity load reduction system including a plurality of controller means, each located within a different one of a plurality of facilities, for controlling the operation of various utility commodity consuming devices within the one facility. The system further includes central command means for providing general commands to each of the controllers the manner in which that controller controls the operation of the devices within each facility and utility command means for causing selected utility commands to be provided to selected ones of the controllers for causing selected ones of the devices being controlled by the selected controllers to operate in a manner consuming less of the utility commodity.

BRIEF DESCRIPTION OF THE DRAWINGS

One preferred embodiment of the subject invention is hereafter described with specific reference being made to the following Figures, in which:

FIG. 5 illustrates the general format of a paging message sent from the customer command center computer to a pager receiver in a control unit.

FIG. 6, having diagrams A, B and C, illustrates the makeup of the Schedule Information message sent from the customer command center computet to a pager receiver in a control unit.

FIG. 7, having diagrams A and B, illustrates the makeup of the Time, Date and Daylight message sent from the customer command center computer to a pager receiver in a control unit.

FIG. 8 illustrates the makeup of the Weather Information message sent from the customer command center computer to a pager receiver in a control unit.

FIGS. 13A and 13B, having diagrams A, B, C, D, E and F, illustrates the makeup of the System Parameter message sent from the customer command center computer to a pager receiver in a control unit.

FIG. 14 illustrates the makeup of the Expanded message sent from the customer command center computer to a pager receiver in a control unit.

FIGS. 15A and 15B are examples of types of published schedule used by a user of the invention for programming the HVAC unit or water hester units to be controlled.

DETAILED DESCRIPTION OF THE PREFERRED EMBODIMENTS

Figure 1:
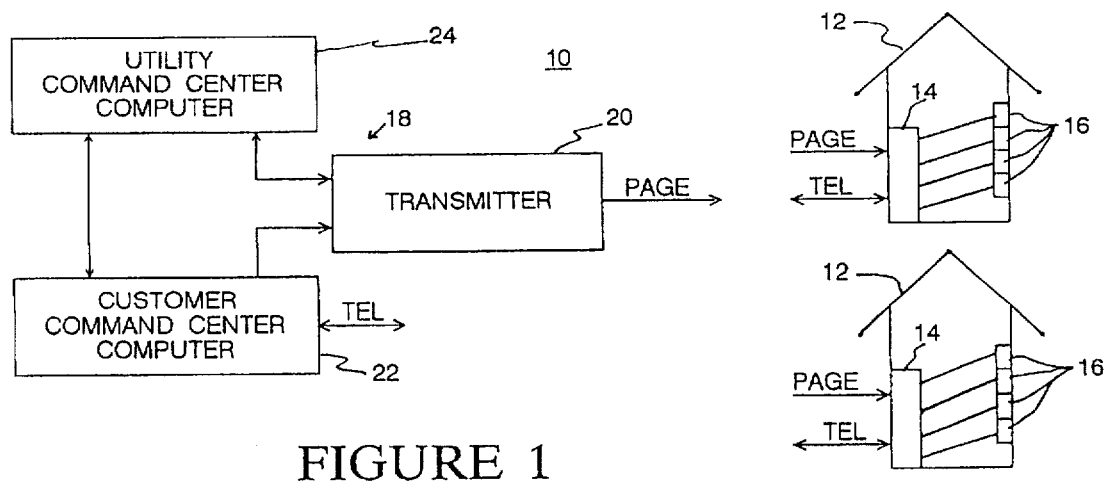
FIG. 1 shows a generalized block diagram of the energy management and me automation system of the subject invention.

Referring to FIG. 1, a block diagram of the energy management and automation system 10 of the subject invention is shown. System 10 is organized to control both the usage of energy and the convenience of using electrical energy consuming devices in a wide area of facilities 12, such as homes, commercial buildings, apartment units and the like. One or more controllers 4 in etch facility 12 provides electrical control signals to various electrical consuming devices 16, such as heating and cooling units, water heaters, lights of various types, pumps, electrical appliances such as coffee makers or toasters, home entertainment devices, such as televisions, stereos, video recorders, and the like. The signals provided from controller 14 to devices 16 are of a type which may either turn the appliance on or off, or may set the devices 16 to an intermediate value, such as setting dimmable lights to a forty percent value.

Some devices, such as heating, ventilating, and air conditioning units (HVAC), water heaters, lights and the like, will require additional controls, such as thermostats or switches to control whether the appliance is to be turned on. Thus, in some instances, the "on" signals from controller 14 merely permit the appliance to turn on if other conditions are present. For example, the water heater control "on" signal permits more hot water to be generated, but the thermostat associated with the water heater must still indicate that hot water is needed. On the other hand, the "off" signal prevents the appliance from being on, regardless of the setting of other controls associated with the appliance.

The central, or common, portion 18 of system 10 includes a transmitter 20 which sends various signals to the controllers 14. These signals may address an individual controller 14, a group of controllers 14 or all of the controllers 14. While any communication link may be used from transmitter 20 to controllers 14, the preferred embodiment described herein utilizes the paging network services offered by various telephone companies and independent providers. Other communications links, such as, ISDN, television cable, FM radio, telephone lines, or direct communications may alternatively be used. The contents of the paging messages, indicated by the notation PAGE in FIG. 1, transmitted by transmitter 20 are determined by a customer command center computer 22 and a utility command center computer 24. It should be noted that there may be several utility command center computers 24 attached to transmitter 20 and computer 22, although only one is shown in FIG. 1. Computers 22 and 24 may be coupled to transmitter 20 by conventional telephone lines, which may be dedicated lines, or shared lines used in the public network, and provide appropriate signals to transmitter 20 to permit the subsequent transmission of paging message packets manifesting the appropriate information, as described hereafter with respect to FIGS. 5 through 14. In addition, computer 22 can communicate with the various controllers 14 over the public telephone network, as indicated by the line label TEL.

Generally, the particular manner by which the various devices 16 are to be controlled is determined by programmed command data stored in each of the controllers 14 in conjunction with a preexisting program contained in each controller 14. The programmed data is normally generated by customer command center computer :22 and transmitted to controllers 14 as paging message signals by transmitter 20, although in some instances it may be locally generated by operation of, for example, certain key sequences on a thermostat. Many of the paging message signals sent to controllers 14 are determined by the manner in which a user programs computer 22, using a conventional DTMF tone or pulse dial telephone communicating with computer 22. Some paging message signals, however, are determined solely by the customer command center computer 22 itself and automatically sent to all control units 14. The various paging message signals and the manner in which the user programming occurs is hereafter described in more detail.

In certain instances, the energy management and automation functions programmed by the user may be overridden by the utility company when it is necessary to reduce the consumption in a particular area. In this situation, utility command center computer 24 provides signals to transmitter 20, which, in turn, provides appropriate paging messages to the various controllers 14. These messages may cause certain appliances, such as heating or cooling units or water heaters, to be turned off, for selected times, such as for fifteen minutes, or for alternate ten minute increments over a defined period. Alternatively, the paging messages generated at the utility command center computer 24 may only require the selective disabling of certain appliances, such as reducing the temperature at which a heating unit can turn on, or increasing the temperature at which a cooling unit can turn on. The utility company paging messages are only sent to those facilities who have agreed to participate in a reduction program, usually in exchange for a reduced cost for electric power, natural gas or other commodity supplied. Other utility companies, such as gas utilities or water utilities, may also participate in the utility commodity reduction ability afforded by system 10. Computer programs within controllers 14 recognize the utility company paging messages and prevent a user from overriding the commands to reduce energy consumption, using the keys 84 on thermostat 42 or overriding the powerline transceiver 54 controls, something which the user can otherwise do. However, upon request to the customer command center 22, a utility company can authorize energy consumption in an emergency situation, such as a medical necessity.

Each message generated by transmitter 20 may be a typical paging message. For example, the paging message may be a numeric paging message consisting of twenty-three characters, each of which may be the numeric values "0"–"9", or the paging message may be an alpha/numeric paging message consisting of 80 characters, each of which may contain many more than the ten values available with the numeric paging message. In all of the paging messages, the first digit of the paging message defines the type of signal and the last digit is a checksum digit. The various types of signals generated by computers 22 and 24, and transmitted as paging messages by transmitter 20, may be generally classified as containing, Schedule Information, Time, Date and Daylight Information, Weather information, Initialization information, Utility Company Set.up information, Utility Company Activation commands, User Override commands, and System Parameter commands. Generally, these paging messages are designed for transmittal as a twenty-three digrit numeric paging message, with the first digit identifying the type of signal. However, if the first digit of a paging message is, a "9" (or alternatively any number other than those between "0" alnd "8"), it may be used to identify another paging format, such as the 80 character alpha/ numeric format. Each of these messages and the response by controllers 14 thereto will be discussed in more detail hereafter.

Figure 2:
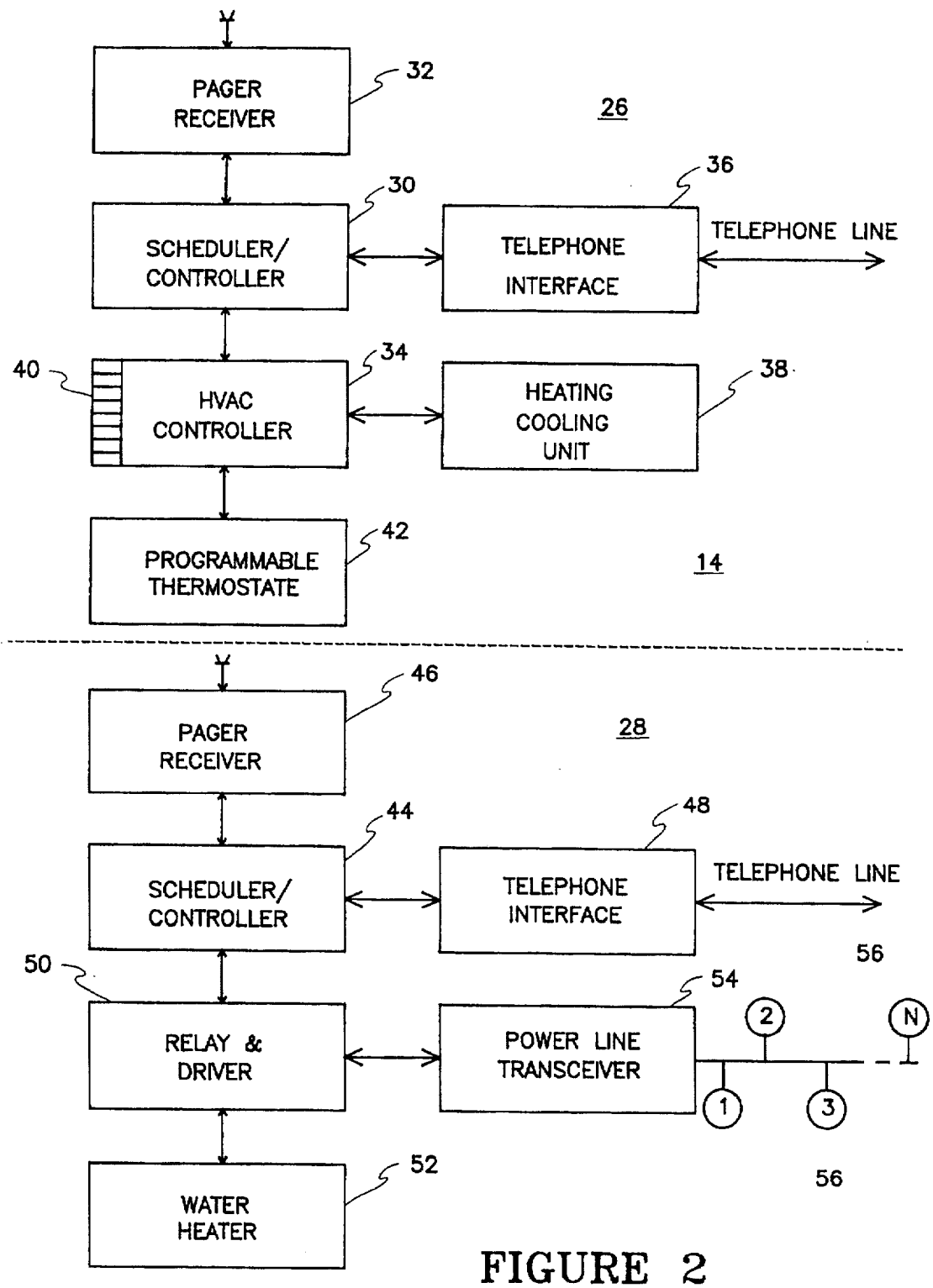
FIG. 2 shows a block diagram of the water heater and automation control unit and the HVAC control unit used in user facility portion f the system shown in FIG. 1.

Referring now to FIG. 2, a generalized block diagram of the controller unit 14 within a single facility 12 is shown. Controller 14 consists of one or more of two different types of control units, which are a HVAC (Heating, Ventilation and Air Conditioning) control unit 26 and a water heater and automation control unit 28. The HVAC control unit 26 is dedicated to controlling the heating and cooling of the home, whereas the water heater and automation control unit 28 controls the water heater and up to sixteen other appliances. It should be noted that within any given facility, one or more of either type of control unit 26 or 28 may be utilized, or alternatively, either unit 26 or 28 may be eliminated, if no desire exists for that particular unit. However, for most facilities, at least one of each type of control unit 26 and 28 will be used.

The primary portion of the HVAC control unit 26 is a scheduler/controller 30, which has a pager receiver 32, an HNAC controller 34 and a telephone interface (TI) 36 connected thereto. Pager receiver 32 may be any commercially available module capable of receiving and decoding the telephone company pager messages, such as the Model BPR2000 pager receiver, manufactured by Motorola, Inc. of Boynton Beach, Fla. Pager receiver 32 detects all pager messages broadcast and responds to certain message signals by providing a series of signals to scheduler/controller 30 manifesting a sequence of the digits zero through nine. In conventional digital pager systems, used by individuals, the digits received by the pager receiver 32 are displayed on a conventional seven segment liquid crystal display. In control unit. 26, the pager receiver 32 signals used to illuminate the seven segment display are intercepted and provided to scheduler/controller 30, where they are decoded to manifest the digits they represent. This permits the use of commercially available pager receiver modules for pager receiver 32.

Figure 4:
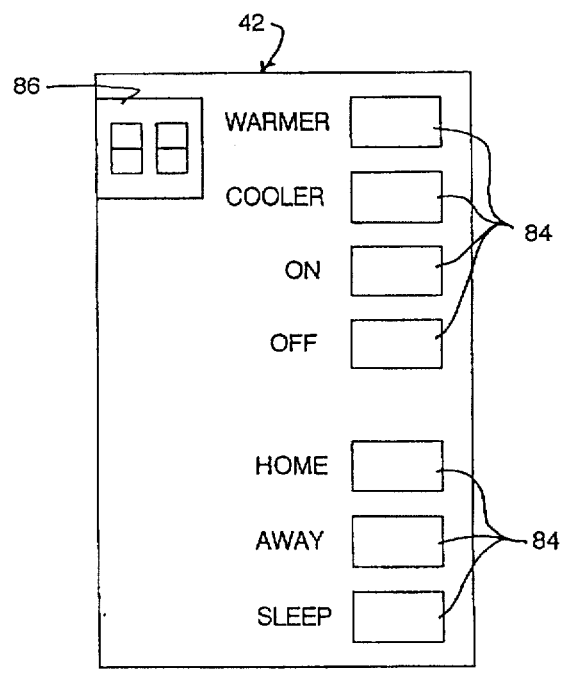
FIG. 4 shows the programmable thermostat used with the HVAC controller of e subject invention.

Telephone interface 36 may similarly be any conventional DTMF receiver/transmitter circuit which detects, decodes and provides digital signals to controller 30 in response to conventional DTMF tone signals provided over the public access telephone network. HVAC controller 34 may be a commercially available programmable HVAC electronic thermostat, such as the one manufactured by Alerlton TechnologieS, Inc., of Seattle, Wash., under Model Number SATUX. While the hardware of HVAC controller 34 may be commercially available, the computer program, or firmware, of the commercial version require S modification to provide the information required by control unit 26, as will be more fully explained hereafter. Generally, HVAC controller 34 provides output voltages to control the fan and heating and cooling units of conventional heating and cooling units 38 found in most types of facilities 12. A series of switches 40 are set to indicate the particular type of heating/cooling unit 38 present in the facility 12. In addition, HVAC controller 34 is connected to a programmable thermostat 412, which may be controlled by the user to affect the operation of the heating/cooling unit 38. Thermostat 42, which is shown and described in more detail in FIG. 4, is simply a temperature detector, keyboard and display in a single package.

The water heater and automation control unit 28 is similar to the HVAC control unit 26. It also includes a scheduler/controller 44 which is connected to a pager receiver 46 and telephone interface 48. Pager receiver 46 is identical to pager receiver 32 and telephone interface 48 is identical to telephone interface 36, both described above. In addition, scheduler/controller 44 hats a relay and driver circuit 50 coupled thereto, which switchably permits power to be applied to a conventional water heater 52, or other high amperage device, such as pumps of various types. Relay and driver circuit 50 may be simply a 35 amp switchable relay connected as a switch in series with the power lines connected to water heater 52. In addition, a transceiver 54 is connected to scheduler/controller 44 and may control up to N different appliances connected thereto.

One type of transceiver 54 which may be used is a standard power transceiver operating under the X-10 standard of providing RF signals over the electric lines existing throughout the facility 12. Such a device may control up to sixteen different energy consuming devices 56 connected thereto with commercially available interface devices. An example of transceiver 54 which may be used is a model TW523 manufactured and sold by X-10 USA of Northvale, N.J. Other types of connections, such as twisted pair, coaxial cable, fiber optics and so forth may also be utilized to interconnect scheduler/handler 44 with the various devices being controlled. Some of these connections may be bi-directional to permit communication of data back to scheduler/controller 44.

As noted above, telephone interfaces 36 and 48 permit communications between the command center computers 22 and 24 alnd each control unit 26 and 28 by using the public telephone network. To better use this telephone communication ability, an auto-dialing device may be included in each control unit 26 and 28. With this additional hardware, each control unit 26 and 28 may be directed to perform certain tasks and report the results to a designated telephone number. Where many units are to perform the same taLsk and report the results, the paging signals maybe used to address many units at one time and then each can call the designated number until a report is made, of course, this may require many automatic re-dial attempts until all units successfully report. An example of such communication is that system 10 may be include various devices 56 arranged to read utility meters, such as water, electric or gas meters, and report the reading back to the particular utiliLty company.

The utility company may broadcast a broad based paging message requesting each control unit 26 or 28 in a designated area to read the meter and report the results to a designated utility company telephone number. Similarly, such action may be programmed to occur at specified times and dates by using the paging messages described herein. Alternatively, system 10 may be designed or programmed by appropriate paging messages to require each control unit 26 or 28 to report its status back to command center 22 or 24, either automatically, or on command.

Figure 3A:
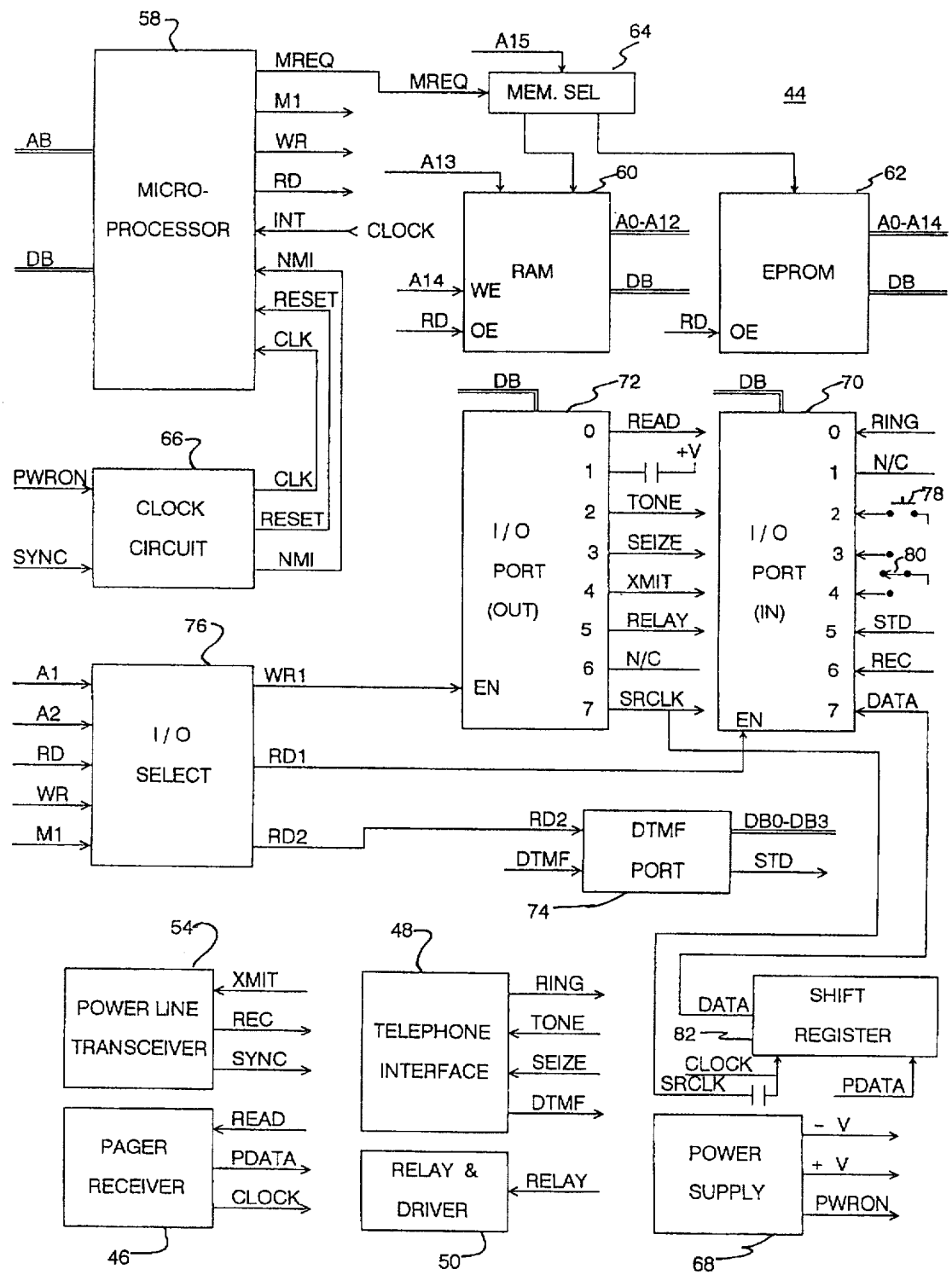
FIG. 3A shows a more detailed block diagram of the scheduler/controllers of the water heater and automation control unit shown in FIG. 2.

Referring now to FIG. 3A, a block diagram of scheduler/controller 44 in water heater and automation controller unit 28 is shown. From a hardware view, scheduler/controller 44 is a microcomputer system, having, as its primary controller, a microprocessor 58, such as a commercially available Z-80 type microprocessor. Microprocessor 58 includes a sixteen bit address bus AB and an eight bit data bus DB, which are applied to various other modules in scheduler/controller 44, as hereafter explained. In addition, microprocessor 58 includes a plurality of various control signals for controlling the operation of various other modules. These control signals include the MREQ and M1 signals for controlling memory and I/O (input/output) access, the WR and RD signals for controlling the writing and reading of data to and from modules selected by the MREQ and M1 signals, the INT and NMI interrupt signals which interrupt the operation of microprocessor 58, the RESET signal which resets microprocessor 58 upon the application of power thereto, and the CLK signal which controls the frequency of operation of microprocessor 58. Each of these control signals are well known in the literature explaining the operation of a Z-80 microprocessor.

Conventional RAM memory 60 and EPROM memory 62 are coupled to bits 0–14 of address bus AB, to bits 0–7 of data bus DB and to the RD control signal from microprocessor 58. While not shown, RAM memory 60 may have a voltage backup system, such as a large capacitor or a battery, to prevent the loss of data in the event of a power failure. In addition, a memory select circuit 64 is provided to select one of RAM memory 60 or EPROM memory 62 in response to the MREQ signal and A15 address bus signal applied thereto. The selected one of RAM 60 or EPROM 62 then responds appropriately to the then occurring memory operation instruction from microprocessor 58. RAM 60 is addressed by the address lines A0–A12, and Address lines A13 and A14 are used as chip select alnd write enable signals. EPROM 62 is addressed by address lines PL0A14, and thus, may be a 32 K byte memory.

Scheduler/controller 44 also has a clock circuit 66 which provides various signals to the CLK, RESET and NMI inputs of microprocessor 58. Clock circuit 66 includes a conventional crystal oscillator circuit, the output of which is provided as the CLK input to set the timing of microprocessor 58. The oscillator signal is also divided and synchronize with a SYNC signal from transceiver 54 to provide an interrupt Signal at multiple as of 8.33 milliseconds to the NMI input of microprocessor 58. In addition, the PWRON signal from the power supply 68 is provided as an indication that power has been applied and is Synchronized with the oscillator signal to provide a Signal to the RESET input to reset microprocessor 58. Power supply 68 also provides the +V and −V voltages used throughout the circuit of controller/scheduler 44.

In addition, scheduler/controller 44 has two I/O ports 70 and 72 and a DTMF port 74, each of which are enabled by an I/O select circuit 76. Select circuit 76 has the A1 and A2 address bus signals, the RD, WR and M1 signals applied thereto. The WR and M1 signals enable I/O select circuit 76 to decode the A1, A2 and RD signals applied thereto and provide one of the RD1, RD2 and WR1 signals, which respectively enable I/O port 70, DTMF port 74 and I/O port 72. Generally, each of the ports 70 and 72 are used to permit microprocessor 58 to communicate with the various other modules in water heater and automation unit 28, that is transceiver 54, pager receiver 46, telephone interface 48 and relay and driver 50. Transceiver 54 provides a Receive (REC) signal and a Synchronization (SYNC) signal to scheduler/controller 44 and receives a Transmit (XMIT) signal-from scheduler/controller 44. The SYNC signal is a 120 hertz signal manifesting the zero cross point of the normal power line signal and the REC and XMIT signals are serial data and control signals between transceiver 54 and scheduler/controller 44. Pager receiver 46 similarly provides a CLOCK signal and a data signal and responds to a READ signal provided thereto. Telephone interface circuit 48 provides a RING signal and a DTMF signal and responds to a TONE signal and a SEIZE signal in a conventional manner. Finally, the relay and driver circuit 50 responds to a RELAY signal which causes the relay therein to be open or closed, depending upon the value of the RELAY signal.

I/O port 70 is used to receive incoming signals and is selected by the RD1 signal from I/O select circuit 76 and, when selected, receives ,the last data values applied at the eight input ports, labeled "0" through "7", thereof and provides it to data bus DB. The "0" input is connected to receive the RING signal from telephone interface 48 and the "1" input is not connected. The "2" input of I/O port 70 is connected to ground through a push button switch 78 and the "3" and "4" inputs to I/O port 70 are connected to two poles of a three pole switch 80 respectively. Three pole switch 80 has its switching arm coupled to ground and the third pole thereof is left unconnected. The owner or installer may use the two switches 78 and 80 to clear the RAM memory 60 prior to initialization. The 5 input of I/O port 70 is connected to receive the STD data signal from DTMF port 74, which indicates that data is ready to be sent on lines 0-3 of the data bus containing data received by telephone interface 48. DTMF port 74 is enabled by the RD2 signal form I/O select 76, and when the RD2 signal is received thereby, DTMF port 74 actually provides the binary data it has detected and decoded from the DTMF tones applied thereto from telephone interface 48. DTMF port may be any commercially available module, such as the MT8870 available from Mitel, Inc.

The "6" input of I/O port 70 is connected to receive the RTEC signal from transceiver 54, and represents one bit of data provided from one of the units 56 attached to transceiver 54. This data is provided in conjunction with the SYNC signal from transceiver 54, which is applied to clock circuit 66 and causes an interrupt signal to be provided to the NMI interrupt of microprocessor 58. WhLen this occurs, the REC data is read by the microprocessor 58 by enabling I/O port 70.

The "7" input of I/O port 70 is connected to receive the DATA signal from a shift register 82. Shift register 82 operates in conjunction with pager receiver 46 and receives the PDATA signal and the CLOCK signal from pager receiver 46. The CLOCK signal also is applied to the INT maskable interrupt input of microprocessor 58 to cause an interrupt thereof whenever pager receiver 46 receives and has processed data.

Where pager receiver 46 is a commercially available twentythree character digital receiver, it typically includes a twelve digit, seven segment display. The twenty-three digits are displayed in two groups of eleven and twelve digits each, with the twelfth digit of the first panel being a special character in the shape of a small "c" to indicate that there is a continuation of the message. In other receiver systems, the first panel includes twelve digits, with the last digit blinking as an indication that there is a continuation of the message. In both systems, they remain in the second panel. Scheduler/controller 44 captures the signals provided to the display by pager receiver 46 and then decodes the seven segment encoding to determine the digit, which is then converted to a binary code and stored in RAM memory 60.

Pager receiver 46 operates by causing the message to be displayed by issuing a serial PDATA signal of ninety-two bits and a CLOCK signal each time a bit of the PDATA signal occurs. As noted above, the CLOCK signal is applied to the INT input of microprocessor 58. Upon receiving the first interrupt, the program associated with microprocessor 58 disables the INT input for a period of time sufficient for all of the bits in the PDATA signal from pager receiver 46 to be entered into shift register 82. During this time, each bit of the PDATA signal is entered into the lowest register of shift register 82 by each CLOCK signal, with the remaining bits being shifted one stage higher. For a Motorola Model BPR2000 pager receiver, the digital data is detected and applied as a ninety-two bit serial signals manifesting a twelve digit seven segment display. Within the ninety-two bits, four bits are for special control characters and four bits are not used, leaving eighty-four bits to manifest twelve seven segment digits. It is this serial signal within the pager receiver 46 that is intercepted and applied as the PDATA signal to shift register 82.

I/O port 72 is used to provide signals to the various other modules in scheduler/controller 44. I/O port 72 receives the data to provide from data bus DB and is selected by the WR1 signal from I/O select 76. I/O port has eight output ports, labeled 0–7. Port "0" provides the READ signal to pager receiver 46, causing it to provide the second message panel of eleven or twelve characters to shift register 82. The READ signal is the electronic equivalent of depressing the Read button on a conventional pager, theriby allowing display of another message, or the remainder of a message. Port "1" is coupled to a light emitting diode (LED) 84, which is used to signal the user or serviceman of various status conditions of controller/scheduler 44.

Ports "12" and "13" of I/O port 72 provide the TONE and SEIEZE signals to telephone interface 48 as a part of processing telephone communication between controller/scheduler 44 and the customer command center 22. Similarly, port "14" provides the XMIT data to transceiver 54 to cause the execution of commands by the, various appliances 56 connected to transceiver 54. For example, an )AIIT signal may be a series of bits causing a coffee pot to turn on, ora light to turn off. Port "5" provides the RELAY signal to set or reset the relay driver 50, typically for controlling a water heater. Port "16" is not connected.

Port 1171 of I/O port 72 is the SRCLK signal, which is connected to form a logical OR with the CLOCK signal at the clock input of shift register 82. As explained above, the CLOCK signal clocks the PDATA bits from pager receiver 46. Once the data manifesting the first panel of the message is completely provided to shift register 82, it is transferred as the DATA signal to microprocessor 58 and decoded into the various digits it represents. This transfer occurs by the provision of an appropriate number of SRCLK signals from I/O port 72 under the control of microprocessor 58. The number of SRCLK pulses will depend upon the number of stages in shift register 82, as it is first necessary to move the ninety-two bits originally stored in stages zero to ninety-one to the end stages of shift register 82 before commencing the actual transfer of data. After all ninety-two bits are transferred to microprocessor 58, the READ signal is issued from port 0 of I/O port 72 and the second panel of signals is stored in shift register 82 and transferred to microprocessor 58 as just explained.

Figure 3B:
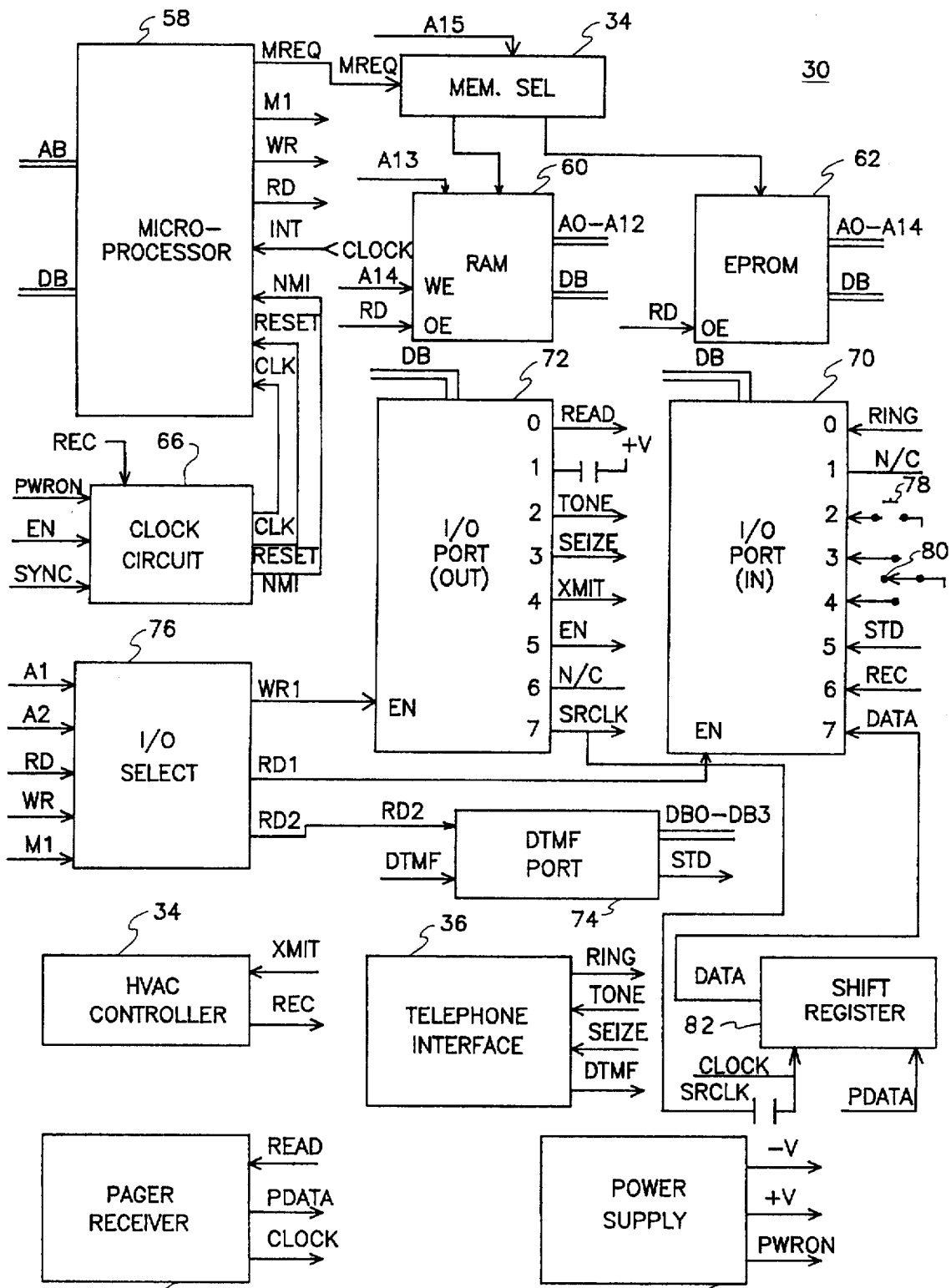
FIG. 3B shows a more detailed block diagram of the scheduler/contr lers of the HVAC control unit shown in FIG. 2.
Figure 9:
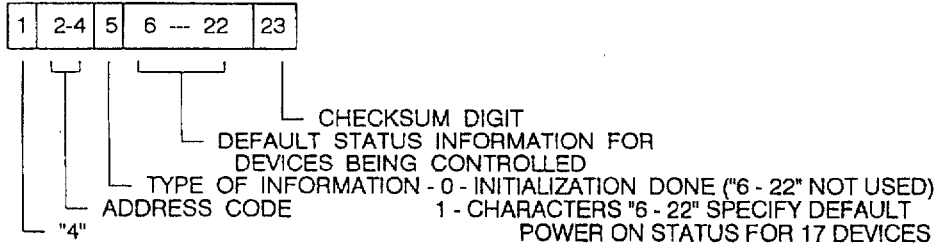
FIG. 9 illustrates the makeup of the Initialization message sent from the customer command center computer to a pager receiver in a control unit.

Referring now to FIG. 3B, scheduler/controller 30 used with the HVAC control unit 34 is shown. Scheduler/controller 30 is essentially the same as scheduler/controller 44 shown in FIG. 3A and like number labels are used to represent like components. The differences between the two scheduler/controllers 30 and 44 is that scheduler/controller 30 controls the HVAC controller 34, which, in turn, controls the heating/cooling unit 38 and responds to information and commands from thermostat 42, instead of the transceiver 54 and relay and driver circuit 50 in scheduler/controller 30. HVAC controller 34 responds to data of the EMIT signal from pin 4 of I/O port 72 and provides the REC signal to both port "6" of I/O controller 70. In addition, the REC signal from HVAC controller 34 is provided to clock circuit 66, along with an EN signal from port "5" of I/O port 72. The REC and EN signals are used to generate the non-maskable interrupt, NMI, signal at a rate of 0.833 msec, which is at least ten times as fast as the NMI signal provided in FIG. 3A. Referring now to FIG. 4, the programmable thermostat 42 used with the HVAC controller 34, is shown. Basically, thermostat 42 is a simple keyboard and display device with an internal temperature sensor. It is connected directly to HVAC controller 34 and is used to permit the user to set various parameters stored in memory associated with HVAC controller 34 for controlling the temperature and other operating conditions of the,heating and cooling unit 38. As previously described, HVAC controller 34 includes its own microprocessor and a communication channel to permit microprocessor 58 in scheduler/controller 30 in FIG. 3B to read the user set parameters, as well as data internally generated by HVAC controller 34, and to provide various other commands and data values to HVAC controller 34. Thermostat 42 has seven keys 84, respectively labeled WARMER, COOLER, ON, OFF, HOME, AWAY AND SLEEP and a two digit display 86 which normally displays two numeric digits manifesting the sensed temperature. Display 86 is also capable of displaying letters of the alphabet to indicate the present mode of operation. For residences, the various user modes are HOME, AWAY, SLEEP, ON AND OFF, but for other facilities, such as commercial buildings, the modes are OCCUPIED, UNOCCUPIED, MAINTENANCE, ON and OFF. Thus, a commercial building thermostat similar to thermostat 42 would have the various keys labeled as WARMER, COOLER, ON, OFF, OCCUPIED, UNOCCUPIED and MAINTENANCE. In addition, there is also a SERVICE mode available for both residences and other facilities and is only to be used by the installer or repairman. Thermostat 42 is electrically coupled to the HVAC controller 34, as seen in FIG. 2, and is one of the manners in which the heating, air conditioning and ventilation system of the facility can be controlled by the user. For a home, at any given time, the heating, ventilation and air conditioning management is set based upon whether the user is home, away or sleeping; hence, the HOME, AWAY AND SLEEP modes. The primary parameter of control are a series of set-point temperatures, which are set by the user to determine operation during the various HOME, AWAY and SLEEP modes. Generally, during the HOME mode, the home is maintained cooler if air conditioning is required and warmer if heating is required.

During the AWAY mode, the home is maintained warmer if air conditioning is required and, cooler if heating is required and during the SLEEP mode, the home is maintained at temperatures between the HOME and AWAY modes. During the ON mode, the HOME mode temperatures are used and, in effect, the ON mode merely overrides the AWAY or SLEEP modes to function as in the HOME mode. During the OFF mode, even lower heating and higher cooling set-points than used in the AWAY mode, may be utilized. For example, the OFF mode may be used during a vacation where an extended time away from the home is anticipated.

To program HVAC control unit 34, the various keys 84 on thermostat 42 are pressed. When the WARMER key 84 is pressed during normal operation, that is when display 86 is displaying the current temperature, display 86 displays the current mode (HO feor HOME, SL for SLEEP and AY for AWAY). On the other hand, if display 86 is displaying a set-point temperature (as a result of the user having previously pressed the HOME, AWAY or SLEEP keys 84, as discussed below), then pressing the WARMER key 84 increments the displayed set-point temperature. Pressing the COOLER key 84 when the current temperature is displayed on display 86 has no effect. However, if a set-point temperature is being displayed on dispLay 86, then the set-point temperature, as displayed, is decremented by pressing the COOLER key 84.

The ON and OFF keys 84 are used to override the previously set HOME, SLEEP and AWAY modes. This is done by controller timers contained in the software of scheduler/controller 34. Specifically, when ON key 84 is pressed, an ON timer is incremented in 0.1 hour increments (six minutes) up to a maximum of 9.9 hours. When the ON timer is set to 9.9, it does not decrement and thus is permanently set. During the time the ON timer is non-zero, the system is forced to the HOME mode, regardless of the times previously programmed for the various modes. When the OFF key 84 is pressed, the OFF timer is incremented in 0.1 hour increments to a maximum of 9.9. At a setting of 9.9 the OFF timer is not incremented, Tut when displaying any other value, it is decremented in real time back to zero. As long as the OFF timer is non-zero, the OFF set-points are used in controlling the temperature by heating or cooling. A depression of either the ON or OFF keys 84, or any of the HOME, SLEEP or AWAY mode keys 84, when either of the ON or OFF timers have values remaining cancels the remaining ON or OFF time. The ON and OFF keys 84 may also be used with the mode (HOME, SLEEP or AWAY) keys 84 to control the fan operation of the HVAC unit 38 when operating in that mode. Specifically, if a mode key 84 is pressed and the ON key 84 is pressed within two seconds thereafter, the fan is set to operate for that mode in a continuous manner and if the OFF key 84 is pressed within two seconds of pressing a mode key 84, the fan is set to operate in that mode in an intermittent manner, which is similar to the "automatic" setting of a conventional thermostat, that is, the fan only operates while or shortly after heating or cooling is occurring.

Each of the HOME, AWAY and SLEEP keys 84 are used to display the heating and cooling set-points used in the various modes. As used herein, the set-point is the temperature at which heating or cooling occurs. Thus, when the temperature in the facility falls to the heating set-point, the heating unit is turned on and when the temperature in the facility rises to the cooling set-point, the cooling unit is turned on. Generally, the first time one of HOME, AWAY and SLEEP keys 84 is pressed, the heating set-point temperature is displayed for five seconds. If the same key 84 is pressed a second time while the heating set-point temperature is being displayed, the cooling set-point temperature is displayed Ior five seconds. Each displayed set-point temperature may be increased or decreased using the WARMER or COOLER keys 84 during the five seconds the set-point temperature being displayed, as described above.

If either of the HOME, AWAY or SLEEP keys 84 are held depressed for one half of a second, the time scheduler commands are overridden and that mode is entered. This new mode then remains until the scheduler senses the time for a programmed mode change.

When in any of the HOME, AWAY or SLEEP modes, the fan may be set to operate either continuously, or intermittently with a thirty second overrun. It should be noted that the system is designed to prevent, either heating or cooling unless the fan is on. In the HOME MODE, the building is heated to the home heating set-point temperature and cooled to the home cooling set-point temperature. The maximum home heating set-point temperature the user is normally permitted to select is 80° F. and the minimum home cooling set-point temperature the user can select is 70° F., although both of these home set-point temperatures are adjustable in the SERVICE mode.

The maximum heating and minimum cooling set-point temperatures the user can select in the AWAY mode are 65° F. and 74° F. respectively, although these temperatures may be changed in the SERVICE MODE.

The maximum heating and minimum cooling set-points temperatures that the user can select in the SLEEP mode are 76° F. and 74° F., respectively, and again, these temperatures may be changed in the SERVICE mode.

In each of the HOME, SLEEP and AWAY modes, the heating and cooling set-point temperatures cannot be set within two degrees of one another. If an attempt is made to adjust one of the set-point temperatures to within two degrees of its opposite counterpart, the counterpart is automatically moved two degrees away.

The final mode is the SERVICE mode, which is normally only entered by a serviceman entering a prescribed sequence of key 84 depressions. For example, the sequence to enter the service mode may be COOLER, COOLER, HOME, ON and SLEEP, in that order. During the SERVICE mode, the system variables, such as the maximum or minimum set-point temperatures in the various normal modes may be viewed, or, if desired, changed. Each of the various system parameters has a two letter code, which may displayed along with the setting, by pressing the HOME and AWAY keys 84. Once the value for a parameter is displayed, it then may be adjusted upward or downward by respectively pressing the WARMER or COOLER keys 34.

The various parameters and the initial setting for each parameter are given in table I below:

TABLE I

| Data Code | Parameter | Factory Setting | View Only | View & Change |
|---|---|---|---|---|
| dS | HVAC Code; DIP Switch Setting | AC-1C-1H | x | |
| OC | Off Mode Cooling Set-point | 99 | | x |
| OH | Off Mode Heating Set-point | 45 | | x |
| HH | Home Maximum Heating Set-point | 80 | | x |
| HL | Home Minimum Cooling Set-point | 70 | | x |
| AH | Away Maximum Heating Set-point | 65 | | x |
| AL | Away Minimum Cooling Set-point | 80 | | x |
| SH | Sleep Maximum Heating Set-point | 76 | | x |
| SL | Sleep Minimum Cooling Set-point | 74 | | x |

TABLE I-continued

| Data Code | Parameter | Factory Setting | View Only | View & Change |
|---|---|---|---|---|
| bC | Button Counter in 0.1 seconds | .5 | | x |
| rC | Cooling Ramp Time in minutes | 10 | | x |
| rH | Heating Ramp Time in minutes | 10 | | x |
| Cr | Cooling Ramp Time in % | none | | x |
| CC | Cooling Control Signal in % | none | x | |
| Hr | Heating Ramp Time in % | none | | x |
| HC | Heating Control Signal in % | none | x | |
| FC | Metric/English Display | °F. | | x |
| Co | Condensate Alarm Response | C | | x |

The HVAC code refers to the manner in which switches 40 shown in FIG. 2, are set. The particular setting of the various switches 40, which are included in HVAC controller 34 to designate the type of HVAC unit being controlled. These switches are normally set during installation and need not be reset until the actual heating/cooling unit 38 is replaced or modified. Thus, no provision is provided to modify these switches in the SERVICE mode.

Generally, switch number "7" is set to manifest the presence of either an air conditioning (AC) unit or a heat pump (HP) unit, switches "9" and "10" are set to designate the number of cooling stages in an air conditioning system or the number of compressors in a heat pump and switches "11" and "12" are set to designate the number of heating stages in an air conditioning system and the number of auxiliary heat strips.

The various set-points can be adjusted, as explained above, by pressing the WARMER or COOLER keys 84 as the particular code and programmed temperature is displayed. The system is programmed so that the maximum set-point temperature can never exceed 80° F nor can the minimum set-point temperatures be below 45° F. The button counter variable is the time, in 0.1 second increments, that the HOME, AWAY and SLEEP keys 84 must be held down in order to cause a switch to the selected mode. This time is initially set to 0.5 seconds, but may be varied by the user or the service-person in the SERVICE mode.

The heating and cooling ramp time parameters are ramp cycle times in minutes and are used to control the heating and cooling cycles. Heating or cooling commands calling for heating or cooling functions may only be executed at the beginning of a ramp cycle, but the heating or cooling may be turned off at any time during a ramp cycle. The heating and cooling ramp percent parameters are determined as the current value, as a percent of the respective ramp times divided by the time between ramp signals. These values may be reset in the SERVICE mode using the WARMER and COOLER keys 84. The heating and cooling control signals which are internally generated in the HVAC controller using a modified proportional integral derivative algorithm and are used to drive the heating or cooling units.

The condensate alarm goes off when too much water is in the condensate pan and may be varied to either turn off cooling only (displays "C") or turn off the fan, heating and cooling units (displays "A").

Referring again to FIG. 3B, all of the data discusse d above is maintained in a memory associated with the microprocessor in HVAC controller 34, along with other data used in the programted operation of HVAC controller 34. For example, while all of the various set-point temperatures are stored, a separate location is used to maintain the current mode set-point temperatures. Further, other various memory locations are used to store operational flags, manifesting, for example, the operational status of certain elements of the heating/cooling unit 38, or whether the condensate alarm is on. Other locations of the memory contain the programmd instructions for causing various actions by the heating/cooling unit 38. For example, the heat may be turned on whenever the temperature measured by the temperature sensor in thermostat 42 indicates that the temperature in the facility is below the current mode heating set-point.

While the various modes, particularly HOME, AWAY and SLEEP, discussed above, may be entered by the user operating thermostat 42, they are normally entered under the control of microprocessor 58. Within RAM 60, a schedule table is maintained which indicates the normal schedule of the user. The schedule is based upon eight different day entries, Sunday through Saturday and a Holiday. In addition, a counter is maintained in RAM 60 which is constantly updated in response to interrupts from Clock Circuit 66 to maintain the current time. Generally, the schedule table is maintained by time of day for each of the eight possible day entries and at the appropriate time, it sends appropriate messages using the REC and XMIT lines from and to I/O ports 70 and 72. For example, at the user programmed time for a change from the AWAY mode to the HOME mode, microprocessor 58 provides a signal causing a change in the schedule flags address of the memory in HVAC controller 34. Upon accepting the signal from microprocessor 58, the HVAC controller 34 provides an acknowledgment (ACK) signal to microprocessor 58, or if appropriate, a not acknowledged (NAK) signal. In response to the mode change signal, the program in HVAC controller 34 changes the currently active set-point temperatures and the status flags.

The communications link between microprocessor 58 in scheduler/handler 30 and HVAC controller 34 uses a 1200 baud multi-drop serial asynchronous communication protocol. Each command begins with an address character, followed by a stated number of additional characters and ending with a checksum character. Each character in the communication contains eleven bits, the first of which is a start bit and the second is a "1" if the character is an address character and a "0" if the character is a non-address character. The next eight bits of a character contain binary data and the eleventh bit is a stop bit. All commands are initiated by microprocessor 58 in scheduler/controller 30 and HVAC controller 34 merely responds to the command it receives. Microprocessor 58 sends two basic types of commands, Read and Write. HVAC controller 34 responds to a Read command by providing a variable length Response including the requested data and responds to a Write command by providing either an ACK (acknowledgment) or a NAK (not acknowledged).

The Read command contains eight characters, beginning, as follows:
1. an Address character,
2. a Length character containing the binary number "10000101111", indicating six characters following the Address character,
3. a code character containing the binary code "10000100",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which may be a number between 0 and 255, 7. a character containing the number of bytes to be read, and
8. a Checksum character, which is the sum of all characters, except the address character, preceding the checksum character.

The HVAC controller 34 responds with a variable message containing the data requested, which takes the following form:

1. an Address character,
2. a Length character containing the binary number which indicates the number of characters following the Address character,
3. a code character containing the binary code "1100001011",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which is the same as the Start character in the Read command,
7. Data character 1
8. Data character N, and
9. a Checksum character, which is the sum of all characters, except the address, character, preceding the checksum character.

The Write command is of a variable length, and is organized as follows:

1. an Address character,
2. a Length character containing the binary number which indicates the number of characters following the Address character,
3. a code character containing the binary code "10000110",
4. a character indicating the trunk to which HVAC controller 34 is connected, which is not used in the embodiment described herein and thus may contain any binary code,
5. a character indicating the address of HVAC controller 34, which is not used in the embodiment described herein and thus may contain any binary code,
6. a Start character, which may be a number between 0 and 255,
7. a character containing the number of data bytes to be written,
8. Data character 1
9. Data character N, and
10. a Checksum character, which is the sum of all characters, except the address character, preceding the checksum character.

The ACK message is returned by HVAC controller 34 if it accepts the write command message, and takes the form:

1. an Address character,
2. a Length character containing the binary number "00000011", indicating three characters following the Address character,
3. a code character containing the binary code "00100000", and
4. a Checksum character, which is the sum of all characters, except the address character, preceding the checksum character.

The NAC message is returned by HVAC controller 34 if it has not accepted the write command message for some reason, usually because the checksum is not verified, and takes the form:

1. an Address character,
2. a Length character containing the binary number "0000001"L., indicating three characters following the Address character,
3. a code character containing the binary code "00100001", and
4. a Checksum character, which is the sum of all character, except the address character, preceding the checksum character.

Referring again to FIG. 3A, the communication between microprocessor 58 and transceiver 54 for controlling home automation is generally similar to that described above, except that the conventional and well known X-10 protocol is followed. However, it should be noted that other types of communication buses or links between the transceiver 54 and various devices 56 may be used in place of the X-10 bus, and in such case, the protocols of those other types of buses or links would be followed.

While the manner in which programmable thermostat 42 is used to control many of the HVAC controller 34 parameters has been described at length above, the primary manner of changing either the HVAC controller 34 parameters or the water heater and automation control unit 28 parameters, particularly after the initial installation, is done using any common telephone to cause the customer command center computer 22 to send a paging message.

An example of when such a change would be desired is when a person, who normally leaves work at 5:00 PM, desires to work late or go out for dinner. Since that person normally arrives home at, for example, 5:30 PM, the home is controlled to switch to the HOME mode for heating and air conditioning at 5:30 PM and no lights are automatically turned on by the home automation system. With a simple telephone call to the control center computer 22 (seen in FIG. 1), that person can cause the HVAC controller to remain in the AWAY mode, thereby saving energy, and can further cause the outside lights and one or more inside lights to automatically turn on to give the presence that the home is occupied.

The manner in which the control pursuant to the example of the preceding paragraph occurs is by customer command center computer 22 causing an appropriate message to be sent to the scheduler/controllers 30 and 44 in a designated facility. According to the preferred embodiment of this invention, these messages may be sent using conventional and available paging messages broadcast by, for example, the local telephone companies. With a twenty-three digit numeric paging message being used to transmit the message, nine, different types of messages may be transmitted and the microprocessors 58 in either scheduler/controller 30 or 44 are designed to accept these messages and respond, under program control, in an appropriate manner. Also, a tenth message type, is available for other message formats, such as the 80 character alpha-numeric type of paging messages. The ten types of message formats are set out below in Table II.

TABLE II

0-Schedule Information
1-Schedule Information
2-Time, Date and Daylight Information
3-weather Message
4-Initialization Message
5-Utility Company Setup Message
6-Utility Company Override Message
7-Customer Override Message
8-System Parameter Message
9-Other Paging Format Referring now to FIG. 5, a diagram g enerally representing any of the various twenty-three character messages is shown. As seen from FIG. 5, the message consists of twenty-three characters, each being one of the digits "0" through "19". The first character of the message is an identification (I/D) digit maniifesting the type of the message, based upon the listing in Table II above. Thus, if the message sent is a Weather message, the first character contains the character information manifesting the digit "13". The next 21 characters contain the information of the message, as described in detail below, and the final character contains a parity, or checksum digit, which may based upon the sum of the digits of the first twenty-two characters.

Whenever a message is transmitted, it is received by every control unit 26 and 28 within every facility 12 responding to the particular phone number of the paging message. When the twenty-three character paging message is used, up to 1000 different control units 26 and 28 may share the same phone number and each is given an address code of "000" through "999". Some paging messages are to be acted upon by all control units 26 and 28, while others are addressed only to a specific control unit 26 or 28, and only that addressed control unit 26 or 28 responds. Further, the type of control unit 26 or 28 receiving the message will determine, in part, the information content of the message. For example, a type "0" Schedule Information message addressed to a HVAC control unit 26 will manifest different information than a type "0" message sent to a water heater and automation control unit 28.

Referring now to FIG. 6, three diagrams, labeled A, B and C, useful in understanding the Schedule Information messages are shown. As noted from Table II, there are two different Schedule Information messages and these are distinguished by the first character being either "0" or "1". The difference is that a Schedule Information message beginning with "0" is for controlling the schedule of devices "0" through "9" being controlled by water heater and automation control unit 28, whereas a Schedule Information message beginning with "1" is for devices "10" through "16" being controlled by water heater and automation control unit 28. For an HVAC control unit 26, either type message may be used.

Diagram A of FIG. 6 illustrates the format of the twentythree characters of a Schedule Information message. As seen, the first character is either a "0" or a "1" and manifests that, if the message is addressed to a water heater and automation control unit 28, it contains schedule information for either devices "0" through "9" if the first character is a "0" or devices "10" through "16" if the first character is a "1". It should be noted that the water heater 52 is always device "0" and the various devices 56 attached to transceiver 54 are devices "1" through "16". Then particular designation of each device being controlled is set using the protocols of the X-10, or other communication link, system being utilized.

The second through fourth characters of the Schedule Information message is an address code for the controller to which the Schedule Information message is intended to be sent. This may be any number between "000" and "999". Each scheduler/controller 30 and 44 is assigned with a specific address of between "000" and "999", which address is unique to that scheduler/controller This address may be stored in the EPROM memory 62, or it may be hard-wired within the scheduler/controller. Generally, when a signal is received, the program controlling each scheduler/controller 30 or 44 looks at the signal to see if it should react. For global signals, such as time and date information, a reaction is programmed to always occurs. For other signals, the program must examine the address code to see if the signal is intended for that scheduler/controller 30 or 44.

The fifth and sixth characters represent the device number being addressed, (fifth character) and the event information (sixth character). The fifth character will be any number between "0" and "9" and represents devices "0" to "9" if the first character is a "0" and devices "10" to "16" if the first character is a "1". The sixth character may be any number between "0" and "7", which can be converted to a three bit binary code by microprocessor 58. After such conversion, the two low order bits represent how many event commands follow and the high order bit is set if the message is the second of a two part event message. A schedule for any device can consist of up to eight different events, such as turn on a device at a particular time or turn off a device at a particular time. However, each of the Schedule Information signals only contains sufficient room for four event commands, and thus, where more than four are needed, a second Schedule Information signal is needed and this is indicated by the sixth character being one of the numbers four through seven.

Following the sixth characters are four event commands of four character each. The first event command is contained in characters seven through ten, the second event command in characters eleven through fourteen, the third event command in characters fifteen through eighteen and the fourth event command in characters nineteen through twenty-two. Diagram B of FIG. 6 illustrates any of the four character event commands, where the four characters of each event command are labeled only as first, second, third and fourth. For the first two characters of an event command, only the digits zero through seven may be used, and these digits are then converted into a three bit binary code by microprocessor 58. Hence, the first and second characters are shown as containing a "Not Used" most significant bit.

The high order bits of the three bits used in the first and second characters of each of the four event commands are dedicated to defining a day designation; hence they are referred to as the day flags. Since there are eight bits available for the day flag (two in each of the four event commands) each of the eight day designations, Sunday through Saturday and Holiday, may be specified by simply placing a "1" in the appropriate location of the appropriate command. It should be recalled at this point that each Schedule Information message is limited to one device for one day, with a maximum of eight different events for that device on that, day being controllable.

Generally, an event command for water heater and automation control unit 28 will be an "on" or "off" command, followed by a time to execute the command, although for some appliances, such as lights with dimmers, intermediate degrees of "on" are possible. An event signal for the HVAC control unit 26 is a mode change at a specified time. In any case, the time may be a specified time, or it may be an offset from either sunrise or sunset.

As seen in Diagram B of FIG. 6, the higher ordered bits are shown on the left and the lower ordered bits are shown on the right. The highest order bits of the first and second character are not used and the second highest order bits are dedicated to the day flag, as explained above. The two low order bits of the first event command character manifest the command itself. For a Schedule Information message being provided to water heater and automation control unit 28, the two bit command to the device designated in character five may be as follows:

| | |
|---|---|
| "0–0" | - Off |
| "0–1" | - On |
| "1–0" | - High |
| "1–1" | - Low |

The "High" and "Low" manifestations are intermediate settings of a dimmable light, for, example. For a Schedule Information message provided to the HVAC control unit 26, the two bit command is to enter the designated mode, at the time set out in the remainder of the event command. The designated modes are represented as follows:

| | |
|---|---|
| "0–0" | - Off |
| "0–1" | - Home |
| "1–0" | - Away |
| "1–1" | - Sleep |

The remainder of the Schedule Information message is dedicated to setting forth the time at which the command is to be executed. This time may be expressed either as an absolute time, or as an offset form either sunrise or sunset. If a sunrise or sunset offset time is being expressed, then the two low order bits of the second character will be binary "1-1", as seen in Diagram C of FIG. 6. Otherwise the two low order bits of the second character will manifest the tens digit of the absolute time, as seen in Diagram B of FIG. 6. As seen in Diagram B, for a nonsunrise/sunset time, the third character of the event command is the units digit of the hour and the fourth character represents the number of five minute increments past the hour designated by the second and third characters. With this arrangement, any time on a twenty-four hour basis in five minute increments, except times ending in XX:50 and XX:55 can be selected. While this is somewhat of a limitation, most events will be programmed on a quarter hour mbasis, and thus, the inability to program the occurrence of an event at fifty or fifty-five minutes past the hour is not significant.

Referring to Diagram C of FIG. 6, the organization of the information for a slunrise/sunset offset is shown. The first two characters and th e fourth character are as described with respect to Diagram B of FIG. 6. However the third character, for a sunrise/sunset offset time is limited to digits zero through seven, which converts to a three bit binary code. When the high order bit is a fill, it designates an offset from sunset and when it is a "0", it designates an offset from sunrise. If the middle bit of the three bits of the third character is a "1", the offset is to be subtracted from the designated sunrise or sunset. On the other hand, if the middle bit of the three bits of the third character is a "0", the offset is to be added to the designated sunrise or sunset. If the low order bit of the third character is "1", then sixty minutes is to be added to the zero to forty-five minutes value in the fourth character. If the low order bit of the third character is a "0", then the value in the fourth character is the offset.

Referring now to FIG. 7, two Diagrams A and B, are shown. Diagram A illustrates the composition of the Time, Date anld Daylight Message is shown and Diagram B illustrates the Holidaiy message. The Time, Date and Daylight message of Diagram A and the Holiday message shown in Diagram B are provided to all control units 26 and 28 which respond to the pager telephone number. The Time, Date and Daylight message of Diagram A is periodically provided such as every fifteen minutes, in order to maintain the correct time for all control units 26 and 28 and in order to provide certain sever cold weather information in a timely manner. In addition, the time of sunrise and sunset is adjusted every day. The Holiday message, seen in Diagram B of FIG. 7, on the other hand, is only provided twice a day on the day before the designated holiday.

Referring specifically to Diagram A of FIG. 7, the I/D in the first character is a "12", indicating either a Time, Date and Daylight message or a Holiday message. For a Time, Date and Daylight message, characters two through five indicate the time, with characters two and three manifesting the current hour on a twenty four hour basis, and characters four and five manifesting the minute. In character two is a "13", then the Holiday message, shown in Diagram B, is indicated, as no hour can begin with a tens digit of three. Character six is a code from zero to seven indicating the day of the week. Specifically, characters zero through six represent Sunday through Saturday respectively, and character seven represents a holiday.

The next six characters of the Time, Date and Daylight message represent the current date, with characters seven and eight representing the month, characters nine and ten representing the day of the month and characters eleven and twelve representing the last two digits of the year. Character thirteen is sever cold temperature flag, which is set whenever very cold weather is anticipated and used in disabling a heat pump and enabling heat strips. Finally, characters fourteen and fifteen are an offset value from 4:00 AM in five minute increments to sunrise and characters sixteen and seventeen are an offset value from 4:00 PM in five minute increments to sunset. Characters eighteen through twenty represent the Julian Day count, which is the cumulative day count in any year, beginning with January 1 as day one. Characters twenty-one and twenty-two are not used and normally are zero and character twenty-three is a checksum digit.

The Time, Date and Daylight message is also used by each of the control units 26 and 28 to reset the proper time after a power-outage. It should be noted that the power supply includes a large capacitor attached, to the power output supplying RAM 60. This capacitor maintains power for up to two weeks in the event of a power outage, so the data stored in RAM 60 is not lost. However, the clock circuit 66 and microprocessor 58 are not operated during power outages and thus the time and date needs to be updated. Thus, the Time, Date and Daylight message is provided frequently, such as every fifteen minutes, to update the time and date information.

Diagram B of FIG. 7 shows the composition of the Holiday message, which is indicated if character one is a "2" and character two is a "3". Character three is not used and the sixteen characters four through nineteen are each limited to digits "0" through "7". Thus, the sixteen digits in characters four through nineteen may be used to represent forty-eight different predesignated holidays by decoding these digits to a binary coded decimal format and ignoring the high order bit. As will be explained hereafter with respect to the initialization message in FIG. 9, each user of system 10 may designate only those of the pre-designated available holidays that are appropriate to the user's life style. In addition, users may designate their own holidays using the system parameter message shown in Diagram F of FIG. 13B. Finally, characters twenty through twenty-two of the Holiday message of Diagram B of FIG. 7 represent the Julian day and character twenty-three is a checksum, digit.

Referring now to FIG. 8, a diagram illustrating the Weather Infiormation message is shown. The Weather Information message begins with an I/D code of "3" and is broadcast to all control units 26 and 28, either when the we ather changes, or alternately, one or more of these messages may follow the broadcast of the Tiume, Date and Daylight message. The second character is a number between zero and nine manifesting a type of weather indicator. For example, rainy, cloudy, humid, hot, sunny, and so forth may be represented by different numbers in character two. The next twenty characters manifest a two digit value for the identified weather information in each of ten different weather zones. A "00" in a zone portion of the weather message indicates that no change from the last weather message has occurred and any other number iiay indicate the degree of the type of weather indicated by the digit in character two. Each control unit 26 and 28 is programmed to know into which zone it falls, and thus,, there the weather information is more localized than the area served by the paging transmitter. The final digit of the weather message is the checksum digit.

Referring now to FIG. 91 a diagram illustrating the Initialization message is shown and begins with an IID code of "14". The Initialization message is generally provided in response to a telephone call to the customer command center computer 22, normally by an installer, at the time the customer premise equipment is installed. The Initialization message may be used to set the various parameters to the predefined default values, or it may be issued merely to see if the pager receiver 32 or 46 is set in the facility at a location to receive pager signals. The second through fourth characters manifest the address of the particular control units 26 and 28 requesting the initialization. The fifth character may be "0", "1", "3", "5" or "6" to indicate the type of information being transmitted in the following characters. Finally, the twenty-third, or last digit, is a checksum digit. Specifically, if character five is a "0", then no data follows and if character five is a "1", then the data in the locations sjLx through twenty-two is the default settings for various seventeen devices being controlled by facility automation control unit 28. These characters may each contain a value between zero and three. Similarly, if character five is a "3", then the data in characters six through twenty-two is the default settings for various HVAC parameters used in HVAC control unit 26. If character five is "5", then the data contained in characters six through twenty-one manifests the user's selection of the appropriate pre-designated holidays. The encoding for characters six through twenty-one is the same as described above with respect to characters four to nineteen in Diagram B of FIG. 7. Finally, if character five contains the value "6", then characters six and seven contain a two digit house code and characters seven and eight contain a two digit weather region. This information is used to designate the weather zone for the user in order to respond to the weather message shown in FIG. 8.

Figure 10:
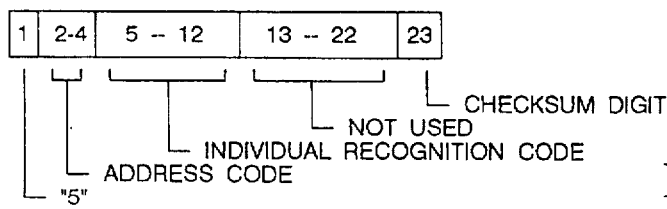
FIG. 10 illustrates the makeup of the Utility Company Setup message sent from the utility command center computer to a pagier receiver in a control unit.
Figure 11:
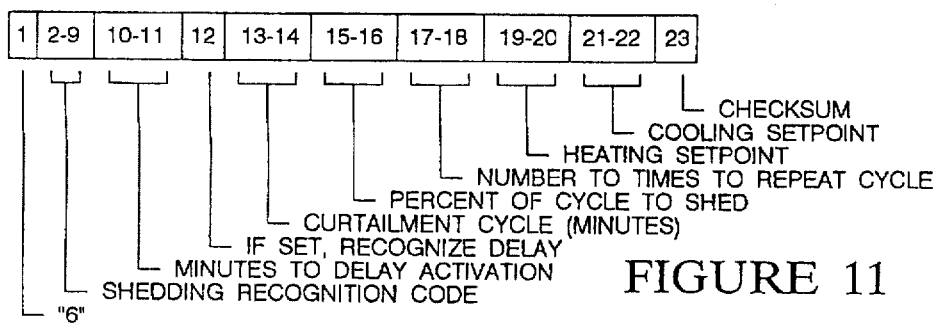
FIG. 11 illustrates the makeup of the Utility Company Initialization message sent from the customer command center conputer to a pager receiver in a control unit.

Referring now to FIGS. 10 and 11, two messages initiated by a electric power utility company may also be sent to individual ones of the control units 26 and 28. These messages are used by the utility company to assist it in more equitably reducing power consumption under circumstances when the potential demand for power exceeds the ability of the utility company to generate power. In the past, the utility company has turned off the power completely for selected user groups or load groups when load reduction was required. In the past, there has been no ability for the utility company merely reduce the energy usage of selective devices, as opposed to completely disabling the devices for predetermined periods of time.

Alternate methods of reducing power loads are preferable to completely eliminating the power from an entire neighborhood. For example, a reduction in power consumption can occur by raising the temperature which all air conditioners begin cooling and this reduction in power consumption over a slightly wider area may be as great as the consumption reduction from turning off all power to a given neighborhood. Alternatively, a reduction in power may be achieved by merely permitting an air conditioner or water heater to run for only a certain time, or to run only after a certain time has elapsed since the last operation. In the latter cases, the convenience for the consumer is much better since all power is not reduced and some air conditioning or hot water generation is still available. The two utility company messages shown in FIGS. 10 and 11, operating in conjunction with the other equipment described above, permits an improved manner of permitting a utility company to reduce consumption.

The Utility Setup Message, seen in FIG. 10, begins with an I/D character of "5" and is sent to a specific control unit 26 or 28 addressed by characters two through four. Following the control unit address, an eight digit Individual Recognition Code contained in characters five through twelve is sent and stored in the RAM memory 60 associated with microprocessor 58. The particular eight digit Individual Recognition code is developed by the utility company in order to permit equitable power reduction among its customers and may be unique for each control unit 26 or 28, or unique for every control unit 26 or 28 in a selected area. It should be noted that the Utility Company Setup message is only sent to those customers of the utility company agreeing to participate in the power reduction program, for which the utility company must give some concessions, such as a lower rate to encourage participation.

In the recognition code, only the digits zero through eight are used, so that when the code is later addressed by the Utility Company Activation message, the character nine can be used as a wildcard, or a digit not requiring a match to be recognized. An example of a recognition code may use the first digit to designate the particular utility company, the next two digits to designate a utility company division, the next three digits to designate a region within a division, and the final three digits to identify a sector within a region. It is necessary to use at least one character to designate the particular utility company because the area served by a paging system may cover areas covered by more than one utility company.

Once each participating facility has been setup with a recognition code, the utility company can selectively address those control units 26 and 28 for which it desires to reduce consumption. This is accomplished by transmitting the Utility Company Activation message, seen in FIG. 11. The Utility Company Activation message is broadcast to all control units 26 and 28 and begins with the I/D character "6". Next the message has an eight digit Shedding Recognition Code, which is generated by the utility company to access those control units 26 and 28 which are to be controlled to use less power. Because of the ability to use the wildcard digit "9" in the recognition code, a large number of control units 26 and 28 may be reached using a single message, or alternatively, only those control units 26 and 28 in a specific territory requiring load reduction may be selected. For example, a recognition code of 19999008 may address every control unit 26 or 28 served by utility company "1" within sector 008 of all regions and divisions. After the Shedding Recognition Code, the remainder of the Utility Company Activation message contains various instructions and parameters dictating the manner in which the loads are to be reduced.

It should be understood that each of the HVAC control units 26 only control heating and air conditioning units, so the program therein responds to the Utility Company Activation message in a manner consistent with reducing the power consumption of a heating or cooling unit. On the other hand, the water heater and automation control unit 28 controls both a water heater, which consumes a substantial amount of energy and up to sixteen additional devices, such as lights, pumps, appliances and the like, which typically do not consume as much power. Thus, the water heater and automation control unit 28 may be programmed to only respond to power curtailment for the water heater, but not for the remaining items, such as lights and small appliances, being controlled. This is easily done, since the water heater is always device zero, whereas the remaining devices being controlled may be assigned any device number from one to sixteen.

The remaining data in the Utility Company Activation message permits various load reduction strategies to be adopted. For example, characters ten and eleven contain a two digit number manifesting, in minutes, a time to delay activating the load reduction operation. Character twelve, if set, indicates that the delay is to begin and end in a randomized manner over the set delay time, so that all units do not turn on at the same time after the reduction period. This technique permits total deactivation of the energy consuming device in a randomized order if desired.

The next six characters of the Utility Company Activation Message permits the energy usage of the heating/cooling units 38 or water heater 52 to be reduced, but not totally taken out of service. Specifically, characters thirteen and fourteen contain a two digit entry representing a time, in minutes, of a curtailment cycle, characters fifteen and sixteen contain a two digit numbier representing the percent of the cycle during which the loald reduction is to occur and characters seventeen and eighteen contain a two digit character representing the number of times to repeat the cycle. With this data, the control units 26 and 28 respond by disabling the heating/cooling units 38 or water heater 52 for a certain percentage of each defined cycle time. For example, a cycle may be defined as thirty minutes and the percent of the cycle to reduce the load may be fifty percent; thus, during the first fifteen minutes of each half hour, the water heater 52 or heating/cooling unit 38 is disabled. Further, this cycle may be repeated as many times as directed.

The next four characters of the Utility Company Activation message is used only with respect to HVAC control units 26. Characters nineteen and twenty contain a two digit heating setpoint temperature and characters twenty-one and twenty-two contain a cooling set-point temperature. By sending a Utility Company Activation message with these set-point temperatures, the utility company can merely affect at what temperatures the heating or cooling occurs. For example, in hot weather, the utility company can limit air condition to a certain temperature, such as for example, 840° F. and in cold weather, the utility company can limit the temperature at which heating occurs, such as for example 65° F. In the past, it has never been possible to adopt a mandatory power load reduction strategy by merely adjusting the interior temperatures at which heating or cooling occurs. However, power companies have historically requested voluntary compliance with this type of strategy without the ability to enforce adherence.

Figure 12:
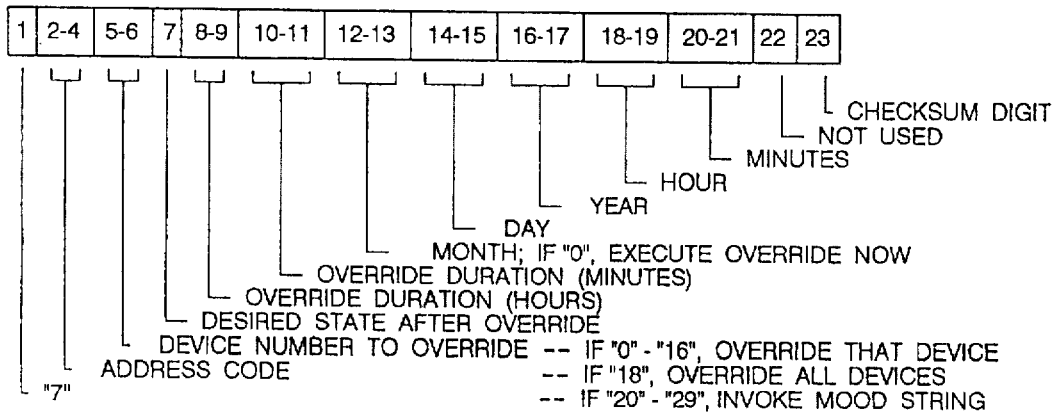
FIG. 12 illustrates the makeup of the User Override message sent from the customer command center computer to a pager receiver in a control unit.

Referring now to FIG. 12, a diagram illustrating the User Override message is shown. As previously noted, the user can manually override certain modes in the HVAC control unit 16 using the ON key 84 of thermostat 42. Generally, an override means to return the unit being controlled to the normal setting when the facility is occupied. In the case of HVAC control unit 26, this means returning the mode to the HOME mode of operation where the temperature heating set-points are at the highest value and the cooling set-points are at the lowest value. With respect to the water heater and automation control unit 28, the water heater, for example, will be permitted to heat the water, whereas the normal schedule for the water heater is to be disabled during periods of time no one occupies the facility.

In certain instances, a user of system 10 may desire to return home prior to a normal return time, and in such instance, would want the home at the proper HOME mode temperature and the water heater ready to provide sufficient hot water for a shower. This can be done by simply calling the customer command center computer 22 and directing that the control units be overridden for certain energy consuming devices. The manner in which the user communicates with the customer command center computer 22 will be described hereafter. After a proper order has been received by the customer command center computer 22, the User Override message is transmitted over the paging network.

As seen in FIG. 12, the first digit of the User Override message is a "7", and is followed by the three digit address code for the control unit 26 or 28 being overridden. Next, characters five and six contain a two digit code manifesting the device number of the device to be overridden. Thus, normally, characters five and six will contain a value between zero and seventeen. If the value in characters five and six is eighteen, then all devices being controlled are designated to be overridden to the default value. Finally, if the value in character 5 is a two, then, the override is designated to a specific set of states for the devices being controlled. This is referred to herein as a mood string and may be any combination of devices operating previously designated by the user. Next, character seven contains a single digit manifesting the desired state of the device after the override. This digit may be between zero and three and may be similar to the Command code in an Event command of the Schedule Information message, as described above with respect to diagram B of FIG. 6. Next, the User Override message contains, in characters eight through eleven, four digits representing the hours and minutes of the desired override.

In some instances, the user does not desire to have the override occur until some point of time in the future, as opposed to immediately. In order to permit this future scheduling of override messages, characters twelve through twenty-one permit a date and time for the override to occur. Specifically, characters twelve and thirteen contain a two digit code representing the month in which the override is to occur, characters fourteen and fifteen contain a two digit code representing the day of the month in which the override is to occur, characters sixteen and seventeen contain a two digit code representing the year in which the override is to occur, characters eighteen and nineteen contain a two digit code representing the hour at which the override is to occur and characters twenty and twenty-one contain a two digit code representing the minute at which the override is to occur. In this scheme, character twenty-two is not used and as usual, character twenty-three is a checksum digit.

Referring now to FIGS. 13A and 13B, the System Parameter message is illustrated using diagrams A through F. The System Parameter message is used to permanently program the control units 26 and 28 and is used initially by the installers at initial installation and thereafter by the user any time a permanent schedule parameter change is desired to be implemented. This message should be contrasted with the Schedule Information message, which is used to send the time of various schedules, whereas the System Parameter message is used to set the parameters to be used at the time a particular scheduled event is to occur. For example, the Schedule Information message programs the scheduled time for HVAC control unit 26 causes the interior temperature to change as a result of a change from the AWAY mode to the HOME mode. On the other hand, the System Parameter message programs the various setpoint temperatures during the HOME an AWAY modes.

The basic System Parameter message is shown in diagram A of FIG. 13A, and begins with the I/D character "8" as the first character, followed by the three digit address of a control unit 26 or 28 as characters two through four. Next, character 5 contains a Type code, which may be the digits one through six, respectively manifesting:

Type 1—Device low level values Type 2—Device high level values Type 3—HVAC temperature set-points Type 4—Mood Strings Type 5—First Five User Selected Holidays Type 6—Second Five User Selected Holidays After the type character, the next seventeen characters, six through twenty-two, contain the message portion of the System Parameter message. The message portion of the various types of System Parameter message are shown in Diagrams B and C of FIG. 13A and Diagrams D, E and F of FIG. 13B.

Diagram B of FIG. 13A shows the format of the type 1 and type 2 message portions of the System Parameter message. The type 1 message specifies the low dimming level for up to seventeen devices (designated as devices 0 through 17) under control of control unit 20, whereas the type 2 message controls the high dimming level for those seventeen devices. As seen in diagram B, the format of the message portion of the type 1 or type 2 System Parameter message is a single digit having a value of between zero and nine in each of character positions six through twenty- two, each representing devices zero through sixteen respectively.

Diagram C of FIG. 13A shows the format of the type 3 message portion of the System Parameter message, which is used to set the various temperature set-points in an HVAC control unit 28. The format is a series of two digit value in character positions six through twenty-one, representing the following set-point values:

| Characters | 6–7 | - Home Heating Set-point Temperature |
| Characters | 8–9 | - Home Cooling Set-point Temperature |
| Characters | 10–11 | - Away Heating Set-point Temperature |
| Characters | 12–13 | - Away Cooling Set-point Temperature |
| Characters | 14–15 | - Sleep Heating Set-point Temperature |
| Characters | 16–17 | - Sleep Cooling Set-point Temperature |
| Characters | 18–19 | - Off Heating Set-point Temperature |
| Characters | 20–21 | - Off Cooling Set-point Temperature |

Character 22 is not used in the type three System Parameter message.

Referring now to FIG. 13B, Diagrams D and E represents the Type 4 Mood String message, which occurs when character five of the System Parameter Message is a "4". Up to ten different mood strings can be designated by the user and these are identified by the value ("0" through "9") in character six. As noted above, a mood string is activated by the override message discussed above with respect to FIG. 12. Each mood string may include up to seven different events, and each event is respectively specified in the next seven character pairs eight-nine, ten-eleven, twelve-thirteen, fourteen-fifteen, sixteen-seventeen, eighteen-nineteen and twenty-twenty-one. Character twenty-two is not used and character twenty-three contains the checksum digit.

Each of the two character events of the mood string message are shown in diagram E of FIG. 13B. The highest order bit of the binary decoded version of the first event character is not used. Thus, the first event character of a mood string message may only contain values of "0" through "7". The next highest order bit of the first event character represents the tens digit of the device number and the two low order characters of the first event character are the status of the designated device to be controlled, represented as follows:

| "0–0" | - OFF |
| "0–1" | - ON |
| "1–0" | - LOW |
| "1–1" | - HIGH |

Finally, the second character of the event represents the units digit of the device number.

Referring now to FIG. 14, the final type of message is seen which can be sent from transmitter 20 to the various control units 26 and 28 is the Expanded message. The Expanded message format may be defined to use the eighty character alpha-numeric paging signal. Thus, each of the eighty characters of the expanded message may contain any value between zero and "255". However, to prevent this signal from interfering with the equipment described herein, the first character cannot begin with values between zero and eight.

With the exception of the Time, Date and-Daylight message and Holiday message shown in FIG. 7 and the Weather Information message shown in FIG. 8, which are automatically sent out at a periodic interval, the remaining messages require some direction to the customer command center computer 22 in order to cause a transmission. Except for the Utility Company Setup and Utility company Activation messages, shown in FIGS. 10 and 11, this communication is normally from the homeowner or installer and normally occurs via telephone. Within the customer command center computer 22, an automatic telephone communication system is used, in conjunction with a digitized voice platform, to request actions desired by the caller be designated by pressing various buttons on a telephone. In order to initiate a message, the caller must first enter his or her own telephone number, followed by a personal identification number (PID). Based upon that information, the customer command center computer 22 can determine the identity of the user, the type of controllers 26 or 28 installed and the type of equipment being controlled by each control unit 26 or 28. Wilth this information, the customer command center computer 22, through pre-programmed voice messages accessing the digitized voice platform, then asks various questions which can be answered by pressing the keys on a DTMF tone telephone.

Generally, a customer can select one of the many pre-defined schedules which are published to the user and assigned a number. For example, a published heating/air conditioning schedule, which includes heating or cooling sleeping areas, may be as see FIG. 15. If the homeowner has a second heating/cooling unit which is only used to heat or cool common- areas where no person sleeps, a similar schedule to that shown above is used, but all codes are increased by one. The principal difference is that if the second mentioned schedule is used, the AWAY mode set-points are used in place of the SLEEP mode set-points. In using the published schedule, a person's home occupancy and sleeping habits may be conveniently entered by merely entering a three digit number for each day. However, if a person's occupancy and sleeping habits are not included in the published schedules, a custom schedule may be entered, although it may a longer time to enter the data. Alternatively, the provider of the service may enter the customized schedule for its customers based upon information provided by the customer.

Similar schedules are published for times hot water is needed, lights are to be automatically turned on or off, pool pump or sprinkler motors are to be turned on, and the like. With respect to the lights, the schedules may be based on turning lights on at or a fixed time from sunset and turning them off at or a fixed time from sunrise.

In addition to the published schedules, the customer command center computer 22 permits the user to identify appliances placed on the X-10 bus by their common name or in the case of lights, by a room identification. For example, device number one may be the coffee maker, and device number two may be the lights in "Boy's Room", or "Third Bedroom".

A typical conversation between a user and the customer command center computer 22, where the user wishes to turn the water heater on for the next two and a half hours--, may be as follows:

Computer: Hello, this is the Command Center. Please enter your
home area code and telephone number.
Customer: enters ten digit number.
Computer: Thank you. Please enter your personal identification number.
Customer: enters four digit PIN code.
Computer: Thank you. You are now at the Main Menu. Please choose a category. For Heating and Air Conditioning, press 1; for water heating, press 2; for lights that your only turn on or off, press 3; for lights that you dim, press 4; for appliances, press 5.
Customer: presses 2.
Computer: Water Heater, Actions choices follow: To override ON, press 1; to override off, press 2; to return to your normal schedule, press 3; to assign an energy guide schedule, press 4; to return to the main menu, press *.
Customer: presses 1.
Computer: Please enter the override duration in hours and minuters. First enter the number of hours.
Customer: enters 2.
Computer: Now enter the number of minutes.
Customer: enters 30.
Computer: To put your water heater on for two hours and thirty minutes, press 1. To choose a different action for this device, press 2. To return to the main menu, press *.
Customer: presses 1.
Computer: Your water heater will be overridden on for two hours and thirty minutes. Thank you for calling the Command Center. Good-bye.

Attached hereto as Appendix I is a listing of the various words and phrases which can be generated by the digitized voicie platform of customer command center computer 22.

Within customer command center computer 22, a database ins maintained containing information regarding each user. Such information includes the types and names of the various equipment of each user, the modes of operation and schedules as programmed byd the user, the various set-point temperatures and other parameters as set by the user, and so forth. When the user calls the customer command center computer 22, the program therein uses the data base and the prior responses of the customer to generate the next appropriate series of choices for the user. The query generated by customer command center computer 22 that is common for each customer is the request to enter the telephone number and personal identification code. Even the main menu is uniquely generated for the customer, because some customers will not control items other than HVAC units, whereas others will control many different energy consuming devices. Thus, unlike other systems, there is no set series of programmed queries, but rather, each user has a unique sequence of queries, built from the data stored in the database record for that user and in response to prior queries.

Figure 16:
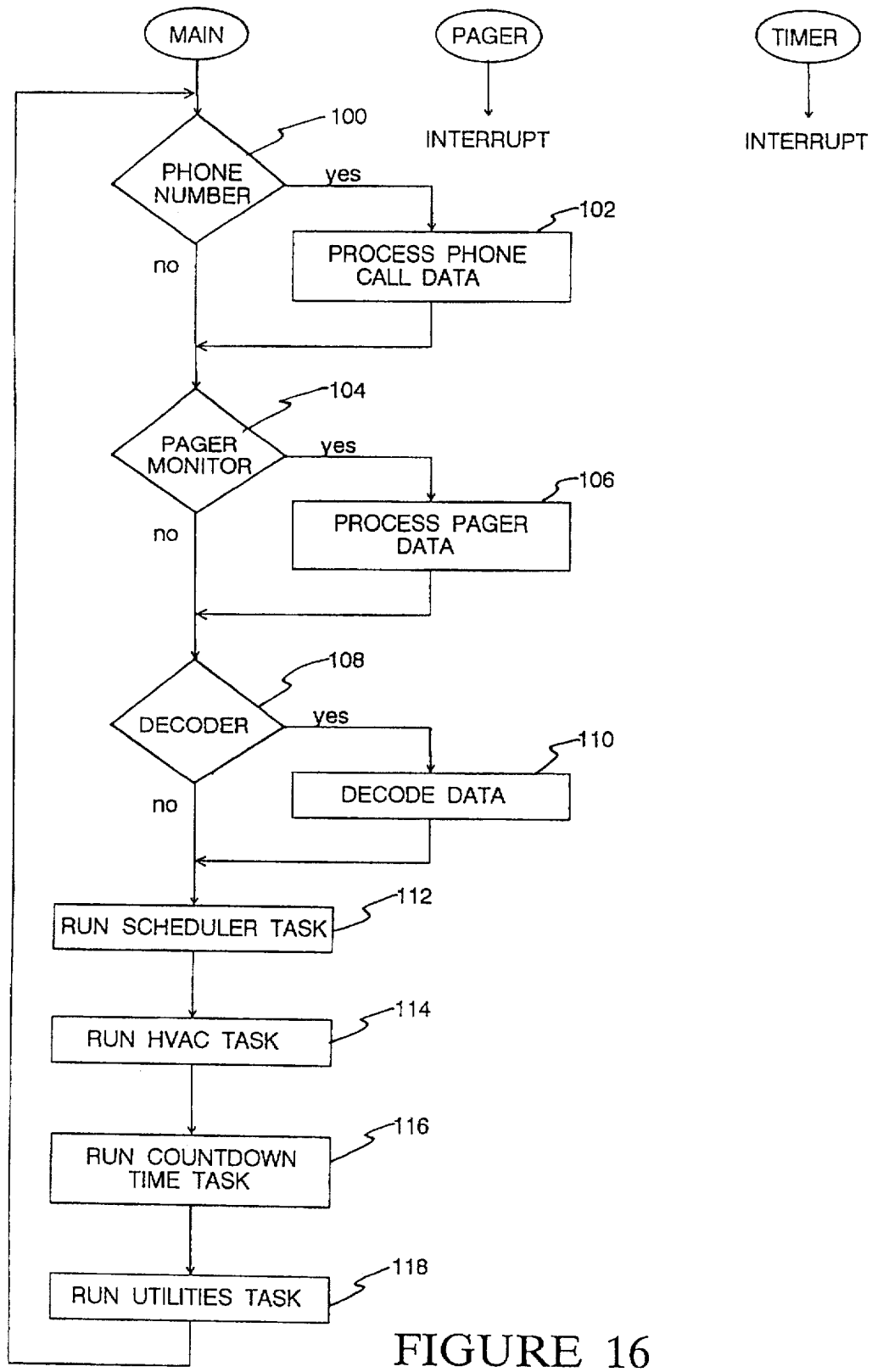
FIG. 16 is a general flow diagram useful in understanding, the operation of the program controlling the microprocessors used in the control units.

With respect to the Utility Company messages, seen in FIGS. 10 and 11, they may generated by the utility company and provided directly to transmitter 20, or through customer command center computer 22 for transmission to the various control units 26 and 28. Referring now to FIG. 16, a broad view flow diagram of the program controlling microprocessors 58 in FIGS. 3A and 3B is shown. A copy of the object code of the entire program is attached hereto as Appendix II. By constructing the apparatus described herein in FIGS. 3A or 3B and placing the program set out ire Appendix II, the operations described herein are obtained. The set of instructions constituting the program for microprocessors 58 is contained in EPROM 62 and the general operation of microprocessor 58, RAM memory 60, EPROM memory 62 in operating microprocessor is well known. Generally, the program merely proceeds through a loop checking if various activities are required to be performed. In addition, two interrupt signals can occur, which cause a deviation from the main program to service the interrupt. The highest priority interrupt is the TIMER signal, which occurs every 8.33 milliseconds, and is provided to the non-maskable interrupt (NMI) input of microprocessor 58. Whenever a TIMER signal occurs, the time of day-counter is updated, whereby, the correct time is always maintained.

The other interrupt signal occurs whenever the pager receiver 32 or 46 has received a message. As this signal is received by the pager receiver 32 or 46, it is decoded and saved in a seven segment format. After the pager message is received and decoded, it is provided as the PDATA serial signal to the display output lines of the pager receiver 32 or 46, one bit at a time, in synchronism with the CLOCK signal. As previously noted, the first CLOCK signal of a new message also interrupts microprocessor 58, which disables the INT input for a time sufficient to permit the entire PDATA message to be transmitted to shift register 82. The first panel of eleven or twelve seven segment signals are then stored in shift register 82 while the INT interrupt is disabled. After the interrupt disable time expires the data stored in shift register 82 is read by microprocessor and each bit is stored in an appropriate memory location relating to which character and. segment it represents. After all ninety two bits are transferred and the eighty-four segment bits are appropriately sorted and stored, the program of microprocessor 58 causes a seven segment to BCD (binary coded decimal) decoding for each sorted character to occur using conventional table look-up techniques. Thus, if a seven segment sorted group of signals represents a "9", the decoding results in a "1-0-0-1" being stored as the particular character.

After the first panel of the message is transferred to microcomputer 58, the READ signal is caused to issue and the above procedure is repeated for the second panel of the twenty-three character message. At this time, the entire pager message is stored in RAM 60 in a manner which can be acted upon by the remainder of the program of microprocessor 58. This may be indicated by setting a pager message flag.

The Main loop of the program controlling microprocessor 58 begins at block 100 by determining if the telephone interface 36 or 48 requires servicing. If telephone interface service is required, then according to block 102, the information sent to the telephone interface 36 or 48 is processed. Typically, such information will only occur during installation and will consist of the Initialization messages, seen in FIG. 9, or the initial Schedule Information messages seen in FIG. 6. The processing consists of storing the information received in the appropriate portions of RAM 60. Any other two way communication over telephone lines between system 10 and other points is also handled at block 102. For example, if system 10 or the telephone interfaces 36 or 48 are extended to include an auto-dialer and one or more of the X-10 devices 56 serves as a meter reading device, then the results of the meter reading would be sent to the utility company at this point using the telephone interface module. Alternatively, a utility company could pole the data saved by HVAC controller 34 to determine if energy were being efficiently used.

If the telephone interface does not require servicing, or if the servicing is completed, then the next event, as indicated by block 104, is to determine if a paging signal has caused information to be stored in shift register 82. This may be determined by determining if a pager interrupt has occurred and expired, thereby indicating that the pager data is stored in shift register 82. If so, then, according to block 106, the pager data is transferred to microprocessor 58, sorted and stored in RAM 60.

Then, according to block 108, a determination is made whether all of the data from shift register 82 has been stored in RAM 60 and is ready for decoding. If so, block 110 caused the stored seven segment data to be checked and, if proper, decoded. After decoding, the data is stored in the appropriate portions of RAM 60, as appropriate, or other actions dictated are performed in response to the message. For example, if the message provides a new HOME mode heating set-point temperature, the value of that new parameter is stored in RAM 60 and a flag is set indicating the new value Ls to be provided to the HVAC controller 34.

Next, various tasks are performed, as necessary, and thereafter, the entire Main loop is repeated. The various tasks performed in each loop are the Scheduler task, as indicated by block 112, the HVAC task, as indicated by block 114, the Countdown Time task, as indicated by block 116 and the Utilities task, as indicated by block 118. The Scheduler Task module 112 generally determines if it is time to turn on or turn off some appliance being controlled by water heater and automation controller 28 and then provides the appropriate signal to accomplish that task. It also keeps track of the current state of all devices being controlled. In calculating the next event to be performed, the Scheduler considers,the program schedule, the unprocessed customer override messages and any current utility override messages.

The scheduler module also considers an advanced start time (explained hereafter with respect to block 114), which is a time to reach the proper set-point temperatures when changing to a more demanding mode. This advance start time permits the temperature of the facility to be correct when the change of modes occurs. When conflicts in the schedule of events to occur results, the priority is first, the utility override, second, the user override, third, the advance start time and finally, the schedule itself. The scheduler also determines whether a device is already in the scheduled state at the time it finds an event is to occur, in which case, the event is ignored. For example, a light may be scheduled to be turned on at a certain time, but previously had been turned on by a user override message. In such case, no signal is sert again turning that light an.

The HVAC Task module 114 determines three variables which are used by the scheduler module 112 in providing proper data and control information to the HVAC controller 34. The three variables determined by the HVAC task module 114 are calculating the advance start time, monitoring the heating or cooling demand and monitoring whether heat strips are required in the event a reverse cycle heat pump is used as the heating/cooling unit 38. The manner in which the HVAC task module 114 performs these functions will be described hereafter.

The key to the operation of the Scheduler Task module 112 and HVAC Task module 114 is knowing the time an action is to occur. This time is determined by the Countdown Timer Task module 116 ∫. determine the time an action is to occur, a schedule is maintained for all devices being controlled for the entire week. Then, the next event is determined from the schedule and a timer is set to indicate when that next event is to occur. The basic schedule is primarily a day scheduler, which contains up to one hundred entries, each containing up to eight events and the time of each events for a single device. For some events, it is necessary to calculate the time for each event based upon information provided to microprocessor. For example, the lighting commands based upon sunset and sunrise times must be calculated based upon the sunrise and sunset times provided to controller units 26 and 28 by the Time, Date and Daylight message, shown in FIG. 7.

After the various time tasks are completed, the Utilities Tasks module 118 is executed if any Utility messages have been provided. As previously described, these messages would either be a Utility Initialization message, or a Utility Activation message. If a Utility Activation message is received, the information is transferred to the schedule so that the next time the scheduler task module 112 is executed, the utility order is followed.

As noted above, an advance start time must be calculated. This is the time necessary to raise or lower the temperature to the next mode set-point by the time the next mode commences. For example, where the AWAY mode is to end and the HOME mode is to begin at 5:00 PM, that is, the user returns home from work at 5:00 PM, the user expects the home to be at the HOME mode temperature when he or she enters the facility. Thus, the heating or cooling must begin at some time, referred to herein as the advance start time, prior to the time the person returns. An advance start time is calculated whenever the mode (HOME, AWAY or SLEEP) changes to a more energy demanding mode.

In calculating,the advanced start time for any facility, many factors must be considered, such as, the temperature difference to make up, the outside temperature and other weather conditions, the insulation of the facility and the capacity of the heating/cooling unit 38 being used. In the past, the advance start times have been specified to each energy management systems based only upon the weather factors alone. However, this strategy is wasteful of energy for thermally efficient facilities and generally was too short a time for thermally inefficient facilities, or facilities with under capacity heating/cooling units. The program controlling microprocessor 58 adopts a different approach to determining the advance start and advance stop times. It calculates them based upon historical data for the particular facility and thus obtains a much more accurate advance start or advance stop time.

To calculate the advance start or advance stop times, the program makes use of the data generated by and stored in the HVAIC controller 34. Specifically, program uses a learning algorithm which will adapt over time to changing conditions. Briefly, current demand is monitored and a prediction is made of how much time will be required to attain the temperature goal. Then, the mode change is set to change at this advanced time.

The algorithm uses a weighted average value based upon the most recent heating/cooling history. For example, the most recent current demand values are multiplied by three and added to the next most recent demand value, multiplied by two, and this sum is added to the preceding four next most recent demand values. This sum is then divided by nine to arrive at an average demand value. This history may be limited to only heating or cooling calls during a recent period, such as two hours, and if six events do not occur, only those which do occur are used and then the divisor is adjusted appropriately. The current demand value is the heating or cooling ramp as percent signals and thus will be between zero and one hundred.

With this average demand signal, the following calculation is made by microprocessor to obtain the advance start time:

Advanced Start Time=$\{(\text{Avg. Demand}) (K_1)+(K_2)\}(\delta T)+ K_3(\delta T-4)$ where $K_1$ is a heating or cooling multiplier between zero and sixty (initial setting of twenty) that is constantly modified, as needed, after the fact to have provided the correct value. $K_2$ is a constant equal to a minimum minutes per degree time, which generally is set to a value of one, $\delta T$ is the required temperature change as a result of the new mode, and $K_3$ is a constant used only when $\delta T$ is more than four degrees and is initially set equal to five, although it may be changed by an appropriate message signal. After each advance time calculation, the value of $K_1$ may be adjusted. If after several days, the value of $K_1$ is not relatively constant, than the values of $K_2$ and $K_3$ may also be adjusted by appropriate measures.

In some instances, there may not be any recent heating or cooling demand information and it would not be possible to calculate an advance start time. For example, where the temperature outside is approximately the same as the AWAY set-point, it is not likely that the heating/cooling unit 38 will be turned on. In this situation, the heating/cooling unit 38 is forced on for a defined time and the temperature change is measured. From this information, an approximation of the Average Demand value can be approximated.

When the user's heating/cooling unit 38 is a reverse cycle heat pump, having one or two states of auxiliary electric heat strips, special energy savings strategies are employed. This strategy is based on the fact that the most efficient heating occurs by the heat pump alone, without need for the heat strips. First, the heat strips are disabled in all modes except the most energy demanding mode. Then, the need for the heat strips is monitored and they are only engaged if actually needed. This may be done by monitoring the heat call variable from HVAC controller 34 and if it is at 99, (indicating that the temperature is dropping even though the heating unit is continuously enabled for the entire ramp time), the first heat strip is enabled. If the heat call variable remains at 99 twenty minutes later, then the second heat strip is enabled.

In performing the advance start heating task, it is most desirable to raise the temperature, if possible, using only the heat pump. Thus, after the advance start time is calculated, as explained above, and the heat pump heating/cooling unit 38 is rendered operational, the heat strips are initially maintained off. During the advance start heat recovery period, the rate of recovery is monitored and a determination is made whether the heat pump alone will permit the set-point temperature to be reached by the end of the advanced start period. If not, then one stage of heat strips is enabled and again, the recovery is continually monitored. If it still appears that the set-point temperature will not be reached by the end of the period, the second stage of heat strips are enabled.

There are two situations where the heat strips are permitted to operate in the lower energy consuming modes and in the recovery period. First, if the system is overridden to a higher energy consuming mode by either a manual actuation of the ON key 84 on thermostat 42 or by an override message indicating a change to a higher energy consuming mode, the heat strips are permitted to operate normally. Second, if the severe weather flag is set in the Time, Date and Daylight message, seen in FIG. 7, then the heat strips are permitted to operate and the heat pump is disabled because in cold weather, the heat pump is very inefficient. Once the severe weather flag ceases being set, the heat pump is engaged and the heat strips are disabled.

While the energy management and home automation system of this invention has been described in great detail herein and with many examples, it should be appreciated that many variations and additions are possible, particularly in using the various message structures to command additional functions. Further, other communication links between the command centers 22 and 24 and the controllers 14 and between the controllers 14 and the various devices 18 being controlled are possible. It is also possible to include intelligent devices, such as personal computers, as devices attached to controllers 14 and then to permit various other devices to be attached to the intelligent device.

APPENDIX I

HEX DUMP

```
000000  F3 ED 56 3E  00 32 5C 80  3E D7 D3 03  C3 00 01 00   ..V>.2\.>.......
000010  00 00 00 00  00 00 00 00  00 00 00 00  56 45 52 53   ............VERS
000020  49 4F 4E 20  20 37 2D 30  20 3B 20 53  45 52 23 20   ION  7-0 ; SER#
000030  30 30 30 30  3F 3F 3F 00  F5 E5 3A A5  81 67 3A A4   0000???...:..g:.
000040  81 FE 01 28  0C 3E 01 32  A4 81 26 00  3E 00 32 A7   ...(.>.2..&.>.2.
000050  81 7C 3C 32  A5 81 E1 F1  FB ED 4D 00  00 00 00 00   .|<2......M.....
000060  00 00 00 00  00 00 F5 E5  C3 98 0C 00  00 00 00 00   ................
000070  00 00 00 00  00 00 00 00  00 00 00 00  00 00 00 00   ................
000080  00 00 00 00  00 00 00 00  00 00 00 00  00 00 00 00   ................
000090  00 00 00 00  54 52 41 4E  53 50 4F 4E  44 45 52 20   ....TRANSPONDER
0000A0  43 4F 44 45  20 43 6F 70  79 72 69 67  68 74 28 43   CODE Copyright(C
0000B0  29 20 31 39  38 39 20 54  65 6C 65 74  69 6D 65 72   ) 1989 Teletimer
0000C0  20 49 6E 74  65 72 6E 61  74 69 6F 6E  61 6C 20 49   International I
0000D0  6E 63 2E 42  6F 63 61 20  52 61 74 6F  6E 2C 20 46   nc.Boca Raton, F
0000E0  4C 2E 20 33  33 34 38 37  20 20 20 54  65 6C 3A 20   L. 33487   Tel:
0000F0  34 30 37 2D  39 39 34 2D  39 30 34 34  20 00 00 00   407-994-9044 ...
000100  00 C3 15 01  08 95 73 00  9C 00 A0 FF  FF 60 92 00   ......s......`..
000110  00 00 00 FF  FF 01 23 01  ED 7B 07 01  FD 2A 09 01   ......#..{...*..
000120  C3 27 01 82  0B D5 E5 0A  03 6F 0A 03  67 5E 23 56   .'.......o..g^#V
000130  EB E9 13 EB  5E 23 56 D5  C3 27 01 13  D5 C3 27 01   ....^#V..'....'.
000140  13 EB 5E 23  56 D5 C3 27  01 FD 2B FD  2B FD 71 00   ..^#V..'..+.+.q.
000150  FD 70 01 C1  13 D5 C3 27  01 CD 49 01  D5 01 08 00   .p.....'..I.....
000160  30 04 63 06  B3 08 6D 06  7A 01 FD 2B  FD 70 00 FD   0.c...m.z..+.p..
000170  2B FD 71 00  13 4B 42 C3  27 01 7C 01  FD 4E 00 FD   +.q..KB.'.|..N..
000180  23 FD 46 00  FD 23 C3 27  01 6A 01 AD  05 08 06 77   #.F..#.'.j.....w
000190  06 42 04 9D  05 30 04 8D  05 7A 01 6A  01 F9 05 81   .B...0...z.j....
0001A0  02 28 00 1F  08 1F 08 D5  01 22 00 13  08 CB 08 8B   .(......."......
0001B0  07 19 08 D5  01 22 00 13  08 57 09 57  09 8B 07 19   ....."...W.W....
0001C0  08 1F 08 FA  0B 73 02 04  00 F3 05 7A  01 6A 01 BB   .....s.....z.j..
0001D0  07 19 08 7A  01 D7 01 0A  03 6F 0A 03  67 C3 26 01   ...z.....o..g.&.
0001E0  E2 01 0A 03  6F 0A 03 67  E5 0A 03 6F  0A 03 67 C3   ....o..g...o..g.
0001F0  26 01 F4 01  11 FA FF FD  19 0A FD 77  04 03 0A FD   &..........w....
000200  77 05 03 D9  D1 C1 B7 21  00 80 ED 42  FD 75 02 FD   w......!...B.u..
000210  74 03 19 FD  75 00 FD 74  01 D9 C3 27  01 1F 02 D1   t...u..t...'....
000220  E1 E5 D5 B7  ED 52 C2 F4  01 D1 D1 60  69 4E 23 46   .....R.....`iN#F
000230  C3 27 01 35  02 FD 4E 04  FD 46 05 11  06 00 FD 19   .'.5..N..F......
000240  C3 27 01 45  02 FD 34 00  C2 75 02 FD  34 01 E2 75   .'.E..4..u..4..u
000250  02 11 06 00  FD 19 03 03  C3 27 01 5D  02 D1 FD 6E   .........'.]...n
000260  00 FD 66 01  B7 ED 5A EA  51 02 FD 75  00 FD 74 01   ..f...Z.Q..u..t.
000270  C3 75 02 75  02 60 69 5E  23 56 2B 19  4D 44 C3 27   .u.u.`i^#V+.MD.'
000280  01 83 02 E1  7D B4 CA 75  02 03 03 C3  27 01 90 02   ....}..u....'...
000290  E1 D1 AF ED  52 CA 9C 02  D5 C3 75 02  03 03 C3 27   ....R.....u....'
0002A0  01 6A 01 83  08 63 06 2F  09 6D 06 7A  01 AF 02 E1   .j...c./.m.z....
0002B0  D1 7B D6 30  FA CE 02 FE  0A FA C3 02  D6 07 FE 0A   .{.0............
0002C0  FA CE 02 BD  F2 CE 02 5F  21 FF FF C3  25 01 6C C3   ......._!...%.l.
0002D0  26 01 D4 02  E1 7D C6 30  FE 3A DA DF  02 C6 07 6F   &....}.0.:.....o
0002E0  E5 C3 27 01  E6 02 D9 D1  C1 E1 78 B1  CA FB 02 7E   ..'.......x....~
0002F0  BB CA FB 02  23 0B 78 B1  C2 EF 02 E5  C5 D9 C3 27   ....#.x........'
000300  01 21 00 00  0E 08 29 17  D2 0E 03 19  CE 00 0D C2   .!....).........
000310  06 03 C9 15  03 D1 E1 C5  44 7D CD 01  03 E5 67 7B   ........D}....gx
000320  44 CD 01 03  D1 4A 09 CE  00 55 6C 67  C1 D5 C3 26   D....J...Ulg...&
000330  01 33 03 D9  C1 D1 21 00  00 3E 0F CB  23 CB 12 D2   .3....!..>..#...
000340  43 03 09 29  3D C2 3B 03  B2 F2 4D 03  09 E5 D9 C3   C..)=.;...M.....
000350  27 01 7D 91  7C 98 DA 60  03 21 FF FF  11 FF FF C9   '.}.|..`.!......
000360  78 B4 C2 81  03 EB 06 10  29 7B 8B D2  74 03 91 2C   x.......){..t..,
```

```
000370  5F C3 7B 03  5F 91 DA 7B  03 2C 5F 05  C2 68 03 EB   _.{._..{.,_..h..
000380  C9 3E 10 EB  29 EB ED 6A  D2 91 03 B7  ED 42 C3 98   .>..).. j.....B...
000390  03 ED 42 D2  98 03 09 1D  1C 3D C2 83  03 C9 A0 03   ..B......=......
0003A0  D9 C1 E1 D1  CD 52 03 E5  D5 D9 C3 27  01 AF 95 6F   .....R.....'...o
0003B0  3E 00 9C 67  C9 AF 91 4F  3E 00 98 47  C9 AF 93 5F   >..g...O>..G..._
0003C0  3E 00 9A 57  C9 AF 93 5F  3E 00 9A 57  3E 00 9D 6F   >..W..._>..W>..o
0003D0  3E 00 9C 67  C9 7C A8 F5  C5 7C B7 FC  C5 03 78 B7   >..g.|...|....x.
0003E0  FC B5 03 CD  52 03 C1 78  B7 FC AD 03  F1 F0 CD BD   ....R..x........
0003F0  03 7C B5 C8  1B CD AD 03  09 C9 FC 03  D9 C1 E1 D1   .|..............
000400  CD D5 03 E5  D5 D9 C3 27  01 0B 04 D9  C1 D1 7A B7   .......'......z.
000410  21 00 00 F2  00 04 2B C3  00 04 1C 04  D9 C1 D1 7A   !.....+........z
000420  B7 21 00 00  F2 28 04 2B  CD D5 03 D5  D9 C3 27 01   .!...(.+......'.
000430  32 04 D1 E1  19 C3 26 01  3A 04 D1 E1  B7 ED 52 C3   2.....&.:.....R.
000440  26 01 44 04  E1 23 C3 26  01 4B 04 E1  23 23 C3 26   &.D..#.&.K..##.&
000450  01 53 04 E1  2B C3 26 01  5A 04 E1 2B  2B C3 26 01   .S..+.&.Z..+.&.
000460  62 04 E1 29  C3 26 01 69  04 D9 C1 D1  E1 E3 19 EB   b..)..&.i........
000470  E1 ED 4A D5  E5 D9 C3 27  01 7B 04 D9  C1 D1 E1 E3   ..J....'.{......
000480  B7 ED 52 EB  E1 ED 42 D5  E5 D9 C3 27  01 8F 04 D1   ..R...B....'....
000490  E1 7B A5 6F  7A A4 67 C3  26 01 9C 04  D1 E1 7B B5   .{.oz.g.&.....{.
0004A0  6F 7A B4 67  C3 26 01 A9  04 D1 E1 7B  AD 6F 7A AC   oz.g.&.....{.oz.
0004B0  67 C3 26 01  B6 04 E1 7C  2F 67 7D 2F  6F E5 C3 27   g.&....|/g}/o..'
0004C0  01 C3 04 E1  D1 AF ED 52  67 6F C2 26  01 2B C3 26   .......Rgo.&.+.&
0004D0  01 D3 04 D1  E1 B7 ED 52  E2 DE 04 7C  EE 80 21 FF   .......R...|..!.
0004E0  FF FA 26 01  23 C3 26 01  EA 04 E1 D1  B7 ED 52 E2   ..&.#.&.......R.
0004F0  F5 04 7C EE  80 21 FF FF  FA 26 01 23  C3 26 01 01   ..|..!...&.#.&..
000500  05 D1 E1 AF  ED 52 21 00  00 D2 26 01  2B C3 26 01   .....R!...&.+.&.
000510  12 05 E1 D1  AF ED 52 21  00 00 D2 26  01 2B C3 26   ......R!...&.+.&
000520  01 23 05 E1  7C B7 21 00  00 F2 26 01  2B C3 26 01   .#..|.!...&.+.&.
000530  32 05 E1 7D  B4 21 00 00  C2 26 01 2B  C3 26 01 41   2..}.!...&.+.&.A
000540  05 E1 D1 7C  B5 B2 B3 21  00 00 C2 26  01 2B C3 26   ...|...!...&.+.&
000550  01 53 05 E1  D1 7C B7 21  00 00 F2 26  01 2B C3 26   .S...|.!...&.+.&
000560  01 63 05 D9  E1 D1 C1 B7  ED 42 EB C1  ED 42 7C B5   .c.......B...B|.
000570  B2 B3 D9 21  00 00 C2 26  01 2B C3 26  01 7F 05 21   ...!...&.+.&...!
000580  00 00 39 C3  26 01 88 05  E1 F9 C3 27  01 8F 05 D1   ..9.&......'....
000590  FD 2B FD 2B  FD 73 00 FD  72 01 C3 27  01 9F 05 FD   .+.+.s..r..'....
0005A0  5E 00 FD 23  FD 56 00 FD  23 D5 C3 27  01 AF 05 FD   ^..#.V..#..'....
0005B0  5E 00 FD 56  01 D5 C3 27  01 BB 05 FD  6E 00 FD 66   ^..V...'....n..f
0005C0  01 FD 5E 02  FD 56 03 B7  ED 52 E5 C3  27 01 D0 05   ..^..V...R..'...
0005D0  FD 6E 06 FD  66 07 FD 5E  08 FD 56 09  B7 ED 52 E5   .n..f..^..V...R.
0005E0  C3 27 01 E5  05 E1 C3 2D  01 EB 05 E1  5E 23 56 E5   .'.....-....^#V.
0005F0  C3 2D 01 F5  05 E1 C3 27  01 FB 05 E1  E3 C3 26 01   .-.....'......&.
000600  02 06 D1 E1  E5 C3 25 01  0A 06 E1 E5  C3 26 01 11   ......%......&..
000610  06 E1 E5 7C  B5 CA 27 01  C3 26 01 1D  06 D1 E1 E3   ...|..'..&......
000620  C3 25 01 25  06 E1 29 39  5E 23 56 D5  C3 27 01 31   .%.%..)9^#V..'.1
000630  06 E1 D1 D5  E5 C3 25 01  3A 06 D9 D1  E1 C1 E3 D5   ......%.:.......
000640  E5 C5 D9 C3  27 01 48 06  33 33 33 33  C3 27 01 51   ....'.H.3333.'.Q
000650  06 D9 C1 D1  E1 DD E1 DD  E5 E5 D5 C5  DD E5 E5 D9   ................
000660  C3 27 01 65  06 E1 5E 23  56 D5 C3 27  01 6F 06 E1   .'.e..^#V..'.o..
000670  D1 73 23 72  C3 27 01 79  06 E1 6E 26  00 C3 26 01   .s#r.'.y..n&..&.
000680  82 06 E1 D1  73 C3 27 01  8A 06 E1 D1  7E 83 77 23   ....s.'.....~.w#
000690  7E 8A 77 C3  27 01 98 06  E1 55 5C D5  C3 27 01 A1   ~.w.'....U\..'..
0006A0  06 E1 D1 73  23 72 23 D1  73 23 72 C3  27 01 B0 06   ...s#r#.s#r.'...
0006B0  E1 11 03 00  19 56 2B 5E  D5 2B 56 2B  5E D5 C3 27   .....V+^.+V+^..'
0006C0  01 C3 06 D1  21 00 00 B7  ED 52 C3 26  01 CF 06 D9   ....!....R.&....
0006D0  D1 C1 21 00  00 B7 ED 42  E5 21 00 00  ED 52 E5 D9   ..!....B.!...R..
0006E0  C3 27 01 E5  06 D1 7A B7  FA EF 06 D5  C3 27 01 21   .'....z......'.!
0006F0  00 00 ED 52  E5 C3 27 01  FA 06 D9 E1  D1 44 4D AF   ...R..'......DM.
000700  ED 52 EA 12  07 FA 0D 07  C5 D9 C3 27  01 D5 D9 C3   .R.........'....
000710  27 01 FA 1A  07 D5 D9 C3  27 01 C5 D9  C3 27 01 21   '.......'....'.!
000720  07 D9 E1 D1  44 4D AF ED  52 EA 39 07  F2 34 07 C5   ....DM..R.9..4..
```

```
000730   D9 C3 27 01   D5 D9 C3 27   01 F2 41 07   D5 D9 C3 27    ..'....'..A....'
000740   01 C5 D9 C3   27 01 48 07   21 00 00 C3   26 01 50 07    ....'.H.!...&.P.
000750   21 01 00 C3   26 01 58 07   21 02 00 C3   26 01 60 07    !...&.X.!...&.'.
000760   21 03 00 C3   26 01 68 07   21 FF FF C3   26 01 70 07    !...&.h.!...&.p.
000770   D9 D1 C1 E1   78 B1 CA 7F   07 73 23 0B   C3 74 07 D9    ....x....s#..t..
000780   C3 27 01 6A   01 46 07 6E   07 7A 01 8D   07 E1 5E 23    .'.j.F.n.z....^#
000790   16 00 E5 D5   C3 27 01 99   07 D9 C1 D1   E1 78 B1 CA    .'.......x..
0007A0   A4 07 ED B0   D9 C3 27 01   AA 07 D9 C1   D1 E1 78 B1    ......'......x.
0007B0   CA A4 07 09   EB 09 EB 2B   1B ED B8 C3   A4 07 C0 07    .......+........
0007C0   D9 C1 ED 68   26 00 E5 D9   C3 27 01 CD   07 D1 E1 7A    ...h&....'....z
0007D0   B7 F2 E1 07   7A B3 CA 26   01 CB 3C CB   1D 13 C3 D4    ....z..&..<.....
0007E0   07 7A B3 CA   26 01 CB 25   CB 14 1B C3   E1 07 F0 07    .z..&..%........
0007F0   FD 4E 00 FD   23 FD 46 00   FD 23 C3 27   01 FF 07 E1    .N..#.F..#.'....
000800   36 FF 23 36   FF C3 27 01   0A 08 E1 36   00 23 36 00    6.#6..'....6.#6.
000810   C3 27 01 6A   01 F3 05 7A   01 6A 01 46   06 7A 01 6A    .'.j...z.j.F.z.j
000820   01 7A 01 6A   01 FF FF D5   01 81 00 EF   08 D5 01 20    .z.j...........
000830   00 EF 08 46   07 E1 08 CB   08 7F 08 63   06 08 06 E1    ...F.......c....
000840   08 49 04 63   06 42 04 E1   08 7F 08 6D   06 CB 08 49    .I.c.B....m...I
000850   04 E1 08 46   07 E1 08 D5   01 59 01 A1   02 7A 01 59    ...F.....Y...z.Y
000860   01 81 20 95   73 00 00 01   00 20 80 32   01 22 80 32    .. .s.... .2.".2
000870   01 24 80 32   01 26 80 32   01 28 80 32   01 2A 80 32    .$.2.&.2.(.2.*.2
000880   01 2C 80 32   01 2E 80 32   01 30 80 32   01 32 80 32    .,.2...2.0.2.2.2
000890   01 34 80 32   01 36 80 32   01 38 80 32   01 3A 80 32    .4.2.6.2.8.2.:.2
0008A0   01 3C 80 32   01 3E 80 32   01 40 80 32   01 42 80 32    .<.2.>.2.@.2.B.2
0008B0   01 44 80 32   01 46 80 32   01 48 80 40   01 00 9B 40    .D.2.F.2.H.@...@
0008C0   01 02 00 40   01 20 00 40   01 50 00 6A   01 7B 08 63    ...@. .@.P.j.{.c
0008D0   06 7A 01 6A   01 CB 08 7A   01 6A 01 7B   08 88 06 7A    .z.j...z.j.{...z
0008E0   01 6A 01 56   07 D9 08 CB   08 58 04 6D   06 7A 01 6A    .j.V.....X.m.z.j
0008F0   01 4E 07 D9   08 CB 08 51   04 80 06 7A   01 6A 01 D5    .N.....Q...z.j..
000900   01 0A 00 9F   08 6D 06 7A   01 6A 01 D5   01 10 00 9F    .....m.z.j......
000910   08 6D 06 7A   01 6A 01 8B   07 D5 01 1F   00 8D 04 30    .m.z.j.........0
000920   04 7A 01 6A   01 49 04 7A   01 6A 01 49   04 7A 01 6A    .z.j.I.z.j.I.z.j
000930   01 15 09 29   09 7A 01 6A   01 66 07 AB   08 88 06 AB    ...).z.j.f......
000940   08 63 06 80   06 7A 01 6A   01 9F 08 63   06 DA 09 1B    .c...z.j...c....
000950   06 D2 02 37   09 7A 01 6A   01 C3 08 13   08 7A 01 6A    ...7.z.j.....z.j
000960   01 9B 08 63   06 30 05 89   01 10 63 6F   6D 70 69 6C    ...c.0....compil
000970   61 74 69 6F   6E 20 6F 6E   6C 79 9B 01   7A 01 6A 01    ation only..z.j.
000980   B2 09 89 01   14 69 6E 63   6F 6D 70 6C   65 74 65 20    .....incomplete
000990   73 74 72 75   63 74 75 72   65 9B 01 7A   01 6A 01 89    structure..z.j..
0009A0   01 0C 69 73   20 75 6E 64   65 66 69 6E   65 64 9B 01    ..is undefined..
0009B0   7A 01 6A 01   C1 04 30 05   7A 01 6A 01   E8 04 30 05    z.j...0.z.j...0.
0009C0   7A 01 6A 01   D1 04 30 05   7A 01 6A 01   30 05 B4 04    z.j...0.z.j.0...
0009D0   7A 01 6A 01   79 04 51 05   7A 01 6A 01   BD 05 46 07    z.j.y.Q.z.j...F.
0009E0   AD 05 9E 03   9D 05 F9 05   8D 05 9E 03   9D 05 7A 01    ..............z.
0009F0   6A 01 09 04   F3 05 7A 01   6A 01 8D 05   04 0A 9D 05    j.....z.j.......
000A00   FA 03 7A 01   6A 01 2F 06   A7 04 8D 05   E3 06 F9 05    ..z.j./.........
000A10   E3 06 13 03   9D 05 21 05   81 02 04 00   CD 06 7A 01    ......!.......z.
000A20   6A 01 B7 08   63 06 63 06   7A 01 6A 01   83 08 63 06    j...c.c.z.j...c.
000A30   08 06 77 06   D5 01 40 00   9A 04 F9 05   80 06 7A 01    ..w...@.......z.
000A40   6A 01 B3 08   63 06 B7 08   6D 06 7A 01   6A 01 9D 05    j...c...m.z.j...
000A50   08 06 49 04   8D 05 63 06   E1 08 7A 01   6A 01 5F 09    ..I...c...z.j._.
000A60   4C 0A F2 01   CB 08 46 07   E1 08 5E 07   7A 01 6A 01    L.....F...^.z.j.
000A70   5F 09 4C 0A   1D 02 CB 08   46 07 E1 08   5E 07 7A 01    _.L.....F...^.z.
000A80   6A 01 5F 09   5E 07 7E 09   4C 0A 43 02   08 06 49 04    j._.^.~.L.C...I.
000A90   CB 08 38 04   E1 08 CB 08   F9 05 6D 06   7A 01 6A 01    ..8.......m.z.j.
000AA0   5F 09 5E 07   7E 09 4C 0A   5B 02 08 06   49 04 CB 08    _.^.~.L.[...I...
000AB0   38 04 E1 08   CB 08 F9 05   6D 06 7A 01   6A 01 5F 09    8.......m.z.j._.
000AC0   4C 0A 33 02   7A 01 6A 01   CB 08 38 04   E1 08 7A 01    L.3.z.j...8...z.
000AD0   6A 01 5F 09   4C 0A 81 02   CB 08 46 07   E1 08 56 07    j._.L.....F...V.
000AE0   7A 01 6A 01   5F 09 56 07   7E 09 CB 08   00 06 38 04    z.j._.V.~.....8.
```

```
000AF0  F9 05 6D 06  7A 01 6A 01  5F 09 56 07  7E 09 4C 0A   ..m.z.j._.V.~.L.
000B00  73 02 CB 08  46 07 E1 08  F9 05 56 07  E2 0A 56 07   s...F.....V...V.
000B10  7A 01 6A 01  5F 09 CB 08  4E 07 7A 01  6A 01 5F 09   z.j._...N.z.j._.
000B20  4E 07 7E 09  4C 0A 81 02  C6 0A 7A 01  6A 01 5F 09   N.~.L.....z.j._.
000B30  D0 0A 49 04  7A 01 6A 01  5F 09 4E 07  7E 09 4C 0A   ..I.z.j._.N.~.L.
000B40  73 02 C6 0A  7A 01 6A 01  5F 09 8D 05  8D 05 36 0B   s...z.j._.....6.
000B50  9D 05 9D 05  58 04 E2 0A  7A 01 6A 01  7F 08 63 06   ....X...z.j...c.
000B60  08 06 81 02  1A 00 08 06  56 07 38 04  63 06 00 06   ........V.8.c...
000B70  D5 01 04 00  30 04 63 06  6D 06 73 02  E2 FF F3 05   ....0.c.m.s.....
000B80  7A 01 6A 01  D5 01 07 01  63 06 6B 08  6D 06 D5 01   z.j.....c.k.m...
000B90  09 01 63 06  6F 08 6D 06  D5 01 0B 01  63 06 73 08   ..c.o.m.....c.s.
000BA0  6D 06 D5 01  0D 01 63 06  7B 08 6D 06  D5 01 11 01   m.....c.{.m.....
000BB0  63 06 83 08  6D 06 D5 01  05 01 63 06  D5 01 5F 08   c...m.....c..._.
000BC0  D5 01 0A 00  30 04 63 06  6D 06 D5 01  0F 01 63 06   ....0.c.m.....c.
000BD0  7F 08 6D 06  8B 08 08 08  8F 08 08 08  A3 08 08 08   .m..............
000BE0  87 08 08 08  AF 08 08 08  97 08 08 08  5A 0B 5F 08   ............Z._.
000BF0  40 0A FD 08  FA 0B 7A 01  1A 7B 6A 01  6B 08 63 06   @.....z..{j.k.c.
000C00  86 05 FD 08  9B 08 08 08  D5 01 F8 0B  63 06 E3 05   ............c...
000C10  7A 01 14 0C  16 00 E1 5C  26 00 E5 D5  C3 27 01 21   z......\&....'.!
000C20  0C D1 E1 63  E5 C3 27 01  00 00 00 00  00 01 00 CC   ...c..'.........
000C30  40 01 40 00  40 01 20 00  40 01 07 00  40 01 D8 00   @.@.@. .@...@...
000C40  40 01 47 00  40 01 90 00  40 01 0C 00  40 01 04 00   @.G.@...@...@...
000C50  40 01 0C 00  40 01 08 00  40 01 80 00  40 01 40 00   @...@...@...@.@.
000C60  40 01 04 00  40 01 02 00  40 01 01 00  40 01 01 00   @...@...@...@...
000C70  40 01 80 00  40 01 40 00  40 01 02 00  40 01 17 00   @...@.@.@...@...
000C80  40 01 15 00  40 01 12 00  40 01 02 00  40 01 09 00   @...@...@...@...
000C90  40 01 2A 00  40 01 09 00  21 59 80 3A  29 82 FE 01   @.*.@...!Y.:)...
000CA0  28 04 CB 9E  18 02 CB DE  3A 5A 80 B6  D3 03 DB 01   (.......:Z......
000CB0  32 88 81 C5  D5 00 3A 5C  80 FE EE 28  03 C3 43 10   2.....:\...(..C.
000CC0  3A 55 80 FE  01 CA 0B 0E  06 8E 10 FE  DB 01 EE 20   :U............. 
000CD0  4F 3A 29 82  FE 01 20 0F  21 59 80 3A  5A 80 B6 CB   O:)... .!Y.:Z...
000CE0  9F 06 91 10  FE D3 03 21  35 82 CB 7E  C2 A1 0D CB   .......!5..~....
000CF0  46 20 14 3A  36 82 CB 27  CB AE CB 69  28 04 CB EE   F .:6..'...i(...
000D00  CB C7 32 36  82 18 0D 79  AE CB 6F 28  4A 21 37 82   ..26...y..o(J!7.
000D10  34 21 35 82  CB 4E 20 17  3A 36 82 E6  0F FE 0E C2   4!5..N .:6......
000D20  A1 0D CB CE  3E 00 32 36  82 32 37 82  C3 A1 0D 7E   ....>.26.27....~
000D30  EE 01 77 CB  57 20 0E 3A  37 82 FE 04  C2 A1 0D CB   ..w.W .:7.......
000D40  D6 3E 00 18  35 CB 5E 20  4C 3A 37 82  FE 05 C2 A1   .>..5.^ L:7.....
000D50  0D CB DE 3E  01 18 23 3A  37 82 F6 80  32 5B 82 3A   ...>..#:7...2[.:
000D60  35 82 32 5C  82 3A 36 82  32 5D 82 3E  00 32 35 82   5.2\.:6.2].>.25.
000D70  3E 00 18 06  CB FE 79 C3  A1 0D 21 33  82 86 86 5F   >.....y...!3..._
000D80  16 00 3A 36  82 21 38 82  19 77 3E 00  32 36 82 32   ..:6.!8..w>.26.2
000D90  37 82 C3 A1  0D 3E 00 77  3A 33 82 3C  E6 0F 32 33   7....>.w:3.<..23
000DA0  82 3A 5B 82  FE 00 28 0D  3E 00 32 2B  82 32 2C 82   .:[...(.>.2+.2,.
000DB0  32 90 81 18  46 21 2C 82  3E 00 BE 20  20 21 2B 82   2...F!,.>..  !+.
000DC0  BE 28 38 35  21 2C 82 36  08 11 00 00  3A 2B 82 5F   .(85!,.6....:+._
000DD0  21 32 82 B7  ED 52 7E 32  28 82 21 2C  82 35 21 28   !2...R~2(.!,.5!(
000DE0  82 3E 00 CB  7E 28 02 3E  01 32 29 82  CB 26 21 35   .>..~(.>.2)..&!5
000DF0  82 CB BE 3E  07 32 90 81  C3 53 0F 3A  27 82 FE 00   ...>.2...S.:'...
000E00  CA 53 0F 21  35 82 CB FE  C3 53 0F 3A  84 81 FE 00   .S.!5....S.:....
000E10  20 15 3E 01  32 29 82 3A  83 81 FE 01  C2 9F 0E 3E    .>.2).:........>
000E20  00 32 90 81  C3 2B 0F 21  86 81 3E 00  BE 20 1A 3E   .2...+.!..>.. .>
000E30  0B 77 21 85  81 4E 34 06  00 21 82 80  09 7E 32 87   .w!..N4..!...~2.
000E40  81 3E 00 32  29 82 C3 44  0F 3E 03 BE  20 13 3A 85   .>.2)..D.>.. .:.
000E50  81 FE 01 28  07 3E 06 32  87 81 18 05  3E 07 32 87   ...(.>.2....>.2.
000E60  81 21 87 81  7E E6 01 32  29 82 CB 1E  21 86 81 35   .!..~..2)...!..5
000E70  3E 00 BE C2  44 0F 21 84  81 35 3E 00  BE C2 44 0F   >...D.!..5>...D.
000E80  32 85 81 3A  82 81 FE 00  28 15 3E 09  32 86 81 3E   2..:....(.>.2..>
000E90  01 32 60 82  3A 59 80 CB  B7 32 59 80  C3 44 0F 3A   .2`.:Y...2Y..D.:
000EA0  82 81 FE 00  CA 2B 0F 3A  60 82 FE 01  C2 44 0F 3A   .....+.:`....D.:
```

```
000EB0  59 80 CB 77  20 16 3A 88  81 CB 6F C2  44 0F 21 59   Y..w .:...o.D.!Y
000EC0  80 CB F6 3A  5A 80 B6 D3  03 C3 44 0F  3A 86 81 FE   ...:Z.....D.:...
000ED0  00 20 32 3A  88 81 CB 6F  28 47 21 85  81 4E 34 06   . 2:...o(G!..N4.
000EE0  00 21 02 81  09 3A 87 81  77 21 82 81  35 3E 00 BE   .!...:..w!..5>..
000EF0  28 39 3E 09  32 86 81 21  59 80 CB B6  3A 5A 80 B6   (9>.2..!Y...:Z..
000F00  D3 03 C3 44  0F 21 86 81  7E 35 FE 01  CA 44 0F 21   ...D.!..~5...D.!
000F10  87 81 CB 3E  3A 88 81 CB  6F CA 44 0F  CB FE C3 44   ...>:...o.D....D
000F20  0F 21 8A 81  CB C6 3E 00  32 82 81 3E  00 32 60 82   .!....>.2..>.2`.
000F30  32 85 81 32  86 81 32 82  81 32 83 81  3A 59 80 CB   2..2..2..2..:Y..
000F40  F7 32 59 80  3E 00 21 5F  82 BE 28 04  35 C3 43 10   .2Y.>.!_..(.5.C.
000F50  3E 0A 77 3A  9F 81 FE 00  20 1F 3A 97  81 FE 00 28   >.w:.... .:....(
000F60  2A 3A 98 81  FE 00 20 02  3E 01 32 9F  81 3A 59 80   *:.... .>.2..:Y.
000F70  21 97 81 AE  32 59 80 18  12 21 9F 81  35 20 0C 3A   !...2Y...!..5 .:
000F80  59 80 21 97  81 AE 32 59  80 36 00 CD  63 10 3A A3   Y.!...2Y.6..c.:.
000F90  81 FE 01 CC  63 10 3A 6F  80 FE FF 20  0F DB 01 CB   ....c.:o... ....
000FA0  77 28 28 DB  03 E6 0F 32  6F 80 18 1F  DB 01 CB 77   w((....2o......w
000FB0  20 19 3A 70  80 5F 16 00  3C E6 0F 32  70 80 3A 6F    .:p._..<..2p.:o
000FC0  80 21 72 80  19 77 3E FF  32 6F 80 3A  6C 80 FE 00   .!r..w>.2o.:l...
000FD0  28 0A FE 01  28 26 3D 32  6C 80 18 20  06 09 3A 6B   (...(&=2l.. ..:k
000FE0  80 4F 37 38  06 21 2C 0C  7E 18 04 21  2D 0C 7E CB   .O78.!,.~..!-.~.
000FF0  39 10 F0 21  2D 0C 7E 3E  03 32 6C 80  21 A7 81 3A   9..!-.~>.2l.!..:
001000  A5 81 BE 28  03 77 18 3B  3A A4 81 FE  00 28 1C ED   ...(.w.;:....(..
001010  6B AB 81 ED  63 AD 81 ED  6B A9 81 ED  63 AB 81 21   k...c...k...c..!
001020  00 00 ED 63  A9 81 3E 00  32 A4 81 3A  AA 81 FE 0F   ...c..>.2..:....
001030  28 11 ED 6B  A9 81 23 3A  A3 81 FE 00  28 01 23 ED   (..k..#:....(.#.
001040  63 A9 81 21  59 80 3A 5A  80 B6 32 62  82 CB 5F C2   c..!Y.:Z..2b.._.
001050  58 10 3E 01  21 89 81 77  3E 01 32 61  82 D1 C1 E1   X.>.!..w>.2a....
001060  F1 ED 45 3E  00 21 AF 81  BE 28 01 35  3E 00 21 8F   ..E>.!...(.5>.!.
001070  81 BE 28 01  35 21 91 81  BE 28 09 35  BE 28 05 21   ..(.5!...(.5..!
001080  5A 80 CB CE  21 90 81 BE  28 01 35 21  8E 81 BE 28   Z...!...(.5!...(
001090  01 35 21 8D  81 BE 28 01  35 21 9C 81  35 20 14 21   .5!...(.5!..5 .!
0010A0  63 82 34 3E  78 32 9C 81  21 63 80 35  20 05 3E D7   c.4>x2..!c.5 .>.
0010B0  D3 03 C7 21  64 82 3E 00  BE 28 05 35  21 63 82 35   ...!d.>..(.5!c.5
0010C0  C9 C3 10 F5  C5 E5 F3 26  00 06 08 3E  00 32 61 82   .......&...>.2a.
0010D0  3A 61 82 FE  01 20 F9 3A  62 82 CB E7  4F CB 24 DB   :a... .:b...O.$.
0010E0  01 CB 67 20  02 CB C4 79  CB A7 D3 03  79 D3 03 10   ..g ...y....y...
0010F0  EC 7C 21 CC  81 35 4E 06  00 21 BC 81  09 77 79 FE   .|!..5N..!..wy.
001100  00 C2 C7 10  FB E1 C1 F1  C3 27 01 0D  11 E1 3E 00   .........'....>.
001110  BE 28 00 35  0A 03 6F 0A  03 67 5E 23  56 EB E9 40   .(.5..o..g^#V..@
001120  01 04 00 40  01 11 00 40  01 80 00 40  01 20 00 40   ...@...@...@. .@
001130  01 10 00 40  01 08 00 40  01 10 00 40  01 0B 00 40   ...@...@...@...@
001140  01 11 00 40  01 02 00 40  01 08 00 40  01 08 00 40   ...@...@...@...@
001150  01 64 00 40  01 10 00 40  01 0A 00 40  01 01 00 40   .d.@...@...@...@
001160  01 07 00 40  01 07 00 40  01 08 00 40  01 04 00 40   ...@...@...@...@
001170  01 02 00 40  01 01 00 40  01 46 00 40  01 80 00 40   ...@...@.F.@...@
001180  01 FF 00 40  01 F0 00 40  01 0F 00 40  01 08 00 40   ...@...@...@...@
001190  01 04 00 40  01 03 00 40  01 7F 00 40  01 06 00 40   ...@...@. .@...@
0011A0  01 07 00 6A  01 7A 01 6A  01 56 07 30  04 7A 01 6A   ...j.z.j.V.0.z.j
0011B0  01 D5 01 04  00 30 04 7A  01 6A 01 D5  01 08 00 30   .....0.z.j.....0
0011C0  04 7A 01 6A  01 D5 01 0A  00 30 04 7A  01 6A 01 D5   .z.j.....0.z.j..
0011D0  01 0C 00 30  04 7A 01 6A  01 D5 01 0E  00 30 04 7A   ...0.z.j.....0.z
0011E0  01 6A 01 08  06 CA 09 81  00 00 00 00  06 C3 11 00   .j..............
0011F0  06 D7 11 6D  06 F9 05 C3  11 6D 06 7A  01 6A 01 08   ...m.....m.z.j..
001200  06 CA 09 81  02 0C 00 00  06 CD 11 00  06 D7 11 6D   ...............m
001210  06 F9 05 CD  11 6D 06 7A  01 6A 01 08  06 CD 11 63   .....m.z.j.....c
001220  06 8D 05 08  06 1B 06 FD  11 9D 05 7A  01 6A 01 08   ...........z.j..
001230  06 81 02 06  00 B9 11 63  06 7A 01 6A  01 00 06 30   .......c.z.j...0
001240  05 81 02 0A  00 56 07 23  06 2D 12 EE  07 56 07 23   .....V.#.-...V.#
001250  06 30 05 81  02 12 00 1B  06 F3 05 00  06 F9 05 56   .0.............V
001260  07 23 06 2D  12 EE 07 56  07 23 06 AF  11 56 07 23   .#.-...V.#...V.#
```

```
001270  06 AF 11 AE  06 1B 06 AE  06 38 06 D2  09 81 02 0C   .........8......
001280  00 1B 06 19  12 D3 18 73  02 08 00 F9  05 19 12 F9   .......s........
001290  05 73 02 AA  FF 7A 01 6A  01 00 06 30  05 81 02 08   .s...z.j...0....
0012A0  00 46 06 F3  05 EE 07 1B  06 F3 05 00  06 CD 11 63   .F.............c
0012B0  06 D3 18 00  06 C3 11 63  06 2D 12 00  06 D1 04 81   .......c.-......
0012C0  02 26 00 F3  05 08 06 C3  11 63 06 2D  12 42 04 00   .&.......c.-.B..
0012D0  06 08 06 C3  11 63 06 FD  11 00 06 D5  01 04 00 23   .....c.........#
0012E0  06 E1 11 73  02 0E 00 42  04 00 06 D5  01 04 00 23   ...s...B.......#
0012F0  06 FD 11 08  06 56 07 23  06 B9 11 6D  06 8D 05 1B   .....V.#...m....
001300  06 F3 05 F9  05 08 06 9D  05 73 02 8E  FF 7A 01 6A   .........s...z.j
001310  01 46 07 3B  12 97 12 7A  01 6A 01 D5  01 DF 86 7A   .F.;...z.j.....z
001320  01 6A 01 08  06 19 13 6D  06 08 06 30  05 81 02 06   .j.....m...0....
001330  00 F3 05 EE  07 D7 11 19  13 F9 05 6D  06 7A 01 6A   ...........m.z.j
001340  01 08 06 D7  11 63 06 63  06 C1 04 7A  01 6A 01 08   .....c.c...z.j..
001350  06 3F 13 B4  04 81 02 04  00 EE 07 46  07 00 06 D7   .?.........F....
001360  11 63 06 6D  06 08 06 C3  11 63 06 00  06 CD 11 63   .c.m.....c.....c
001370  06 19 13 63  06 0F 13 0F  13 21 13 7A  01 6A 01 4D   ...c.....!.z.j.M
001380  13 46 07 00  06 C3 11 6D  06 46 07 00  06 CD 11 6D   .F.....m.F.....m
001390  06 4E 07 00  06 B9 11 6D  06 19 13 63  06 0F 13 21   .N.....m...c...!
0013A0  13 7A 01 6A  01 19 13 63  06 08 06 30  05 81 02 04   .z.j...c...0....
0013B0  00 EE 07 08  06 08 06 C3  11 63 06 F9  05 CD 11 63   .........c.....c
0013C0  06 0F 13 21  13 7A 01 6A  01 08 06 D5  01 5D 80 6D   ...!.z.j.....].m
0013D0  06 19 13 63  06 30 05 81  02 06 00 F3  05 EE 07 08   ...c.0..........
0013E0  06 D5 01 E5  86 E9 05 08  06 C3 11 63  06 0F 06 81   ...........c....
0013F0  02 04 00 C7  13 CD 11 63  06 0F 06 81  02 04 00 C7   .......c........
001400  13 7A 01 6A  01 D5 01 E5  86 6D 06 19  13 63 06 C7   .z.j.....m...c..
001410  13 7A 01 6A  01 AF 11 08  06 8D 05 AE  06 D5 01 A0   .z.j............
001420  05 D5 01 3C  00 04 0A 79  04 2F 06 51  05 81 02 0C   ...<...y./.Q....
001430  00 4E 07 1F  18 DB 18 73  02 06 00 9D  05 9F 06 7A   .N.....s.......z
001440  01 6A 01 D5  01 13 14 03  14 7A 01 6A  01 19 13 63   .j.......z.j...c
001450  06 0F 06 30  05 81 02 04  00 EE 07 AF  11 AE 06 61   ...0...........a
001460  15 79 04 2F  06 51 05 81  02 28 00 46  06 A3 13 8D   .y./.Q...(.F....
001470  05 AD 05 A7  11 63 06 0F  06 81 02 08  00 AD 05 F9   .....c..........
001480  05 E3 05 9D  05 2F 11 83  07 D5 01 00  00 D5 01 00   ...../..........
001490  00 D5 01 F5  86 9F 06 7A  01 6A 01 08  06 8D 05 AF   .......z.j......
0014A0  11 9F 06 AD  05 A7 11 6D  06 AD 05 A3  11 6D 06 9D   .......m.....m..
0014B0  05 7D 13 7A  01 6A 01 AF  11 AE 06 61  15 79 04 2F   .}.z.j.....a.y./
0014C0  06 51 05 81  02 0A 00 46  06 46 07 73  02 08 00 F3   .Q.....F.F.s....
0014D0  05 4E 07 F8  06 7A 01 6A  01 19 13 63  06 81 02 04   .N...z.j...c....
0014E0  00 EE 07 D5  01 F9 86 D5  01 D9 88 00  06 38 04 08   .............8..
0014F0  06 46 07 38  06 59 19 B4  04 81 02 16  00 D5 01 F9   .F.8.Y..........
001500  86 D5 01 D9  88 00 06 38  04 83 07 D5  01 5F 80 B9   .......8....._..
001510  18 7A 01 6A  01 08 06 63  06 51 04 46  07 F8 06 F9   .z.j...c.Q.F....
001520  05 6D 06 7A  01 6A 01 D5  01 75 83 77  06 D5 01 3C   .m.z.j...u.w...<
001530  00 31 03 D5  01 74 83 77  06 30 04 7A  01 6A 01 D5   .1...t.w.0.z.j..
001540  01 3C 00 04  0A 7A 01 6A  01 25 15 D5  01 86 8A 63   .<...z.j.%.....c
001550  06 0F 06 81  02 0A 00 30  04 D5 01 A0  05 F0 09 7A   .......0.......z
001560  01 6A 01 47  15 3D 15 D5  01 73 83 77  06 46 07 67   .j.G.=...s.w.F.g
001570  04 7A 01 6A  01 A3 11 46  07 F9 05 6D  06 7A 01 6A   .z.j...F...m.z.j
001580  01 8D 05 08  06 8D 05 D5  01 73 15 9D  05 46 07 61   .........s...F.a
001590  15 67 04 9D  05 99 14 7A  01 6A 01 F9  05 D5 01 3C   .g.....z.j.....<
0015A0  00 31 03 08  06 D5 01 FF  00 8D 04 30  05 81 02 06   .1.........0....
0015B0  00 4E 07 9A  04 F9 05 7F  15 7A 01 6A  01 4B 14 7A   .N.......z.j.K.z
0015C0  01 6A 01 D5  01 01 00 42  19 08 06 D5  01 B6 89 80   .j.....B........
0015D0  06 48 0C 8D  04 D5 01 83  82 80 06 D5  01 03 00 42   .H.............B
0015E0  19 D5 01 B7  89 80 06 D5  01 02 00 42  19 D5 01 B8   ...........B....
0015F0  89 80 06 D5  01 59 80 77  06 D5 01 B3  89 80 06 D5   .....Y.w........
001600  01 5A 80 77  06 D5 01 B4  89 80 06 D5  01 97 81 77   .Z.w...........w
001610  06 D5 01 B5  89 80 06 7A  01 6A 01 46  07 D5 01 B9   .......z.j.F....
001620  83 80 06 46  07 C3 4E DB  4E 23 11 1F  11 31 03 00   ...F..N.N#...1..
```

```
001630  06 30 04 F9  05 F2 01 6B  16 B9 05 63  06 08 06 CA   .0.....k...c....
001640  09 81 02 20  00 51 04 46  07 F8 06 08  06 B9 05 6D   ... .Q.F.......m
001650  06 CA 09 81  02 0A 00 4E  07 D5 01 B9  83 80 06 73   .......N.......s
001660  02 04 00 F3  05 1F 11 5B  02 D0 FF D5  01 AB 89 13   .......[........
001670  15 7A 01 6A  01 41 14 D5  01 63 89 0B  11 D5 01 62   .z.j.A...c.....b
001680  89 0B 11 46  07 D5 01 83  83 80 06 46  07 D5 01 7F   ...F.......F....
001690  83 80 06 7A  01 6A 01 D5  01 2D 00 E8  04 D5 01 75   ...z.j...-.....u
0016A0  83 77 06 D5  01 17 00 C1  04 8D 04 81  02 0E 00 4E   .w.............N
0016B0  07 D5 01 7F  83 80 06 73  02 0E 00 D5  01 7F 83 77   .......s.......w
0016C0  06 81 02 04  00 73 16 D7  14 C1 15 C9  6D 7A 01 6A   .....s......mz.j
0016D0  01 D5 01 83  83 77 06 81  02 0A 00 D5  01 07 00 73   .....w.........s
0016E0  02 08 00 D5  01 78 83 77  06 7A 01 6A  01 BB 15 D5   .....x.w.z.j....
0016F0  01 73 83 08  06 77 06 42  04 D5 01 3C  00 F0 09 08   .s...w.B...<....
001700  06 1B 06 80  06 CA 09 81  02 04 00 EE  07 19 16 D5   ................
001710  01 74 83 08  06 77 06 42  04 D5 01 3C  00 F0 09 08   .t...w.B...<....
001720  06 1B 06 80  06 08 06 95  16 CA 09 81  02 04 00 EE   ................
001730  07 D5 01 75  83 08 06 77  06 42 04 D5  01 18 00 F0   ...u.w.B........
001740  09 08 06 1B  06 80 06 CA  09 81 02 04  00 EE 07 73   ...............s
001750  16 D5 01 78  83 08 06 77  06 42 04 D5  01 07 00 F0   ...x.w.B........
001760  09 08 06 1B  06 80 06 CA  09 81 02 04  00 EE 07 7A   ...............z
001770  01 6A 01 D5  01 64 82 77  06 81 02 04  00 EE 07 D5   .j...d.w........
001780  01 63 82 77  06 81 02 38  00 4E 07 D5  01 64 82 80   .c.w...8.N...d..
001790  06 EB 16 D5  01 73 83 77  06 D5 01 3C  00 F0 09 30   .....s.w...<...0
0017A0  05 D5 01 A3  81 77 06 8D  04 81 02 14  00 EB 16 D5   .....w..........
0017B0  01 74 83 77  06 56 07 F0  09 81 02 04  00 EB 16 7A   .t.w.V.........z
0017C0  01 6A 01 8D  05 BF 08 31  03 C1 06 7D  05 56 07 BF   .j.....1...}.V..
0017D0  08 31 03 30  04 30 04 8D  05 E3 05 7D  05 9D 05 B2   .1.0.0.....}....
0017E0  09 81 02 2C  00 D5 01 68  82 08 06 AE  06 9D 05 D5   ...,...h........
0017F0  01 10 00 09  04 81 02 08  00 0A 19 73  02 0A 00 F9   ...........s....
001800  05 8D 05 0A  19 9D 05 1B  06 9F 06 73  02 08 00 4E   ...........s...N
001810  07 1F 18 F3  05 7A 01 6A  01 4C 0A C1  17 7A 01 6A   .....z.j.L...z.j
001820  01 0F 06 81  02 12 00 9D  05 9D 05 F9  05 8D 05 F9   ................
001830  05 51 04 73  02 EC FF 7A  01 6A 01 D5  01 8E 81 80   .Q.s...z.j......
001840  06 D5 01 8E  81 77 06 30  05 81 02 F6  FF 7A 01 6A   .....w.0.....z.j
001850  01 46 07 F2  01 63 18 8A  79 D5 01 14  00 39 18 43   .F...c..y....9.C
001860  02 F6 FF 7A  01 6A 01 30  05 81 02 04  00 EE 07 D5   ...z.j.0........
001870  01 08 00 46  07 F2 01 8D  18 D5 01 0A  00 39 18 11   ...F.........9..
001880  55 D5 01 05  00 39 18 FF  54 43 02 EE  FF D5 01 1E   U....9..TC......
001890  00 39 18 7A  01 6A 01 D5  01 97 81 77  06 30 05 81   .9.z.j.....w.0..
0018A0  02 F6 FF D5  01 98 81 80  06 D5 01 97  81 80 06 7A   ...............z
0018B0  01 6A 01 F9  05 80 06 7A  01 6A 01 08  06 77 06 42   .j.....z.j...w.B
0018C0  04 B1 18 7A  01 6A 01 80  06 7A 01 6A  01 F9 05 F3   ...z.j...z.j....
0018D0  05 7A 01 6A  01 1B 06 1B  06 7A 01 6A  01 F3 05 46   .z.j.....z.j...F
0018E0  06 7A 01 E5  18 E1 7C B5  CA 27 01 FD  4E 00 FD 23   .z....|..'..N..#
0018F0  FD 46 00 FD  23 C3 27 01  6A 01 4E 07  F9 05 CB 07   .F..#.'.j.N.....
001900  D5 01 FF FF  A7 04 8D 04  7A 01 6A 01  4E 07 F9 05   ........z.j.N...
001910  CB 07 9A 04  7A 01 6A 01  C1 06 CB 07  4E 07 8D 04   ....z.j.....N...
001920  7A 01 6A 01  1B 06 00 06  F8 18 D3 18  CB 07 9A 04   z.j.............
001930  7A 01 6A 01  C1 06 CB 07  4E 07 8D 04  4E 07 C1 04   z.j.....N...N...
001940  7A 01 6A 01  BE 07 7A 01  4A 19 E1 7D  D3 03 0A 03   z.j...z.J..}....
001950  6F 0A 03 67  5E 23 56 EB  E9 6A 01 00  06 30 04 F9   o..g^#V..j...0..
001960  05 46 07 D3  18 F2 01 7B  19 C0 06 B9  05 77 06 C1   .F.....{.....w..
001970  04 81 02 04  00 42 04 43  02 F0 FF F9  05 F3 05 BA   .....B.C........
001980  09 7A 01 6A  01 1B 06 1F  07 F8 06 7A  01 6A 01 46   .z.j.......z.j.F
001990  07 D5 01 39  83 80 06 46  07 F2 01 C1  19 2F 06 B9   ...9...F...../..
0019A0  05 30 04 77  06 F9 05 B9  05 30 04 77  06 B2 09 81   .0.w.....0.w....
0019B0  02 0C 00 4E  07 D5 01 39  83 80 06 33  02 43 02 DE   ...N...9...3.C..
0019C0  FF 46 06 D5  01 39 83 77  06 4E 07 C1  04 7A 01 6A   .F...9.w.N...z.j
0019D0  01 46 07 D5  01 91 82 6D  06 D5 01 0F  27 D5 01 8F   .F.....m....'...
0019E0  82 6D 06 D5  01 FA 00 D5  01 8E 82 80  06 46 07 D5   .m...........F..
```

```
0019F0  01 8D 82 80  06 D5 01 FA  00 D5 01 8C  82 80 06 46   ..............F
001A00  07 D5 01 8B  82 80 06 46  07 D5 01 86  82 80 06 46   .......F.......F
001A10  07 D5 01 87  82 80 06 46  07 D5 01 1D  83 80 06 46   .......F.......F
001A20  07 D5 01 88  82 80 06 46  07 D5 01 89  82 80 06 46   .......F.......F
001A30  07 D5 01 19  83 80 06 46  07 D5 01 1A  83 80 06 46   .......F.......F
001A40  07 D5 01 1B  83 80 06 46  07 D5 01 82  82 80 06 7A   .......F.......z
001A50  01 53 1A FB  0A 03 6F 0A  03 67 5E 23  56 EB E9 61   .S....o..g^#V..a
001A60  1A F3 0A 03  6F 0A 03 67  5E 23 56 EB  E9 6A 01 7A   ....o..g^#V..j.z
001A70  01 6A 01 5F  1A 46 07 D5  01 7A 82 80  06 46 07 D5   .j._.F...z...F..
001A80  01 CE 81 80  06 46 07 D5  01 7B 82 80  06 46 07 D5   .....F...{...F..
001A90  01 7C 82 80  06 46 07 D5  01 CC 81 80  06 46 07 D5   .|...F.......F..
001AA0  01 CD 81 80  06 46 07 D5  01 A4 81 80  06 46 07 D5   .....F.......F..
001AB0  01 A5 81 6D  06 46 07 D5  01 A7 81 6D  06 46 07 D5   ...m.F.....m.F..
001AC0  01 91 82 6D  06 46 07 D5  01 A9 81 6D  06 46 07 D5   ...m.F.....m.F..
001AD0  01 AB 81 6D  06 46 07 D5  01 AD 81 6D  06 46 07 D5   ...m.F.....m.F..
001AE0  01 7E 82 80  06 4E 1A 7A  01 85 82 80  06 51 1A 7A   .~...N.z.....Q.z
001AF0  01 6A 01 D5  01 FA 00 39  18 D5 01 FA  00 39 18 71   .j.....9.....9.q
001B00  1A 58 0C AB  23 95 1B 7A  01 6A 01 D5  01 55 80 77   .X..#..z.j...U.w
001B10  06 D5 01 A3  B1 77 06 9A  04 81 02 08  00 4E 07 73   .....w.......N.s
001B20  02 04 00 3F  11 7A 01 6A  01 53 11 31  03 D5 01 CA   ...?.z.j.S.1....
001B30  8A 30 04 7A  01 40 01 FF  FF 40 01 A0  05 40 01 E0   .0.z.@...@...@..
001B40  00 40 01 18  00 40 01 09  00 6A 01 00  06 CA 09 D5   .@...@...j......
001B50  01 6F 85 77  06 9A 04 81  02 04 00 EE  07 08 06 35   .o.w...........5
001B60  1B C1 04 81  02 7C 00 4E  07 D5 01 6F  85 80 06 00   .....|.N...o....
001B70  06 D5 01 79  83 77 06 42  04 D5 01 07  00 F0 09 F9   ...y.w.B........
001B80  05 46 07 D7  1E 08 06 35  1B C1 04 81  02 06 00 F3   .F.....5........
001B90  05 EE 07 00  06 5E 07 D1  04 81 02 42  00 5E 07 CB   .....^.....B.^..
001BA0  07 8D 05 D5  01 3C 00 31  03 30 04 39  1B 30 04 D5   .....<.1.0.9.0..
001BB0  01 A4 06 1F  07 D5 01 05  00 CB 07 9D  05 9A 04 D5   ................
001BC0  01 07 00 9A  04 F9 05 F3  05 2F 06 F9  05 43 11 31   ........./...C.1
001BD0  03 D5 01 94  91 30 04 6D  06 73 02 06  00 46 06 F3   .....0.m.s...F..
001BE0  05 7A 01 6A  01 49 1B F9  05 F3 05 7A  01 6A 01 08   .z.j.I.....z.j..
001BF0  06 43 11 31  03 D5 01 94  91 30 04 63  06 E3 1B 08   .C.1.....0.c....
001C00  06 35 1B C1  04 81 02 0C  00 F3 05 46  07 4E 07 66   .5.........F.N.f
001C10  07 EE 07 08  06 D5 01 FB  FF CB 07 F9  05 41 1B 8D   .............A..
001C20  04 D5 01 FD  FF CB 07 46  07 7A 01 6A  01 D5 01 7E   .......F.z.j...~
001C30  8A 77 06 81  02 08 00 46  06 46 07 EE  07 30 05 F9   .w.....F.F...0..
001C40  05 4E 07 C1  04 8D 04 81  02 1E 00 D5  01 55 80 77   .N...........U.w
001C50  06 81 02 0C  00 D5 01 51  8A 63 06 73  02 06 00 D5   .......Q.c.s....
001C60  01 1E 00 73  02 04 00 46  07 7A 01 6A  01 D5 01 2B   ...s...F.z.j...+
001C70  1C 66 07 D5  01 04 00 C1  17 7A 01 6A  01 08 06 8D   .f.......z.j....
001C80  05 ED 1B 81  02 0E 00 4E  07 1F 18 F3  05 46 06 46   .......N.....F.F
001C90  07 EE 07 AD  05 30 05 81  02 0A 00 08  06 D5 01 53   .....0.........S
001CA0  8A 80 06 AD  05 6B 1C 08  06 8D 05 38  04 47 15 08   .....k.....8.G..
001CB0  06 1B 06 D1  04 B4 04 F9  05 00 06 AD  05 CA 09 8D   ................
001CC0  04 81 02 0C  00 9D 05 9D  05 0B 3C 73  02 0A 00 56   ..........<s...V
001CD0  07 1F 18 46  06 F3 05 7A  01 40 01 00  C0 40 01 7F   ...F...z.@...@.
001CE0  00 6A 01 08  06 66 07 C1  04 81 02 04  00 EE 07 08   .j...f..........
001CF0  06 D9 1C 8D  04 D9 1C B2  09 81 02 04  00 EE 07 08   ................
001D00  06 41 1B 45  1B 9A 04 8D  04 8D 05 D5  01 FB FF CB   .A.E............
001D10  07 08 06 DD  1C 8D 04 8D  05 D5 01 F9  FF CB 07 08   ................
001D20  06 4E 07 32  19 81 02 0A  00 D5 01 12  85 73 02 06   .N.2.........s..
001D30  00 D5 01 10  85 63 06 9D  05 1B 06 46  07 32 19 81   .....c.....F.2..
001D40  02 04 00 C1  06 30 04 D5  01 05 00 CB  07 9D 05 9A   .....0..........
001D50  04 7A 01 6A  01 35 1B F9  05 53 11 00  06 30 04 F9   .z.j.5...S...0..
001D60  05 F2 01 81  1D B9 05 63  06 08 06 35  1B C1 04 81   .......c...5....
001D70  02 06 00 F3  05 33 02 F9  05 F3 05 43  11 5B 02 E6   .....3.....C.[..
001D80  FF 7A 01 6A  01 4B 11 31  03 D5 01 0A  91 30 04 30   .z.j.K.1.....0.0
001D90  04 77 06 08  06 7F 11 C1  04 81 02 08  00 66 07 73   .w...........f.s
001DA0  02 0E 00 53  11 31 03 D5  01 CA 8A 30  04 46 07 7A   ...S.1.....0.F.z
```

```
001DB0  01 6A 01 8D  05 83 1D 81  02 0C 00 4E  07 1F 18 46   .j.........N...F
001DC0  06 35 1B EE  07 9D 05 43  11 31 03 30  04 63 06 7A   .5.....C.1.0.c.z
001DD0  01 6A 01 D5  01 79 83 77  06 51 04 D5  01 07 00 F0   .j...y.w.Q......
001DE0  09 00 06 83  1D 81 02 06  00 46 06 EE  07 53 1D 08   .........F...S..
001DF0  06 35 1B C1  04 81 02 06  00 46 06 EE  07 41 1B 8D   .5.......F...A..
001E00  04 D5 01 FD  FF CB 07 F9  05 D5 01 B6  91 30 04 80   .............0..
001E10  06 7A 01 6A  01 D5 01 79  83 77 06 F9  05 08 06 D5   .z.j...y.w......
001E20  01 B6 91 30  04 35 1B 47  11 46 07 F2  01 6B 1E 4F   ...0.5.G.F...k.O
001E30  06 B9 05 B1  1D F9 05 F3  05 08 06 35  1B C1 04 81   ...........5....
001E40  02 04 00 33  02 E1 1C 08  06 D5 01 FB  FF CB 07 47   ...3...........G
001E50  15 10 05 81  02 04 00 33  02 2F 06 41  1B 8D 04 D5   .......3./.A....
001E60  01 FD FF CB  07 B1 18 43  02 C6 FF 8D  05 F3 05 46   .......C.......F
001E70  06 9D 05 7A  01 6A 01 08  06 8D 05 D1  1D D5 01 79   ...z.j.........y
001E80  83 77 06 AD  05 83 1D F9  05 F3 05 81  02 08 00 35   .w.............5
001E90  1B 73 02 06  00 AD 05 13  1E 9D 05 43  11 31 03 D5   .s.........C.1..
001EA0  01 94 91 30  04 6D 06 7A  01 6A 01 D5  01 75 1E 66   ...0.m.z.j...u.f
001EB0  07 4E 07 C1  17 7A 01 6A  01 08 06 41  1B 8D 04 D5   .N...z.j...A....
001EC0  01 FD FF CB  07 F9 05 D5  01 FB FF CB  07 D5 01 3C   ...............<
001ED0  00 09 04 1B  06 7A 01 6A  01 B1 1D 08  06 35 1B B2   .....z.j.....5..
001EE0  09 81 02 06  00 E1 1C B7  1E 7A 01 6A  01 8D 05 42   .........z.j...B
001EF0  04 08 06 47  11 D1 04 81  02 1E 00 D5  01 79 83 77   ...G.........y.w
001F00  06 AD 05 1B  06 B1 1D 08  06 35 1B B2  09 81 02 04   .........5......
001F10  00 E1 1C 73  02 06 00 F3  05 35 1B 9D  05 43 11 31   ...s.....5...C.1
001F20  03 D5 01 94  91 30 04 6D  06 7A 01 6A  01 08 06 D5   .....0.m.z.j....
001F30  01 C7 91 30  04 77 06 8D  05 08 06 7B  1C 81 02 36   ...0.w.....{...6
001F40  00 08 06 8D  05 43 11 31  03 D5 01 94  91 30 04 63   .....C.1.....0.c
001F50  06 08 06 45  1B 8D 04 AD  05 EB 1E 41  1B 8D 04 D5   ...E.......A....
001F60  01 FD FF CB  07 08 06 9D  05 D5 01 B6  91 30 04 80   .............0..
001F70  06 73 02 0A  00 D5 01 B6  91 30 04 77  06 9D 05 D5   .s.......0.w....
001F80  01 61 89 77  06 81 02 08  00 CB 18 73  02 04 00 F3   .a.w.......s....
001F90  05 7A 01 6A  01 3F 11 46  07 F2 01 BF  1F B9 05 2F   .z.j.?.F......./
001FA0  11 31 03 D5  01 C9 87 30  04 4D 13 F3  05 B9 05 33   .1.....0.M.....3
001FB0  11 31 03 D5  01 D9 88 30  04 83 07 43  02 E0 FF 7A   .1.....0...C...z
001FC0  01 6A 01 7A  01 6A 01 4E  07 30 04 7A  01 6A 01 56   .j.z.j.N.0.z.j.V
001FD0  07 30 04 7A  01 6A 01 5E  07 30 04 7A  01 6A 01 D5   .0.z.j.^.0.z.j..
001FE0  01 04 00 30  04 7A 01 6A  01 D5 01 05  00 30 04 7A   ...0.z.j.....0.z
001FF0  01 6A 01 D5  01 06 00 30  04 7A 01 6A  01 D5 01 07   .j.....0.z.j....
002000  00 30 04 7A  01 6A 01 08  06 33 11 31  03 D5 01 D9   .0.z.j...3.1....
002010  88 30 04 08  06 8D 05 E7  1F 77 06 AD  05 F1 1F 77   .0.......w.....w
002020  06 AD 05 FB  1F 77 06 73  2E 46 07 9D  05 C1 1F 80   .....w.s.F......
002030  06 7A 01 6A  01 A3 11 63  06 C5 20 7A  01 6A 01 00   .z.j...c.. z.j..
002040  06 8D 05 8D  05 D5 01 33  20 9D 05 3D  15 9D 05 2F   .......3 ..=.../
002050  11 31 03 D5  01 C9 87 30  04 99 14 7A  01 6A 01 08   .1.....0...z.j..
002060  06 8D 05 33  11 31 03 D5  01 D9 88 30  04 8D 05 AD   ...3.1.....0....
002070  05 C1 1F 77  06 08 06 30  05 F9 05 D5  01 80 83 77   ...w...0.......w
002080  06 B2 09 9A  04 AD 05 C5  1F 77 06 D5  01 81 83 77   .........w.....w
002090  06 B2 09 9A  04 AD 05 CD  1F 77 06 D5  01 82 83 77   .........w.....w
0020A0  06 B2 09 9A  04 81 02 0A  00 56 07 1F  18 46 06 EE   .........V...F..
0020B0  07 AD 05 D5  1F 77 06 D5  01 3C 00 31  03 9D 05 DD   .....w...<.1....
0020C0  1F 77 06 30  04 9D 05 F9  05 08 06 47  15 38 04 46   .w.0.......G.8.F
0020D0  07 F8 06 81  02 08 00 3D  20 73 02 06  00 F3 05 05   .......= s......
0020E0  20 7A 01 6A  01 1B 06 F3  05 46 07 F8  06 57 11 51    z.j.....F...W.Q
0020F0  04 1F 07 63  11 31 03 D5  01 65 89 30  04 2F 06 77   ...c.1...e.0./.w
002100  06 08 06 D5  01 FF 00 B2  09 81 02 1C  00 08 06 D5   ................
002110  01 0F 00 8D  04 F9 05 D5  01 FC FF CB  07 D3 18 31   ...............1
002120  4F 42 04 73  02 D8 FF 46  06 46 06 7A  01 6A 01 D5   OB.s...F.F.z.j..
002130  01 34 00 D5  01 91 8A 80  06 D5 01 7C  00 D5 01 92   .4.........|....
002140  8A 80 06 D5  01 AC 00 D5  01 93 8A 80  06 D5 01 34   ...............4
002150  00 D5 01 94  8A 80 06 D5  01 E0 00 D5  01 95 8A 80   ................
002160  06 D5 01 1A  00 D5 01 96  8A 80 06 7A  01 6A 01 2F   ...........z.j./
```

```
002170  06 7B 39 F3  05 C1 04 81  02 08 00 46  06 73 02 04   .{9........F.s..
002180  00 43 3B 7A  01 6A 01 D5  01 91 8A 77  06 C9 36 6D   .C;z.j.....w..6m
002190  21 D5 01 92  8A 77 06 CD  36 6D 21 7A  01 6A 01 D5   !....w..6m!z.j..
0021A0  01 FF 00 C9  36 6D 21 7A  01 6A 01 D5  01 93 8A 77   ....6m!z.j.....w
0021B0  06 D1 36 6D  21 D5 01 94  8A 77 06 D5  36 6D 21 7A   ..6m!....w..6m!z
0021C0  01 6A 01 D5  01 FF 00 D1  36 6D 21 7A  01 6A 01 D5   .j......6m!z.j..
0021D0  01 95 8A 77  06 D9 36 6D  21 D5 01 96  8A 77 06 DD   ...w..6m!....w..
0021E0  36 6D 21 7A  01 6A 01 D5  01 FF 00 D9  36 6D 21 7A   6m!z.j......6m!z
0021F0  01 6A 01 46  07 53 50 F5  35 C1 04 46  07 C3 4E DB   .j.F.SP.5..F..N.
002200  4E 63 06 CA  09 8D 04 79  36 7B 39 8D  04 CA 09 D5   Nc.....y6{9.....
002210  01 57 8A 77  06 30 05 8D  04 9A 04 01  36 9A 04 2D   .W.w.0......6..-
002220  36 9A 04 7A  01 6A 01 85  21 A9 21 CD  21 7A 01 6A   6..z.j..!.!.!z.j
002230  01 D5 01 72  83 77 06 81  02 06 00 5D  22 EE 07 F1   ...r.w.....]"...
002240  21 81 02 08  00 25 22 73  02 08 00 85  21 C1 21 E5   !....%"s....!.!.
002250  21 D5 01 14  00 D5 01 79  87 99 15 7A  01 6A 01 9D   !......y...z.j..
002260  21 CD 21 2D  36 81 02 08  00 C1 21 73  02 04 00 A9   !.!-6.....!s....
002270  21 7A 01 6A  01 D5 01 58  8A 77 06 D5  01 6E 8A 77   !z.j...X.w...n.w
002280  06 38 04 E3  06 D5 01 54  8A 63 06 D5  01 AB 89 63   .8.....T.c.....c
002290  06 38 04 46  07 F8 06 D5  01 6E 8A 77  06 D5 01 8C   .8.F.....n.w....
0022A0  8A 77 06 38  04 E3 06 4E  07 F8 06 1A  04 31 03 D5   .w.8...N.....1..
0022B0  01 AB 89 63  06 D5 01 1E  00 30 04 38  04 46 07 F8   ...c.....0.8.F..
0022C0  06 0F 06 81  02 16 00 D5  01 8B 8A 08  06 77 06 1B   .............w..
0022D0  06 F8 06 B1  18 46 07 73  02 04 00 66  07 7A 01 6A   .....F.s...f.z.j
0022E0  01 D5 01 7E  8A 77 06 81  02 C8 00 73  22 73 02 04   ...~.w.....s"s..
0022F0  00 46 07 6D  36 7B 39 F3  05 D5 01 FF  00 D1 04 9A   .F.m6{9.........
002300  04 7A 01 6A  01 D1 36 7B  39 F3 05 D5  01 FF 00 C1   .z.j..6{9.......
002310  04 81 02 12  00 4E 07 D5  01 8D 8A 80  06 A9 21 D5   .....N........!.
002320  01 14 00 EE  07 D9 36 7B  39 F3 05 D5  01 FF 00 C1   ......6{9.......
002330  04 81 02 0C  00 4E 07 D5  01 8D 8A 80  06 CD 21 D5   .....N........!.
002340  01 1E 00 7A  01 6A 01 01  36 81 02 08  00 D5 01 05   ...z.j..6.......
002350  00 EE 07 D5  01 72 83 77  06 81 02 0A  00 5D 22 D5   .....r.w.....]".
002360  01 0A 00 EE  07 F1 21 81  02 0A 00 25  22 D5 01 05   ......!....%"...
002370  00 EE 07 DF  22 81 02 06  00 4E 07 EE  07 03 23 7A   ...."....N....#z
002380  01 6A 01 D5  01 79 87 77  06 CA 09 81  02 04 00 EE   .j...y.w........
002390  07 45 23 D5  01 79 87 99  15 7A 01 6A  01 D5 01 81   .E#..y...z.j....
0023A0  23 46 07 D5  01 18 00 C1  17 7A 01 40  01 0D 00 40   #F.......z.@...@
0023B0  01 0A 00 40  01 0C 00 40  01 7D 00 40  01 60 00 40   ...@...@.}.@.`.@
0023C0  01 05 00 40  01 3E 00 40  01 7A 00 40  01 63 00 40   ...@.>.@.z.@.c.@
0023D0  01 5B 00 40  01 5F 00 40  01 4F 00 40  01 70 00 40   .[.@._.@.O.@.p.@
0023E0  01 71 00 40  01 7F 00 40  01 7B 00 40  01 73 00 40   .q.@...@.{.@.s.@
0023F0  01 33 00 40  01 4E 00 40  01 00 00 40  01 08 00 40   .3.@.N.@...@...@
002400  01 02 00 40  01 1D 00 40  01 0E 00 40  01 13 00 40   ...@...@...@...@
002410  01 0D 00 40  01 FF 00 40  01 00 00 40  01 01 00 6A   ...@...@...@...j
002420  01 B7 23 8E  02 08 00 46  07 73 02 B8  00 BB 23 8E   ..#....F.s....#.
002430  02 08 00 4E  07 73 02 AC  00 BF 23 8E  02 08 00 4E   ...N.s....#....N
002440  07 73 02 A0  00 C3 23 8E  02 08 00 56  07 73 02 94   .s....#....V.s..
002450  00 C7 23 8E  02 08 00 5E  07 73 02 88  00 CB 23 8E   ..#....^.s....#.
002460  02 0A 00 D5  01 04 00 73  02 7A 00 CF  23 8E 02 0A   .......s.z..#...
002470  00 D5 01 05  00 73 02 6C  00 D3 23 8E  02 0A 00 D5   .....s.l..#.....
002480  01 06 00 73  02 5E 00 D7  23 8E 02 0A  00 D5 01 06   ...s.^..#.......
002490  00 73 02 50  00 DB 23 8E  02 0A 00 D5  01 07 00 73   .s.P..#........s
0024A0  02 42 00 DF  23 8E 02 0A  00 D5 01 07  00 73 02 34   .B..#........s.4
0024B0  00 E3 23 8E  02 0A 00 D5  01 08 00 73  02 26 00 E7   ..#........s.&..
0024C0  23 8E 02 0A  00 D5 01 09  00 73 02 18  00 EB 23 8E   #........s....#.
0024D0  02 0A 00 D5  01 09 00 73  02 0A 00 D5  01 20 00 F9   .......s........
0024E0  05 F3 05 7A  01 6A 01 D5  01 BC 81 D5  01 0B 00 30   ...z.j.........0
0024F0  04 77 06 97  11 8D 04 08  06 D5 01 C3  82 80 06 03   .w..............
002500  24 8E 02 10  00 1B 24 D5  01 84 82 80  06 66 07 73   $.....$......f.s
002510  02 4C 00 07  24 8E 02 10  00 1B 24 D5  01 84 82 80   .L..$.....$.....
002520  06 66 07 73  02 38 00 0B  24 8E 02 10  00 1B 24 D5   .f.s.8..$.....$.
```

```
002530   01 84 82 80   06 66 07 73   02 24 00 FB   23 8E 02 10   .....f.s.$..#...
002540   00 17 24 D5   01 84 82 80   06 46 07 73   02 10 00 17   ..$......F.s....
002550   24 D5 01 84   82 80 06 66   07 F9 05 F3   05 7A 01 6A   $......f.....z.j
002560   01 D5 01 75   83 77 06 D5   01 0C 00 C1   04 7A 01 6A   ...u.w.......z.j
002570   01 46 07 F9   05 08 06 7C   0C 30 04 F9   05 F2 01 9F   .F.....|.0......
002580   25 B9 05 77   06 1F 24 08   06 B9 05 80   06 D5 01 20   %..w..$........
002590   00 C1 04 81   02 06 00 F3   05 66 07 43   02 E4 FF 7A   .........f.C...z
0025A0   01 6A 01 D5   01 E6 81 90   0C D5 01 FF   00 6E 07 7A   .j...........n.z
0025B0   01 6A 01 D5   01 BC 81 D5   01 B0 81 D5   01 84 82 77   .j.............w
0025C0   06 30 04 B3   23 97 07 7A   01 6A 01 D5   01 FA 00 D5   .0..#..z.j......
0025D0   01 8E 81 80   06 D5 01 8E   81 77 06 30   05 81 02 06   .........w.0....
0025E0   00 66 07 EE   07 D5 01 A4   81 77 06 81   02 E8 FF D5   .f.......w......
0025F0   01 FA 00 D5   01 8E 81 80   06 D5 01 8E   81 77 06 30   .............w.0
002600   05 81 02 06   00 66 07 EE   07 D5 01 A4   81 77 06 30   .....f.......w.0
002610   05 81 02 E6   FF 46 07 7A   01 6A 01 FF   54 D5 01 0C   .....F.z.j..T...
002620   00 D5 01 CC   81 80 06 C1   10 7A 01 6A   01 11 55 D5   .........z.j..U.
002630   01 A4 81 77   06 81 02 06   00 66 07 EE   07 58 0C AB   ...w.....f...X..
002640   23 95 18 C9   25 81 02 06   00 66 07 EE   07 C9 25 81   #...%....f....%.
002650   02 06 00 66   07 EE 07 19   26 46 07 7A   01 6A 01 08   ...f....&F.z.j..
002660   06 77 06 D5   01 DB 91 80   06 42 04 D5   01 E6 81 D5   .w.......B......
002670   01 80 82 6D   06 7A 01 6A   01 D5 01 CF   81 7C 0C 97   ...m.z.j.....|..
002680   07 7A 01 6A   01 8D 05 46   07 F9 05 08   06 9D 05 30   .z.j...F.......0
002690   04 F9 05 F2   01 A1 26 B9   05 77 06 30   04 43 02 F8   ......&..w.0.C..
0026A0   FF D5 01 0A   00 F0 09 7A   01 6A 01 7C   0C 51 04 2F   .......z.j.|.Q./
0026B0   06 30 04 8D   05 83 26 9D   05 77 06 B2   09 7A 01 6A   .0....&..w...z.j
0026C0   01 08 06 77   26 08 06 A9   26 81 02 0E   00 F3 05 6B   ...w&...&......k
0026D0   11 D5 01 82   82 80 06 EE   07 5D 26 D5   01 E6 81 80   .........]&.....
0026E0   0C 97 07 4E   07 D5 01 7A   82 80 06 7A   01 6A 01 D5   ...N...z...z.j..
0026F0   01 BF 26 66   07 56 07 C1   17 7A 01 6A   01 D5 01 84   ..&f.V...z.j....
002700   82 77 06 D5   01 B0 81 30   04 08 06 6F   25 81 02 12   .w.....0...o%...
002710   00 F3 05 6F   11 D5 01 82   82 80 06 66   07 73 02 06   ...o.......f.s..
002720   00 ED 26 46   07 7A 01 6A   01 D5 01 BC   81 D5 01 0B   ..&F.z.j........
002730   00 30 04 08   06 77 06 D5   01 BC 81 D5   01 0A 00 30   .0...w.........0
002740   04 77 06 D5   01 07 00 16   19 D5 01 06   00 22 19 D5   .w..........."..
002750   01 BC 81 D5   01 09 00 30   04 77 06 D5   01 07 00 16   .......0.w......
002760   19 D5 01 05   00 22 19 D5   01 BC 81 D5   01 08 00 30   ....."........0
002770   04 77 06 D5   01 07 00 16   19 D5 01 04   00 22 19 B1   .w..........."..
002780   18 7A 01 6A   01 D5 01 82   82 77 06 0F   06 81 02 48   .z.j.....w.....H
002790   00 08 06 D5   01 1B 83 80   06 D5 01 88   82 B9 18 08   ................
0027A0   06 4E 07 C1   04 81 02 08   00 D5 01 19   83 B9 18 08   .N..............
0027B0   06 D5 01 04   00 C1 04 81   02 08 00 D5   01 1A 83 B9   ................
0027C0   18 D5 01 89   82 08 06 77   06 1B 06 9A   04 B1 18 46   .......w.......F
0027D0   07 D5 01 82   82 80 06 7A   01 6A 01 D5   01 86 82 B9   .......z.j......
0027E0   18 4E 07 D5   01 85 82 80   06 46 07 D5   01 DD 91 80   .N.......F......
0027F0   06 83 27 46   07 D5 01 D8   91 80 06 46   07 D5 01 7A   ..'F.......F...z
002800   82 80 06 D5   01 18 83 77   06 08 06 D5   01 8D 82 77   .......w.......w
002810   06 F8 06 D5   01 8D 82 80   06 D5 01 8E   82 77 06 1F   .............w..
002820   07 D5 01 8E   82 80 06 46   07 D5 01 C1   82 80 06 46   .......F.......F
002830   07 D5 01 18   83 80 06 77   11 D5 01 99   87 99 15 4E   .......w.......N
002840   07 D5 01 78   82 80 06 7A   01 6A 01 4E   07 D5 01 85   ...x...z.j.N....
002850   82 80 06 7A   01 6A 01 D5   01 BC 81 08   06 D5 01 0C   ...z.j..........
002860   00 30 04 F9   05 F2 01 79   28 B9 05 77   06 97 11 8D   .0.....y(..w....
002870   04 B9 05 80   06 43 02 F2   FF 7A 01 6A   01 D5 01 BC   .....C...z.j....
002880   81 D5 01 0C   00 59 19 7A   01 6A 01 56   07 EF 23 7B   .....Y.z.j.V..#{
002890   28 56 07 F3   23 7B 28 8D   04 81 02 08   00 D9 27 EF   (V..#((.......'.
0028A0   23 EE 07 D5   01 06 00 F7   23 7B 28 81   02 06 00 F7   #.......#(......
0028B0   23 EE 07 D5   01 06 00 FF   23 7B 28 81   02 0A 00 49   #.......#(.....I
0028C0   28 FF 23 73   02 04 00 7F   11 7A 01 6A   01 D5 01 BC   (.#s.....z.j....
0028D0   81 77 06 D5   01 C2 82 80   06 27 27 55   28 89 28 08   .w.......''U(.(.
0028E0   06 D5 01 7D   82 80 06 7A   01 6A 01 2B   26 81 02 06   ...}...z.j.+&...
```

```
0028F0  00 46 07 EE  07 CB 28 7A  01 6A 01 66  07 D5 01 0A   .F....(z.j.f....
002900  00 46 07 F2  01 1B 29 E9  28 FF 23 C1  04 81 02 08   .F....).(.#.....
002910  00 F3 05 46  07 33 02 43  02 EE FF 7A  01 6A 01 E9   ...F.3.C...z.j..
002920  28 7F 11 B2  09 81 02 06  00 66 07 EE  07 E5 24 B4   (........f....$.
002930  04 81 02 06  00 66 07 EE  07 B1 25 E9  28 7F 11 B2   .....f....%.(...
002940  09 7A 01 6A  01 D5 01 84  82 77 06 D5  01 B0 81 30   .z.j.....w.....0
002950  04 D5 01 10  82 7C 0C 97  07 7A 01 6A  01 D5 01 84   .....|...z.j....
002960  82 77 06 D5  01 B0 81 30  04 D5 01 10  82 7C 0C 8D   .w.....0.....|..
002970  19 7A 01 6A  01 1D 29 0F  06 81 02 04  00 EE 07 43   .z.j..)........C
002980  29 F9 28 0F  06 81 02 04  00 EE 07 1D  29 0F 06 81   ).(.........)...
002990  02 04 00 EE  07 5B 29 0F  06 81 02 04  00 EE 07 FB   .....[).........
0029A0  26 7A 01 40  01 00 07 6A  01 A3 29 D5  01 A9 81 63   &z.@...j..)....c
0029B0  06 00 06 E8  04 D5 01 AB  81 63 06 1B  06 E8 04 8D   .........c......
0029C0  04 7A 01 6A  01 19 26 CB  28 EF 23 B2  09 81 02 04   .z.j..&.(.#.....
0029D0  00 EE 07 66  07 D5 01 04  00 46 07 F2  01 F9 29 73   ...f.....F....)s
0029E0  29 B4 04 81  02 08 00 F3  05 46 07 33  02 F9 28 81   ).......F.3..(.
0029F0  02 04 00 33  02 43 02 E8  FF 81 02 04  00 EE 07 F9   ...3.C..........
002A00  28 81 02 04  00 33 02 D5  01 82 82 77  06 81 02 24   (....3.....w...$
002A10  00 4E 07 D5  01 DD 91 80  06 46 07 D5  01 7C 82 80   .N.......F...|..
002A20  06 A1 25 4E  07 D5 01 D8  91 80 06 46  07 D5 01 7A   ..%N.......F...z
002A30  82 80 06 7A  01 6A 01 D5  01 7A 82 77  06 CA 09 81   ...z.j...z.w....
002A40  02 04 00 EE  07 A7 29 81  02 1A 00 C3  29 46 07 D5   ......)....)F..
002A50  01 78 82 80  06 D5 01 7A  82 77 06 30  05 81 02 04   .x.....z.w.0....
002A60  00 71 1A 7A  01 6A 01 D5  01 DB 86 77  06 81 02 04   .q.z.j.....w....
002A70  00 EE 07 D5  01 35 2A 46  07 D5 01 12  00 C1 17 7A   .....5*F.......z
002A80  01 40 01 04  00 40 01 03  00 6A 01 D5  01 FA 82 08   .@...@...j......
002A90  06 D5 01 BC  83 D5 01 10  00 97 07 D5  01 10 00 D5   ................
002AA0  01 FF 00 6E  07 7A 01 6A  01 00 06 8D  05 30 04 46   ...n.z.j.....0.F
002AB0  07 00 06 9D  05 F2 01 C9  2A D5 01 0A  00 31 03 B9   ........*....1..
002AC0  05 77 06 30  04 43 02 F2  FF 7A 01 6A  01 08 06 77   .w.0.C...z.j...w
002AD0  06 08 06 5E  07 8D 04 1B  06 80 06 D5  01 04 00 8D   ...^............
002AE0  04 81 02 06  00 4E 07 9A  04 7A 01 6A  01 46 07 D5   .....N...z.j.F..
002AF0  01 04 00 46  07 F2 01 23  2B 4E 07 CB  07 00 06 B9   ...F...#+N......
002B00  05 D5 01 04  00 31 03 30  04 CB 2A 4E  07 CB 07 00   .....1.0.*N....
002B10  06 B9 05 D5  01 04 00 31  03 30 04 42  04 CB 2A 43   .......1.0.B..*C
002B20  02 D8 FF D5  01 0B 83 80  06 7A 01 6A  01 F9 05 8D   .........z.j....
002B30  05 D5 01 0A  83 77 06 81  2A 8D 04 81  02 08 00 D5   .....w..*.......
002B40  01 04 00 30  04 8D 05 D5  01 05 00 31  03 8D 05 F9   ...0.......1....
002B50  05 08 06 5E  07 C1 04 81  02 30 00 56  07 CB 07 00   ...^.....0.V....
002B60  06 66 07 CB  07 9A 04 D5  01 07 00 CB  07 F9 05 4E   .f.............N
002B70  07 8D 04 D5  01 0A 00 31  03 D5 01 05  00 31 03 9D   .......1.....1..
002B80  05 30 04 9A  04 73 02 16  00 D5 01 0A  00 31 03 30   .0...s.......1.0
002B90  04 D5 01 3C  00 31 03 4E  07 1F 18 30  04 D5 01 05   ...<.1.N...0....
002BA0  00 CB 07 F9  05 5E 07 CB  07 9A 04 AD  05 9A 04 9D   .....^..........
002BB0  05 56 07 31  03 D5 01 FA  82 30 04 6D  06 9D 05 7A   .V.1.....0.m...z
002BC0  01 6A 01 D5  01 0A 83 77  06 08 06 D5  01 09 00 C1   .j.....w........
002BD0  04 81 02 06  00 46 06 EE  07 85 2A 8D  04 42 04 46   .....F....*..B.F
002BE0  07 F2 01 05  2C 4E 07 A7  2A F9 05 4E  07 A7 2A F9   ....,N..*..N..*.
002BF0  05 4E 07 A7  2A F9 05 4E  07 A7 2A F9  05 B9 05 2B   .N..*..N..*....+
002C00  2B 43 02 E2  FF F3 05 7A  01 6A 01 5E  07 A7 2A 08   +C.....z.j.^..*.
002C10  06 D5 01 6D  85 6D 06 C0  79 B2 09 08  06 81 02 0A   ...m.m..y.......
002C20  00 73 11 D5  01 82 82 80  06 7A 01 6A  01 F3 05 D5   .s.......z.j....
002C30  01 F7 82 77  06 08 06 D5  01 F6 82 77  06 C1 04 81   ...w.......w....
002C40  02 12 00 08  06 42 04 4F  11 51 04 1F  07 D5 01 F6   .....B.O.Q......
002C50  82 80 06 D5  01 FA 82 00  06 53 11 31  03 D5 01 CA   .........S.1....
002C60  8A 30 04 53  11 97 07 7A  01 6A 01 66  07 F9 05 47   .0.S...z.j.f...G
002C70  11 46 07 F2  01 9D 2C B9  05 60 04 2F  06 30 04 63   .F....,..`./.0.c
002C80  06 F9 05 D5  01 FA 82 30  04 63 06 B2  09 81 02 0A   .......0.c......
002C90  00 46 06 46  07 46 07 33  02 43 02 DC  FF F3 05 7A   .F.F.F.3.C.....z
002CA0  01 6A 01 D5  01 0A 83 77  06 D5 01 09  00 C1 04 81   .j.....w........
```

```
002CB0  02 08 00 D5  01 FF 00 EE  07 D5 01 FF  00 D5 01 F8   ................
002CC0  82 80 06 D5  01 FA 82 63  06 D5 01 F6  82 77 06 08   .......c.....w..
002CD0  06 D5 01 F7  82 80 06 46  07 F2 01 17  2D B9 05 27   .......F....-..'
002CE0  1B 2F 06 63  06 C1 04 81  02 16 00 69  2C 81 02 0C   ./.c.......i,...
002CF0  00 B9 05 D5  01 F8 82 80  06 33 02 73  02 16 00 63   .........3.s...c
002D00  06 66 07 C1  04 81 02 0C  00 B9 05 D5  01 F7 82 80   .f..............
002D10  06 33 02 43  02 C8 FF F3  05 D5 01 F8  82 77 06 08   .3.C.........w..
002D20  06 D5 01 FF  00 C1 04 81  02 1C 00 D5  01 AE 89 77   ...............w
002D30  06 81 02 10  00 D5 01 FF  00 D5 01 AE  89 80 06 73   ...............s
002D40  02 04 00 2B  2C 7A 01 6A  01 4B 11 31  03 D5 01 0A   ...+,z.j.K.1....
002D50  91 30 04 4B  11 46 07 F2  01 95 2D D5  01 0B 83 77   .0.K.F....-....w
002D60  06 B9 05 32  19 81 02 2A  00 2F 06 B9  05 30 04 D5   ...2...*./...0..
002D70  01 AE 89 77  06 81 02 18  00 77 06 B2  09 81 02 0C   ...w.....w......
002D80  00 D5 01 FF  00 D5 01 AE  89 80 06 73  02 04 00 80   ...........s....
002D90  06 43 02 C8  FF 46 06 7A  01 6A 01 4E  07 A7 2A 1B   .C...F.z.j.N..*.
002DA0  06 D5 01 0A  00 31 03 30  04 46 07 F8  06 23 11 1F   .....1.0.F...#..
002DB0  07 D5 01 F9  82 80 06 4E  07 A7 2A 08  06 D5 01 0A   .......N..*.....
002DC0  83 80 06 08  06 D5 01 09  00 C1 04 81  02 06 00 F3   ................
002DD0  05 EE 07 81  2A 8D 04 81  02 04 00 89  2A 7A 01 6A   ....*.......*z.j
002DE0  01 D5 01 0A  83 77 06 08  06 81 2A 8D  04 F9 05 D5   .....w....*.....
002DF0  01 09 00 B2  09 8D 04 81  02 04 00 EE  07 D5 01 F9   ................
002E00  82 77 06 A1  2C 00 06 47  2D D5 01 AE  89 77 06 81   .w..,..G-....w..
002E10  02 08 00 F3  05 73 02 08  00 08 06 07  4F A9 1E 89   .....s......O...
002E20  2A 7A 01 6A  01 09 2C 81  02 06 00 46  06 EE 07 99   *z.j..,....F....
002E30  2D EB 2A C1  2B DF 2D 7A  01 6A 01 46  07 F9 05 23   -.*.+.-z.j.F...#
002E40  2E 7A 01 6A  01 4E 07 F9  05 23 2E 7A  01 6A 01 F3   .z.j.N...#.z.j..
002E50  05 CB 18 D5  01 04 00 8E  02 08 00 1F  50 73 02 12   ............Ps..
002E60  00 D5 01 05  00 8E 02 08  00 93 1F 73  02 04 00 F3   ...........s....
002E70  05 7A 01 6A  01 F9 05 D5  01 3C 00 31  03 30 04 00   .z.j.....<.1.0..
002E80  06 5E 07 E8  04 81 02 08  00 4D 2E 73  02 16 00 08   .^.......M.s....
002E90  06 CA 09 81  02 0A 00 4E  07 D5 01 B9  83 80 06 1B   .......N........
002EA0  06 07 50 7A  01 6A 01 D5  01 05 00 23  06 3F 11 1F   ..Pz.j.....#.?..
002EB0  07 33 11 31  03 D5 01 D9  88 30 04 8D  05 56 07 A7   .3.1.....0...V..
002EC0  2A AD 05 C5  1F 80 06 56  07 A7 2A AD  05 CD 1F 80   *......V..*.....
002ED0  06 56 07 A7  2A AD 05 D5  1F 80 06 56  07 A7 2A AD   .V..*......V..*.
002EE0  05 DD 1F 80  06 F3 05 AD  05 C1 1F 80  06 AD 05 FB   ................
002EF0  1F 80 06 AD  05 F1 1F 80  06 9D 05 E7  1F 80 06 5D   ...............]
002F00  20 7A 01 6A  01 09 2C 81  02 06 00 F3  05 EE 07 D5    z.j..,.........
002F10  01 55 80 77  06 81 02 0E  00 46 07 79  36 43 3B 46   .U.w.....F.y6C;F
002F20  07 7D 36 43  3B 56 07 A7  2A F9 05 4E  07 A7 2A F9   .}6C;V..*..N..*.
002F30  05 56 07 A7  2A F9 05 56  07 A7 2A F9  05 56 07 A7   .V..*..V..*..V..
002F40  2A F9 05 00  06 81 02 08  00 A5 2E 73  02 06 00 46   *..........s...F
002F50  06 73 2E 7A  01 6A 01 09  2C 81 02 06  00 F3 05 EE   .s.z.j..,.......
002F60  07 D5 01 E9  86 D5 01 08  00 97 07 7A  01 6A 01 08   ...........z.j..
002F70  06 D5 01 08  00 30 04 46  07 1B 06 D5  01 E9 86 F9   .....0.F........
002F80  05 D5 01 08  00 46 07 F2  01 C1 2F 2F  06 B9 05 30   .....F....//...0
002F90  04 77 06 08  06 D5 01 09  00 B2 09 81  02 1E 00 F9   .w..............
002FA0  05 B9 05 30  04 77 06 B2  09 81 02 0C  00 DB 18 66   ...0.w.........f
002FB0  07 46 07 46  07 33 02 73  02 04 00 46  06 43 02 CC   .F.F.3.s...F.C..
002FC0  FF 46 06 7A  01 6A 01 6D  2F 81 02 06  00 F3 05 EE   .F.z.j.m/.......
002FD0  07 D5 01 55  80 77 06 81  02 08 00 46  07 79 36 43   ...U.w.....F.y6C
002FE0  3B 56 07 A7  2A F9 05 4E  07 A7 2A 08  06 D5 01 F1   ;V..*..N..*.....
002FF0  86 80 06 FD  4C C1 04 81  02 0A 00 F9  05 51 4C 73   ....L........QLs
003000  02 04 00 F9  05 D5 01 19  07 A7 2A D5  ............     ..........V..*.
003010  01 F2 86 80  06 56 07 A7  2A D5 01 63  00 1F 07 08   .....V..*..c....
003020  06 D5 01 63  00 C1 04 81  02 08 00 F3  05 D5 01 64   ...c...........d
003030  00 D5 01 F3  86 80 06 56  07 A7 2A D5  01 F4 86 80   .......V..*.....
003040  06 F3 05 46  07 D5 01 F9  86 80 06 46  07 D5 01 09   ...F.......F....
003050  87 80 06 7A  01 6A 01 F3  05 7A 01 6A  01 4E 07 A7   ...z.j...z.j.N..
003060  2A 81 02 0A  00 D5 01 08  00 73 02 04  00 46 07 D5   *........s...F..
```

```
003070  01 92 83 30  04 08 06 D5  01 C8 00 30  04 F9 05 F2   ...0.......0....
003080  01 8F 30 4E  07 A7 2A B9  05 80 06 43  02 F6 FF 7A   ..0N..*....C...z
003090  01 6A 01 56  07 A7 2A 0F  06 81 02 0A  00 D5 01 10   .j.V..*.........
0030A0  00 1F 07 91  47 56 07 A7  2A D5 01 70  83 80 06 7A   ....GV..*..p...z
0030B0  01 6A 01 4E  07 A7 2A 46  07 8E 02 2E  00 4E 07 D5   .j.N..*F.....N..
0030C0  01 7C 83 80  06 46 07 D5  01 5F 80 80  06 46 07 D5   .|...F..._...F..
0030D0  01 5D 80 6D  06 46 07 D5  01 64 80 80  06 46 07 D5   .].m.F...d...F..
0030E0  01 66 80 80  06 73 02 5C  00 4E 07 8E  02 16 00 08   .f...s.\.N......
0030F0  06 D5 01 C7  91 3F 11 D5  01 12 00 1F  07 97 07 73   .....?.........s
003100  02 42 00 5E  07 8E 02 08  00 1D 6D 73  02 36 00 D5   .B.^......ms.6..
003110  01 04 00 8E  02 10 00 4E  07 A7 2A D5  01 61 89 80   .......N..*..a..
003120  06 73 02 20  00 D5 01 05  00 8E 02 08  00 5B 30 73   .s. .........[0s
003130  02 12 00 D5  01 06 00 8E  02 08 00 91  30 73 02 04   ............0s..
003140  00 F3 05 7A  01 6A 01 09  2C 81 02 06  00 F3 05 EE   ...z.j..,.......
003150  07 B1 03 F3  05 7A 01 6A  01 0F 06 81  02 14 00 D5   ..0..z.j........
003160  01 05 00 31  03 D5 01 F0  00 30 04 D5  01 10 85 6D   ...1.....0.....m
003170  06 7A 01 6A  01 0F 06 81  02 14 00 D5  01 05 00 31   .z.j...........1
003180  03 D5 01 C0  03 30 04 D5  01 12 85 6D  06 7A 01 6A   .....0.....m.z.j
003190  01 D5 01 55  80 77 06 30  05 01 36 9A  04 81 02 06   ...U.w.0..6.....
0031A0  00 F3 05 EE  07 D5 01 72  83 2F 06 77  06 F9 05 81   .......r./.w....
0031B0  02 14 00 F3  05 5D 22 D5  01 14 00 D5  01 79 87 99   .....]"......y..
0031C0  15 73 02 08  00 81 02 04  00 2F 22 80  06 7A 01 6A   .s......./"..z.j
0031D0  01 46 07 D5  01 92 83 08  06 37 11 30  04 F9 05 F2   .F.......7.0....
0031E0  01 F7 31 F9  05 4E 07 A7  2A B9 05 77  06 8D 04 1B   ..1..N..*..w....
0031F0  06 9A 04 43  02 EE FF 81  02 0E 00 5E  07 A7 2A D5   ...C.......^..*.
003200  01 A2 83 6D  06 51 52 F3  05 7A 01 6A  01 D5 01 75   ...m.QR..z.j...u
003210  83 80 06 56  07 A7 2A D5  01 74 83 80  06 4E 07 A7   ...V..*..t...N..
003220  2A D5 01 78  83 80 06 56  07 A7 2A D5  01 80 83 80   *..x...V..*.....
003230  06 56 07 A7  2A D5 01 81  83 80 06 56  07 A7 2A D5   .V..*......V..*.
003240  01 82 83 80  06 4E 07 A7  2A 8F 31 56  07 A7 2A 57   .....N..*.1V..*W
003250  31 56 07 A7  2A 73 31 5E  07 A7 2A D5  01 76 83 6D   1V..*s1^..*..v.m
003260  06 F3 05 4E  07 D5 01 7E  83 80 06 7A  01 6A 01 A6   ...N...~...z.j..
003270  73 81 02 08  00 6D 33 73  02 04 00 F3  05 7A 01 6A   s....m3s.....z.j
003280  01 4E 07 A7  2A 08 06 56  07 E8 04 81  02 24 00 5E   .N..*..V.....$.^
003290  07 8E 02 08  00 CF 31 73  02 14 00 D5  01 04 00 8E   ......1s........
0032A0  02 08 00 6D  32 73 02 06  00 F3 05 F3  05 73 02 2A   ...m2s.......s.*
0032B0  00 D5 01 0A  00 31 03 F9  05 4E 07 A7  2A 1B 06 30   .....1...N..*..0
0032C0  04 08 06 D5  01 17 00 B2  09 D5 01 7F  83 77 06 8D   .............w..
0032D0  04 81 02 04  00 73 16 0B  32 7A 01 6A  01 00 06 CA   .....s..2z.j....
0032E0  09 81 02 08  00 F9 3A 73  02 04 00 46  06 7A 01 6A   ......:s...F.z.j
0032F0  01 56 07 A7  2A 85 36 DB  32 56 07 A7  2A 89 36 DB   .V..*.6.2V..*.6.
003300  32 56 07 A7  2A 8D 36 DB  32 56 07 A7  2A 91 36 DB   2V..*.6.2V..*.6.
003310  32 56 07 A7  2A 95 36 DB  32 56 07 A7  2A 99 36 DB   2V..*.6.2V..*.6.
003320  32 56 07 A7  2A B5 36 DB  32 56 07 A7  2A B9 36 DB   2V..*.6.2V..*.6.
003330  32 F3 05 7A  01 6A 01 46  07 F2 01 61  33 D5 01 04   2..z.j.F...a3...
003340  00 A7 2A 08  06 30 05 81  02 0A 00 F3  05 33 02 73   ..*..0.......3.s
003350  02 04 00 F9  05 5E 07 A7  2A 1B 06 6D  06 43 02 DE   .....^..*..maC..
003360  FF F3 05 7A  01 6A 01 5E  07 35 33 7A  01 6A 01 D5   ...z.j.^.53z.j..
003370  01 04 00 35  33 7A 01 6A  01 08 06 23  11 30 04 F9   ...53z.j...#.0..
003380  05 F2 01 97  33 4E 07 A7  2A 0F 06 81  02 06 00 B9   ....3N..*.......
003390  05 80 06 43  02 F0 FF F3  05 7A 01 6A  01 D5 01 15   ...C.....z.j....
0033A0  85 77 33 7A  01 6A 01 D5  01 26 85 77  33 7A 01 6A   .w3z.j...&.w3z.j
0033B0  01 1B 06 46  07 F8 06 57  11 51 04 1F  07 63 11 31   ...F...W.Q...c.1
0033C0  03 D5 01 65  89 30 04 08  06 63 11 D5  01 FF 00 6E   ...e.0...c.....n
0033D0  07 F9 05 46  07 F8 06 5F  11 1F 07 5B  11 31 03 00   ...F..._...[.1..
0033E0  06 30 04 F9  05 1D 02 39  34 4E 07 A7  2A F9 05 4E   .0.....94N..*..N
0033F0  07 A7 2A 1B  06 08 06 5E  07 8D 04 D5  01 04 00 CB   ..*....^........
003400  07 F9 05 D5  01 04 00 8D  04 81 02 0A  00 D5 01 0A   ................
003410  00 73 02 04  00 46 07 1B  06 30 04 08  06 23 11 D1   .s...F...0...#..
003420  04 81 02 0C  00 9A 04 B9  05 80 06 73  02 06 00 46   ...........s...F
```

```
003430  06 33 02 5B  11 5B 02 B2  FF F3 05 7A  01 6A 01 4E   .3.[.[.....z.j.N
003440  07 A7 2A F9  05 4E 07 A7  2A AF 33 7A  01 6A 01 D5   ..*..N..*.3z.j..
003450  01 05 00 31  03 42 04 60  04 D5 01 A2  83 30 04 08   ...1.B.`.....0..
003460  06 D5 01 0A  00 30 04 F9  05 F2 01 87  34 5E 07 A7   .....0......4^..
003470  2A 0F 06 81  02 0A 00 B9  05 6D 06 73  02 04 00 33   *........m.s...3
003480  02 56 07 5B  02 E8 FF F3  05 7A 01 6A  01 09 2C 81   .V.[.....z.j..,.
003490  02 08 00 F3  05 73 02 68  00 4E 07 A7  2A 46 07 8E   .....s.h.N..*F..
0034A0  02 08 00 65  33 73 02 58  00 4E 07 8E  02 08 00 9B   ...e3s.X.N......
0034B0  33 73 02 4C  00 56 07 8E  02 08 00 EF  33 73 02 40   3s.L.V......3s.@
0034C0  00 5E 07 8E  02 08 00 EF  32 73 02 34  00 D5 01 04   .^......2s.4....
0034D0  00 8E 02 08  00 3D 34 73  02 26 00 D5  01 05 00 8E   .....=4s.&......
0034E0  02 0A 00 46  07 4D 34 73  02 16 00 D5  01 06 00 8E   ...F.M4s........
0034F0  02 0A 00 4E  07 4D 34 73  02 06 00 F3  05 F3 05 7A   ...N.M4s.......z
003500  01 6A 01 46  07 8E 02 08  00 39 2E 73  02 7E 00 4E   .j.F.....9.s.~.N
003510  07 8E 02 08  00 43 2E 73  02 72 00 56  07 8E 02 08   .....C.s.r.V....
003520  00 7F 32 73  02 66 00 5E  07 8E 02 08  00 55 30 73   ..2s.f.^.....U0s
003530  02 5A 00 D5  01 04 00 8E  02 08 00 45  31 73 02 4C   .Z.........E1s.L
003540  00 D5 01 05  00 8E 02 08  00 55 2F 73  02 3E 00 D5   .........U/s.>..
003550  01 06 00 8E  02 08 00 C5  2F 73 02 30  00 D5 01 07   ......../s.0....
003560  00 8E 02 08  00 03 2F 73  02 22 00 D5  01 08 00 8E   ....../s."......
003570  02 08 00 8B  34 73 02 14  00 D5 01 09  00 8E 02 08   ....4s..........
003580  00 F3 05 73  02 06 00 F3  05 F3 05 D5  01 87 82 B9   ...s............
003590  18 4E 07 D5  01 79 82 80  06 7A 01 6A  01 D5 01 80   .N...y...z.j....
0035A0  82 63 06 D5  01 DB 91 77  06 01 35 7A  01 6A 01 D5   .c.....w..5z.j..
0035B0  01 7A 82 77  06 CA 09 81  02 1E 00 9B  35 66 07 65   .z.w........5f.e
0035C0  18 11 55 4E  07 D5 01 DD  91 80 06 46  07 D5 01 7C   ..UN.......F...|
0035D0  82 80 06 A1  25 71 1A 7A  01 6A 01 D5  01 AD 35 46   ....%q.z.j....5F
0035E0  07 D5 01 11  00 C1 17 7A  01 40 01 63  00 40 01 2F   .......z.@.c.@./
0035F0  00 40 01 00  00 40 01 01  00 40 01 02  00 40 01 03   .@...@...@...@..
003600  00 6A 01 D5  01 55 80 77  06 30 05 81  02 06 00 66   .j...U.w.0.....f
003610  07 EE 07 59  36 7B 39 81  02 0E 00 D5  01 20 00 8D   ...Y6{9......  .
003620  04 30 05 73  02 06 00 F3  05 66 07 7A  01 6A 01 D5   .0.s.....f.z.j..
003630  01 55 80 77  06 30 05 81  02 06 00 66  07 EE 07 59   .U.w.0.....f...Y
003640  36 7B 39 81  02 0E 00 D5  01 03 00 8D  04 30 05 73   6{9..........0.s
003650  02 06 00 F3  05 46 07 7A  01 40 01 04  00 40 01 04   .....F.z.@...@..
003660  00 40 01 07  00 40 01 08  00 40 01 0B  00 40 01 0C   .@...@...@...@..
003670  00 40 01 0D  00 40 01 0E  00 40 01 0F  00 40 01 10   .@...@...@...@..
003680  00 40 01 11  00 40 01 12  00 40 01 13  00 40 01 16   .@...@...@...@..
003690  00 40 01 17  00 40 01 1A  00 40 01 1B  00 40 01 14   .@...@...@...@..
0036A0  00 40 01 15  00 40 01 18  00 40 01 19  00 40 01 1C   .@...@...@...@..
0036B0  00 40 01 1D  00 40 01 1E  00 40 01 1F  00 40 01 20   .@...@...@...@.
0036C0  00 40 01 21  00 40 01 22  00 40 01 23  00 40 01 24   .@.!.@.".@.#.@.$
0036D0  00 40 01 25  00 40 01 26  00 40 01 27  00 40 01 28   .@.%.@.&.@.'.@.(
0036E0  00 40 01 29  00 40 01 2A  00 40 01 2B  00 40 01 2C   .@.).@.*.@.+.@.,
0036F0  00 40 01 2D  00 40 01 2E  00 40 01 2F  00 6A 01 B9   .@.-.@...@./.j..
003700  35 79 36 43  3B 7A 01 6A  01 E9 35 7D  36 43 3B 7A   5y6C;z.j..5}6C;z
003710  01 6A 01 D5  01 55 80 77  06 81 02 5A  00 D5 01 FA   .j...U.w...Z....
003720  00 39 18 D5  01 5A 00 E5  36 43 3B D5  01 32 00 E9   .9...Z..6C;..2..
003730  36 43 3B 46  07 ED 36 43  3B 46 07 F1  36 43 3B 25   6C;F..6C;F..6C;%
003740  22 D5 01 7C  83 77 06 30  05 6C 0C 42  19 48 0C 8D   "..|.w.0.l.B.H..
003750  04 54 0C C1  04 9A 04 81  02 04 00 B5  37 D5 01 63   .T..........7..c
003760  89 77 06 81  02 04 00 07  37 D5 01 62  89 77 06 81   .w......7..b.w..
003770  02 04 00 FD  36 7A 01 6A  01 5E 07 D5  01 9E 8A 80   ....6z.j.^......
003780  06 D5 01 05  00 D5 01 90  8A 80 06 2D  21 D5 01 0F   ...........-!...
003790  00 D5 01 64  89 80 06 46  07 D5 01 97  8A 80 06 D5   ...d...F........
0037A0  01 0A 00 D5  01 8E 8A 80  06 D5 01 0A  00 D5 01 8F   ................
0037B0  8A 80 06 7A  01 6A 01 46  07 D5 01 63  89 80 06 46   ...z.j.F...c...F
0037C0  07 D5 01 62  89 80 06 46  07 79 36 43  3B 46 07 7D   ...b...F.y6C;F.}
0037D0  36 43 3B 46  07 81 36 43  3B D5 01 90  8A 77 06 BD   6C;F..6C;....w..
0037E0  36 43 3B D5  01 97 8A 77  06 E1 36 43  3B D5 01 8E   6C;....w..6C;...
```

```
0037F0  8A 77 06 C1  36 43 3B D5  01 8F 8A 77  06 C5 36 43   .w..6C;....w..6C
003800  3B 7A 01 6A  01 F1 35 8E  02 CC 00 D5  01 08 00 46   ;z.j..5........F
003810  07 73 02 38  00 F5 35 8E  02 0A 00 4E  07 4E 07 73   .s.8..5....N.N.s
003820  02 2A 00 F9  35 8E 02 0A  00 56 07 56  07 73 02 1C   .*..5....V.V.s..
003830  00 FD 35 8E  02 0E 00 D5  01 C4 00 D5  01 04 00 73   ..5............s
003840  02 0A 00 4E  07 4E 07 1B  06 F3 05 7A  01 6A 01 08   ...N.N.....z.j..
003850  06 D5 01 98  8A 80 06 D5  01 99 8A 08  06 77 06 1B   .............w..
003860  06 F8 18 B1  18 7A 01 6A  01 D5 01 98  8A 77 06 D5   .....z.j.....w..
003870  01 99 8A 08  06 77 06 1B  06 0A 19 B1  18 7A 01 6A   .....w.......z.j
003880  01 D5 01 82  80 8D 05 46  07 AD 05 80  06 D5 01 07   .......F........
003890  00 AD 05 42  04 80 06 D5  01 84 00 AD  05 56 07 30   ...B.........V.0
0038A0  04 80 06 46  07 AD 05 5E  07 30 04 80  06 46 07 AD   ...F...^.0...F..
0038B0  05 D5 01 04  00 30 04 80  06 08 06 AD  05 D5 01 05   .....0..........
0038C0  00 30 04 80  06 4E 07 AD  05 D5 01 06  00 30 04 80   .0...N.......0..
0038D0  06 08 06 D5  01 8C 00 30  04 D5 01 FF  00 8D 04 9D   .......0........
0038E0  05 D5 01 07  00 30 04 80  06 D5 01 02  81 08 06 D5   .....0..........
0038F0  01 80 00 83  07 8D 05 46  07 D5 01 60  82 80 06 46   .......F...`...F
003900  07 D5 01 85  81 80 06 D5  01 08 00 D5  01 82 81 80   ................
003910  06 D5 01 08  00 D5 01 84  81 80 06 D5  01 A0 00 D5   ................
003920  01 90 81 80  06 AD 05 49  04 77 06 D5  01 85 00 C1   .......I.w......
003930  04 D5 01 82  81 77 06 30  05 8D 04 81  02 26 00 D5   .....w.0.....&..
003940  01 04 00 D5  01 90 81 80  06 AD 05 D5  01 06 00 30   ...............0
003950  04 77 06 9D  05 D5 01 05  00 30 04 77  06 1B 06 C1   .w.......0.w....
003960  04 EE 07 D5  01 90 81 77  06 30 05 81  02 B8 FF 4E   .......w.0.....N
003970  07 1F 18 F3  05 67 38 46  07 7A 01 6A  01 08 06 8D   .....g8F.z.j....
003980  05 D5 01 90  81 77 06 30  05 D5 01 83  81 77 06 30   .....w.0.....w.0
003990  05 8D 04 81  02 EC FF 7F  38 00 06 9D  05 ED 35 42   ........8.....5B
0039A0  04 1F 07 D5  01 10 8A 30  04 80 06 4E  07 D5 01 83   .......0...N....
0039B0  81 80 06 7A  01 6A 01 D5  01 82 80 8D  05 46 07 AD   ...z.j.......F..
0039C0  05 80 06 D5  01 08 00 AD  05 42 04 80  06 D5 01 86   .........B......
0039D0  00 AD 05 56  07 30 04 80  06 46 07 AD  05 5E 07 30   ...V.0...F...^.0
0039E0  04 80 06 46  07 AD 05 D5  01 04 00 30  04 80 06 08   ...F.......0....
0039F0  06 AD 05 D5  01 05 00 30  04 80 06 4E  07 AD 05 D5   .......0...N....
003A00  01 06 00 30  04 80 06 00  06 AD 05 D5  01 07 00 30   ...0...........0
003A10  04 80 06 30  04 D5 01 8F  00 30 04 D5  01 FF 00 8D   ...0.....0......
003A20  04 9D 05 D5  01 08 00 30  04 80 06 D5  01 02 81 08   .......0........
003A30  06 D5 01 80  00 83 07 8D  05 46 07 D5  01 60 82 80   .........F...`..
003A40  06 4E 07 D5  01 89 81 80  06 46 07 D5  01 85 81 80   .N.......F......
003A50  06 D5 01 04  00 D5 01 82  81 80 06 D5  01 09 00 D5   ................
003A60  01 84 81 80  06 D5 01 89  8A 77 06 D5  01 90 81 80   .........w......
003A70  06 AD 05 49  04 77 06 D5  01 20 00 C1  04 D5 01 82   ...I.w... ......
003A80  81 77 06 30  05 8D 04 81  02 24 00 9D  05 F3 05 66   .w.0.....$.....f
003A90  07 D5 01 9A  8A 08 06 77  06 D5 01 89  8A 77 06 D5   .......w.....w..
003AA0  01 90 81 77  06 38 04 F8  06 B1 18 EE  07 D5 01 90   ...w.8..........
003AB0  81 77 06 30  05 81 02 BA  FF 4E 07 1F  18 F3 05 67   .w.0.....N.....g
003AC0  38 46 07 7A  01 6A 01 D5  01 69 87 77  06 81 02 08   8F.z.j...i.w....
003AD0  00 46 06 66  07 EE 07 D5  01 90 81 77  06 30 05 D5   .F.f.......w.0..
003AE0  01 83 81 77  06 30 05 8D  04 81 02 EC  FF B5 39 4E   ...w.0........9N
003AF0  07 D5 01 83  81 80 06 7A  01 6A 01 D5  01 9B 8A 77   .......z.j.....w
003B00  06 46 07 1D  02 3F 3B 2F  06 D5 01 9C  8A 08 06 77   .F...?;/.......w
003B10  06 B9 05 F8  06 B1 18 C5  3A 81 02 04  00 33 02 D5   ........:....3..
003B20  01 FE 00 D5  01 90 81 80  06 D5 01 88  8A 08 06 77   ...............w
003B30  06 42 04 D5  01 FE 00 1F  07 B1 18 43  02 CA FF 46   .B.........C...F
003B40  06 7A 01 6A  01 F9 3A 7A  01 6A 01 46  07 4D 38 46   .z.j..:z.j.F.M8F
003B50  07 79 36 F9  3A 4E 07 4D  38 46 07 7D  36 F9 3A 7A   .y6.:N.M8F.}6.:z
003B60  01 6A 01 79  36 7B 39 F3  05 B9 35 C1  04 7D 36 7B   .j.y6{9...5..}6{
003B70  39 F3 05 E9  35 C1 04 9A  04 B4 04 7A  01 6A 01 F5   9...5......z.j..
003B80  35 C1 04 D1  36 7B 39 F3  05 D5 01 FF  00 B2 09 8D   5...6{9.........
003B90  04 B4 04 81  02 04 00 2F  22 46 07 D5  01 57 8A 80   ......./"F...W..
003BA0  06 46 07 D5  01 88 8A 80  06 F9 3C B4  04 81 02 04   .F........<.....
```

```
003BB0  00 49 3B 6B  3C 27 52 7A  01 6A 01 03  38 75 36 56   .I;k<'Rz.j..8u6V
003BC0  07 4D 38 F9  3A 61 3B 81  02 0E 00 71  36 5E 07 4D   .M8.:a;....q6^.M
003BD0  38 F9 3A 73  02 04 00 F3  05 D5 01 07  00 4D 38 D5   8.:s.........M8.
003BE0  01 8A 8A 77  06 D5 01 69  87 99 15 46  07 D5 01 89   ...w...i...F....
003BF0  81 80 06 7A  01 6A 01 08  06 7D 3B B9  3B 7A 01 40   ...z.j...};.;z.@
003C00  01 01 00 40  01 02 00 40  01 15 00 6A  01 F3 05 08   ...@...@...j....
003C10  06 D5 01 54  8A 6D 06 D5  01 AB 89 6D  06 D5 01 59   ...T.m.....m...Y
003C20  8A 08 06 63  06 D5 01 5B  8A 6D 06 6D  06 D5 01 6E   ...c...[.m.m...n
003C30  8A 77 06 D5  01 8C 8A 80  06 46 07 D5  01 8D 8A 80   .w.......F......
003C40  06 46 07 D5  01 8B 8A 80  06 4E 07 D5  01 7E 8A 80   .F.......N.~..
003C50  06 56 07 D5  01 59 87 99  15 7A 01 40  01 3C 00 40   .V...Y...z.@.<.@
003C60  01 00 00 40  01 01 00 40  01 02 00 6A  01 46 07 D5   ...@...@...j.F..
003C70  01 66 8A 80  06 46 07 D5  01 5E 8A 80  06 D5 01 67   .f...F...^.....g
003C80  8A 5F 41 D5  01 5F 8A 5F  41 7A 01 6A  01 00 06 7B   ._A.._._Az.j...{
003C90  39 81 02 4C  00 E9 35 C1  04 81 02 3A  00 08 06 77   9..L..5....:...w
003CA0  06 46 07 8E  02 0E 00 D5  01 64 89 77  06 B1 1B 73   .F.......d.w...s
003CB0  02 1E 00 4E  07 8E 02 14  00 46 07 B1  18 46 07 00   ...N.....F...F..
003CC0  06 43 3B 46  07 07 4F 73  02 06 00 F3  05 F3 05 F3   .C;F..Os........
003CD0  05 73 02 08  00 46 07 B1  18 F3 05 73  02 06 00 F3   .s...F.....s....
003CE0  05 46 06 7A  01 6A 01 7D  36 D5 01 63  89 8B 3C 79   .F.z.j.}6..c..<y
003CF0  36 D5 01 62  89 8B 3C 7A  01 6A 01 D5  01 63 89 77   6..b..<z.j...c.w
003D00  06 D5 01 62  89 77 06 30  04 CA 09 7A  01 6A 01 08   ...b.w.0...z.j..
003D10  06 D5 01 74  8A 6D 06 08  06 E3 06 D5  01 54 8A 63   ...t.m.......T.c
003D20  06 D5 01 85  8A 77 06 E8  04 B4 04 81  02 06 00 66   .....w.........f
003D30  07 EE 07 00  06 D5 01 0F  00 E8 04 81  02 06 00 46   ...............F
003D40  07 EE 07 00  06 D5 01 FB  FF D1 04 81  02 08 00 46   ...............F
003D50  07 73 02 04  00 66 07 7A  01 6A 01 F3  05 81 02 08   .s...f.z.j......
003D60  00 4E 07 73  02 04 00 66  07 D5 01 A4  8A F9 05 00   .N.s...f........
003D70  06 77 06 30  04 46 07 F8  06 D5 01 0F  00 1F 07 B1   .w.0.F..........
003D80  18 7A 01 6A  01 0D 3D 81  02 06 00 46  06 EE 07 D5   .z.j..=....F....
003D90  01 57 8A 77  06 81 02 06  00 59 3D EE  07 D5 01 7C   .W.w.....Y=....|
003DA0  8A 77 06 4E  07 F8 06 1A  04 56 07 1A  04 F9 05 21   .w.N.....V.....!
003DB0  05 81 02 04  00 C1 06 0F  06 81 02 62  00 D5 01 76   ...........b...v
003DC0  8A 77 06 D5  01 77 8A 77  06 38 04 30  04 D5 01 64   .w...w.w.8.0...d
003DD0  00 31 03 D5  01 7A 8A 77  06 1A 04 D5  01 83 8A 77   .1...z.w.......w
003DE0  06 1F 07 46  07 F8 06 08  06 D5 01 7B  8A 77 06 63   ...F.......{.w.c
003DF0  3C C1 04 81  02 0A 00 D5  01 70 8A 73  02 06 00 D5   <........p.s....
003E00  01 6F 8A 08  06 8D 05 77  06 38 04 E3  06 D5 01 71   .o.....w.8.....q
003E10  8A 80 06 D5  01 FF 00 1F  07 9D 05 80  06 7A 01 6A   .............z.j
003E20  01 D5 01 83  3D 66 07 D5  01 0E 00 C1  17 7A 01 6A   ....=f.......z.j
003E30  01 08 06 CA  09 D5 01 8D  8A 77 06 30  05 8D 04 81   .........w.0....
003E40  02 28 00 D3  18 C1 04 81  02 18 00 C1  06 1F 3E 46   .(............>F
003E50  07 D5 01 7E  8A 80 06 D5  01 7D 8A 77  06 73 02 06   ...~.....}.w.s..
003E60  00 F3 05 56  07 73 02 52  00 D5 01 8D  8A 77 06 81   ...V.s.R.....w..
003E70  02 24 00 CA  09 8D 05 B2  09 9D 05 8D  04 81 02 04   .$..............
003E80  00 EE 07 D5  01 8B 8A 77  06 46 07 D5  01 8D 8A 80   .......w.F......
003E90  06 73 02 16  00 F3 05 38  04 E3 06 D5  01 76 8A 77   .s.....8.....v.w
003EA0  06 31 03 D5  01 0A 00 F8  06 1F 3E 46  07 D5 01 7E   .1........>F...~
003EB0  8A 80 06 D5  01 7D 8A 77  06 D5 01 59  87 99 15 7A   .....}.w...Y...z
003EC0  01 6A 01 D5  01 7B 8A 77  06 63 3C C1  04 81 02 08   .j...{.w.c<.....
003ED0  00 61 36 73  02 04 00 65  36 7B 39 30  05 81 02 06   .a6s...e6{90....
003EE0  00 F3 05 EE  07 D5 01 58  8A 77 06 08  06 1B 06 B2   .......X.w......
003EF0  09 81 02 0A  00 46 07 D5  01 7E 8A 80  06 D5 01 6E   .....F...~.....n
003F00  8A 77 06 D5  01 AB 89 63  06 2F 3E 7A  01 6A 01 D5   .w.....c./>z.j..
003F10  01 C1 3E 46  07 D5 01 0D  00 C1 17 7A  01 6A 01 D5   ..>F.......z.j..
003F20  01 6E 8A 77  06 D5 01 7F  8A 77 06 2F  06 38 04 46   .n.w.....w./.8.F
003F30  07 F8 06 0F  06 81 02 10  00 67 3C 38  06 D5 01 58   .........g<8...X
003F40  8A 80 06 F3  05 EE 07 F3  05 D5 01 80  8A 77 06 F9   .............w..
003F50  05 2F 06 38  04 46 07 F8  06 0F 06 81  02 10 00 63   ./.8.F.........c
003F60  3C 38 06 F3  05 D5 01 58  8A 80 06 EE  07 D5 01 58   <8.....X.......X
```

```
003F70  8A 80 06 F3  05 46 07 5F  3C 7A 01 6A  01 D5 01 1D   .....F._<z.j....
003F80  3F 56 07 D5  01 0C 00 C1  17 7A 01 6A  01 D5 01 7C   ?V.......z.j...|
003F90  8A 77 06 D5  01 04 00 38  04 46 07 F8  06 D5 01 73   .w.....8.F.....s
003FA0  8A 77 06 31  03 D5 01 7A  8A 77 06 31  03 D5 01 64   .w.1...z.w.1...d
003FB0  00 1A 04 08  06 D5 01 72  8A 80 06 30  04 7A 01 6A   .......r...0.z.j
003FC0  01 7B 3F 2F  06 D5 01 7B  8A 80 06 D5  01 7C 8A 80   .{?/...{.....|..
003FD0  06 67 3C 8E  02 12 00 D5  01 5F 8A 77  06 D5 01 6F   .g<......_.w...o
003FE0  8A 77 06 73  02 20 00 63  3C 8E 02 12  00 D5 01 67   .w.s. .c<......g
003FF0  8A 77 06 D5  01 70 8A 77  06 73 02 0A  00 46 07 46   .w...p.w.s...F.F
004000  07 1B 06 F3  05 00 06 D5  01 7A 8A 80  06 31 03 D5   .........z...1..
004010  01 64 00 09  04 F9 05 D5  01 1E 00 E8  04 81 02 04   .d..............
004020  00 42 04 D5  01 77 8A 77  06 30 04 08  06 D5 01 76   .B...w.w.0.....v
004030  8A 80 06 31  03 8B 3F D5  01 85 8A 77  06 F8 06 7A   ...1..?....w...z
004040  01 6A 01 D5  01 BF 3F 4E  07 D5 01 0B  00 C1 17 7A   .j....?N.......z
004050  01 6A 01 D5  01 59 87 77  06 CA 09 81  02 04 00 EE   .j...Y.w........
004060  07 5D 36 7B  39 81 02 0C  00 D5 01 6E  8A 80 06 73   .]6{9......n...s
004070  02 06 00 F3  05 EE 07 D5  01 7E 8A 77  06 81 02 06   .........~.w....
004080  00 0D 3F EE  07 D5 01 53  8A 77 06 51  04 D5 01 04   ..?....S.w.Q....
004090  00 F0 09 D5  01 04 00 31  03 85 36 30  04 08 06 7B   .......1..60...{
0040A0  39 81 02 0C  00 D5 01 80  8A 80 06 73  02 06 00 46   9..........s...F
0040B0  06 EE 07 42  04 7B 39 81  02 0C 00 D5  01 7F 8A 80   ...B.{9.........
0040C0  06 73 02 06  00 F3 05 EE  07 41 40 D5  01 84 8A 77   .s.......A@....w
0040D0  06 1F 07 D5  01 51 8A 6D  06 56 07 D5  01 59 87 99   .....Q.m.V...Y..
0040E0  15 7A 01 6A  01 D5 01 51  40 46 07 D5  01 14 00 C1   .z.j...Q@F......
0040F0  17 7A 01 6A  01 08 06 4E  07 C1 04 81  02 08 00 56   .z.j...N.......V
004100  07 73 02 04  00 5E 07 8D  05 8D 05 08  06 8D 05 42   .s...^.........B
004110  04 08 06 42  04 D5 01 05  00 A8 07 08  06 AD 05 42   ...B...........B
004120  04 80 06 08  06 30 04 AD  05 49 04 77  06 30 04 AD   .....0...I.w.0..
004130  05 42 04 08  06 9D 05 AD  05 F9 05 8D  05 30 04 F9   .B...........0..
004140  05 1D 02 4F  41 B9 05 77  06 30 04 43  02 F8 FF 9D   ...OA..w.0.C....
004150  05 F9 05 9D  05 9D 05 30  04 1A 04 B1  18 7A 01 6A   .......0.....z.j
004160  01 D5 01 07  00 83 07 7A  01 6A 01 63  3C C1 04 81   .......z.j.c<...
004170  02 0A 00 D5  01 70 8A 73  02 06 00 D5  01 6F 8A 77   .....p.s.....o.w
004180  06 4E 07 F8  06 47 15 D5  01 A0 8A 63  06 38 04 D5   .N...G.....c.8..
004190  01 A2 8A 77  06 4E 07 F8  06 1A 04 D5  01 A4 8A 77   ...w.N.........w
0041A0  06 D5 01 05  00 38 04 30  04 4E 07 F8  06 D5 01 64   .....8.0.N.....d
0041B0  00 31 03 F9  05 1A 04 D5  01 64 00 1F  07 4E 07 F8   .1.......d...N..
0041C0  06 7A 01 6A  01 F9 05 F3  05 D5 01 64  00 31 03 D5   .z.j.......d.1..
0041D0  01 FF 00 1A  04 7A 01 6A  01 69 41 D3  18 4E 07 B1   .....z.j.iA..N..
0041E0  18 08 06 5F  41 2F 06 80  06 42 04 80  06 46 07 53   ..._A/...B...F.S
0041F0  50 B9 3B D5  01 05 00 D5  01 59 87 7F  15 7A 01 6A   P.;......Y...z.j
004200  01 08 06 8D  05 63 3C C1  04 81 02 0E  00 D5 01 67   .....c<........g
004210  8A D5 01 66  8A 73 02 0A  00 D5 01 5F  8A D5 01 5E   ...f.s....._...^
004220  8A D5 01 57  8A 77 06 81  02 0E 00 38  06 46 06 4E   ...W.w.....8.F.N
004230  07 1F 18 D7  41 EE 07 9D  05 F3 05 08  06 77 06 42   ....A........w.B
004240  04 4E 07 D5  01 06 00 83  19 F9 05 08  06 8D 05 80   .N..............
004250  06 8D 05 F9  05 C3 41 9D  05 9D 05 77  06 F3 40 7A   ......A....w..@z
004260  01 6A 01 D5  01 FF 41 D5  01 FD FF D5  01 09 00 C1   .j....A.........
004270  17 7A 01 6A  01 D5 01 57  8A 77 06 81  02 3E 00 DB   .z.j...W.w...>..
004280  18 47 15 D5  01 A0 8A 63  06 38 04 4E  07 F8 06 D5   .G.....c.8.N....
004290  01 A3 8A 77  06 E8 04 5D  36 7B 39 F9  05 D5 01 9F   ...w...]6{9.....
0042A0  8A 77 06 38  04 E3 06 08  06 D5 01 A2  8A 80 06 4E   .w.8...........N
0042B0  07 E8 04 8D  04 9A 04 73  02 14 00 D5  01 FA 00 E8   .......s........
0042C0  04 D3 18 30  04 D5 01 19  00 D1 04 9A  04 7A 01 6A   ...0.........z.j
0042D0  01 8D 05 2F  06 AD 05 73  42 81 02 66  00 D5 01 78   .../...sB..f...x
0042E0  8A 77 06 08  06 8D 05 63  3C C1 04 81  02 04 00 F9   .w.....c<.......
0042F0  05 F3 05 D5  01 19 00 F8  06 D5 01 79  8A 77 06 D5   ...........y.w..
004300  01 19 00 F8  06 30 04 56  07 1A 04 08  06 D5 01 81   .....0.V........
004310  8A 80 06 9D  05 9D 05 D5  01 14 00 38  04 D5 01 14   ...........8....
004320  00 F8 06 D5  01 FA 00 1F  07 08 06 D5  01 82 8A 80   ................
```

| | | | | | | | | | | | | | | |
|---|---|---|---|---|---|---|---|---|---|---|---|---|---|---|
| 004330 | 06 | F9 | 05 | 61 | 42 | 5F | 3C | D5 | 01 | 78 | 8A | 80 | 06 | 73 | 02 | 08 | ...aB_<..x...s.. |
| 004340 | 00 | 4E | 07 | 1F | 18 | DB | 18 | 7A | 01 | 6A | 01 | D5 | 01 | CF | 42 | D5 | .N.....z.j....B. |
| 004350 | 01 | FD | FF | D5 | 01 | 0A | 00 | C1 | 17 | 7A | 01 | 6A | 01 | D5 | 01 | 57 | .........z.j...W |
| 004360 | 8A | 77 | 06 | CA | 09 | 81 | 02 | 0C | 00 | 46 | 07 | D5 | 01 | 56 | 8A | 80 | .w.......F...V.. |
| 004370 | 06 | EE | 07 | 79 | 36 | 7B | 39 | B4 | 04 | 9A | 04 | 7D | 36 | 7B | 39 | B4 | ...y6{9....}6{9. |
| 004380 | 04 | 9A | 04 | 9A | 04 | 46 | 07 | ED | 1B | D3 | 18 | F5 | 35 | B2 | 09 | F9 | .....F......5... |
| 004390 | 05 | 47 | 15 | 08 | 06 | D5 | 01 | A0 | 8A | 6D | 06 | D5 | 01 | 78 | 00 | 30 | .G.......m...x.0 |
| 0043A0 | 04 | D1 | 04 | B4 | 04 | 9A | 04 | 9A | 04 | 9A | 04 | 81 | 02 | 04 | 00 | EE | ................ |
| 0043B0 | 07 | 7B | 3F | 5F | 3C | C1 | 04 | F9 | 05 | 5E | 07 | D1 | 04 | 9A | 04 | 81 | .{?_<....^...... |
| 0043C0 | 02 | 04 | 00 | EE | 07 | 5D | 36 | 7B | 39 | 81 | 02 | 0C | 00 | D5 | 01 | 9F | .....]6{9....... |
| 0043D0 | 8A | 80 | 06 | 73 | 02 | 06 | 00 | F3 | 05 | EE | 07 | 4E | 07 | D5 | 01 | 57 | ...s.......N...W |
| 0043E0 | 8A | 80 | 06 | F5 | 35 | B9 | 3B | D5 | 01 | A3 | 8A | 77 | 06 | 08 | 06 | D5 | ....5.;....w.... |
| 0043F0 | 01 | 05 | 00 | 30 | 04 | D5 | 01 | 79 | 87 | 99 | 15 | 56 | 07 | 30 | 04 | D5 | ...0...y...V.0.. |
| 004400 | 01 | 59 | 87 | 99 | 15 | 46 | 07 | D5 | 01 | 56 | 8A | 80 | 06 | 7A | 01 | 6A | .Y...F...V...z.j |
| 004410 | 01 | D5 | 01 | 5B | 43 | 46 | 07 | D5 | 01 | 17 | 00 | C1 | 17 | 7A | 01 | 6A | ...[CF.......z.j |
| 004420 | 01 | 8D | 05 | 2F | 06 | 30 | 04 | D5 | 01 | 19 | 00 | E8 | 04 | 9D | 05 | D5 | .../.0.......... |
| 004430 | 01 | 14 | 00 | D1 | 04 | 8D | 04 | 81 | 02 | 2E | 00 | 08 | 06 | 81 | 02 | 0C | ................ |
| 004440 | 00 | 63 | 3C | 1B | 06 | F3 | 05 | 73 | 02 | 06 | 00 | F3 | 05 | 67 | 3C | D5 | .c<....s.....g<. |
| 004450 | 01 | 78 | 8A | 80 | 06 | D5 | 01 | 79 | 8A | 80 | 06 | 46 | 07 | D5 | 01 | 56 | .x.....y...F...V |
| 004460 | 8A | 80 | 06 | 73 | 02 | 1E | 00 | 46 | 06 | D5 | 01 | 56 | 8A | 08 | 06 | 77 | ...s...F...V...w |
| 004470 | 06 | 42 | 04 | 08 | 06 | 1B | 06 | 80 | 06 | 5B | 3C | E8 | 04 | 81 | 02 | 04 | .B.......[<..... |
| 004480 | 00 | 0F | 44 | 7A | 01 | 6A | 01 | D5 | 01 | 1F | 44 | D5 | 01 | FD | FF | D5 | ..Dz.j....D..... |
| 004490 | 01 | 08 | 00 | C1 | 17 | 7A | 01 | 6A | 01 | D5 | 01 | 78 | 8A | 77 | 06 | 81 | .....z.j...x.w.. |
| 0044A0 | 02 | 08 | 00 | 49 | 43 | 73 | 02 | 04 | 00 | 85 | 44 | 7A | 01 | 6A | 01 | D5 | ...ICs....Dz.j.. |
| 0044B0 | 01 | 49 | 87 | 77 | 06 | CA | 09 | 81 | 02 | 04 | 00 | EE | 07 | E5 | 3C | 69 | .I.w..........<i |
| 0044C0 | 36 | 7B | 39 | 30 | 05 | 81 | 02 | 06 | 00 | F3 | 05 | EE | 07 | 6D | 36 | 7B | 6{90........m6{ |
| 0044D0 | 39 | 30 | 05 | 81 | 02 | 06 | 00 | 46 | 06 | EE | 07 | ED | 36 | 7B | 39 | 30 | 90.....F....6{90 |
| 0044E0 | 05 | 81 | 02 | 08 | 00 | F3 | 05 | 46 | 06 | EE | 07 | F1 | 36 | 7B | 39 | 30 | .......F....6{90 |
| 0044F0 | 05 | 81 | 02 | 08 | 00 | 46 | 06 | 46 | 06 | EE | 07 | F8 | 06 | 97 | 44 | D5 | .....F.F......D. |
| 004500 | 01 | 14 | 00 | D5 | 01 | 49 | 87 | 7F | 15 | 7A | 01 | 6A | 01 | D5 | 01 | AD | .....I...z.j.... |
| 004510 | 44 | 46 | 07 | D5 | 01 | 15 | 00 | C1 | 17 | 7A | 01 | 6A | 01 | D5 | 01 | 7C | DF.......z.j...| |
| 004520 | 83 | 77 | 06 | 30 | 05 | D5 | 01 | 55 | 80 | 77 | 06 | 30 | 04 | 9A | 04 | 81 | .w.0...U.w.0.... |
| 004530 | 02 | 04 | 00 | EE | 07 | 0B | 45 | E3 | 40 | 9B | 23 | 7A | 01 | 40 | 01 | 00 | ......E.@.#z.@.. |
| 004540 | 00 | 40 | 01 | 01 | 00 | 40 | 01 | 02 | 00 | 40 | 01 | 03 | 00 | 6A | 01 | 46 | .@...@...@...j.F |
| 004550 | 07 | F9 | 05 | 46 | 07 | F2 | 01 | 87 | 45 | 00 | 00 | B9 | 05 | 32 | 19 | 81 | ...F....E....2.. |
| 004560 | 02 | 14 | 00 | B9 | 05 | 60 | 04 | 42 | 04 | 0A | 19 | B9 | 05 | 60 | 04 | F8 | .....`.B.....`.. |
| 004570 | 18 | 73 | 02 | 10 | 00 | B9 | 05 | 60 | 04 | 42 | 04 | F8 | 18 | B9 | 05 | 60 | .s.....`.B.....` |
| 004580 | 04 | 0A | 19 | 43 | 02 | D4 | FF | CB | 18 | 7A | 01 | 6A | 01 | D5 | 01 | 6B | ...C.....z.j...k |
| 004590 | 83 | 77 | 06 | 7A | 01 | 6A | 01 | 4E | 07 | 8E | 02 | 0A | 00 | D5 | 01 | 06 | .w.z.j.N........ |
| 0045A0 | 00 | 73 | 02 | EE | 00 | 56 | 07 | 8E | 02 | 0A | 00 | D5 | 01 | 0E | 00 | 73 | .s...V.........s |
| 0045B0 | 02 | E0 | 00 | 5E | 07 | 8E | 02 | 08 | 00 | 56 | 07 | 73 | 02 | D4 | 00 | D5 | ...^.....V.s.... |
| 0045C0 | 01 | 04 | 00 | 8E | 02 | 0A | 00 | D5 | 01 | 0A | 00 | 73 | 02 | C4 | 00 | D5 | ...........s.... |
| 0045D0 | 01 | 05 | 00 | 8E | 02 | 08 | 00 | 4E | 07 | 73 | 02 | B6 | 00 | D5 | 01 | 06 | .......N.s...... |
| 0045E0 | 00 | 8E | 02 | 0A | 00 | D5 | 01 | 09 | 00 | 73 | 02 | A6 | 00 | D5 | 01 | 07 | .........s...... |
| 0045F0 | 00 | 8E | 02 | 0A | 00 | D5 | 01 | 05 | 00 | 73 | 02 | 96 | 00 | D5 | 01 | 08 | .........s...... |
| 004600 | 00 | 8E | 02 | 0A | 00 | D5 | 01 | 0D | 00 | 73 | 02 | 86 | 00 | D5 | 01 | 09 | .........s...... |
| 004610 | 00 | 8E | 02 | 0A | 00 | D5 | 01 | 07 | 00 | 73 | 02 | 76 | 00 | D5 | 01 | 0A | .........s.v.... |
| 004620 | 00 | 8E | 02 | 0A | 00 | D5 | 01 | 0F | 00 | 73 | 02 | 66 | 00 | D5 | 01 | 0B | .........s.f.... |
| 004630 | 00 | 8E | 02 | 08 | 00 | 5E | 07 | 73 | 02 | 58 | 00 | D5 | 01 | 0C | 00 | 8E | .....^.s.X...... |
| 004640 | 02 | 0A | 00 | D5 | 01 | 0B | 00 | 73 | 02 | 48 | 00 | D5 | 01 | 0D | 00 | 8E | .......s.H...... |
| 004650 | 02 | 08 | 00 | 46 | 07 | 73 | 02 | 3A | 00 | D5 | 01 | 0E | 00 | 8E | 02 | 0A | ...F.s.:........ |
| 004660 | 00 | D5 | 01 | 08 | 00 | 73 | 02 | 2A | 00 | D5 | 01 | 0F | 00 | 8E | 02 | 0A | .....s.*........ |
| 004670 | 00 | D5 | 01 | 04 | 00 | 73 | 02 | 1A | 00 | D5 | 01 | 10 | 00 | 8E | 02 | 0A | .....s.......... |
| 004680 | 00 | D5 | 01 | 0C | 00 | 73 | 02 | 0A | 00 | D5 | 01 | 07 | 00 | F9 | 05 | F3 | .....s.......... |
| 004690 | 05 | 7A | 01 | 6A | 01 | D5 | 01 | 06 | 00 | 8E | 02 | 08 | 00 | 4E | 07 | 73 | .z.j.........N.s |
| 0046A0 | 02 | EE | 00 | D5 | 01 | 0E | 00 | 8E | 02 | 08 | 00 | 56 | 07 | 73 | 02 | E0 | ...........V.s.. |
| 0046B0 | 00 | 56 | 07 | 8E | 02 | 08 | 00 | 5E | 07 | 73 | 02 | D4 | 00 | D5 | 01 | 0A | .V.....^.s...... |
| 0046C0 | 00 | 8E | 02 | 0A | 00 | D5 | 01 | 04 | 00 | 73 | 02 | C4 | 00 | 4E | 07 | 8E | .........s...N.. |
| 0046D0 | 02 | 0A | 00 | D5 | 01 | 05 | 00 | 73 | 02 | B6 | 00 | D5 | 01 | 09 | 00 | 8E | .......s........ |
| 0046E0 | 02 | 0A | 00 | D5 | 01 | 06 | 00 | 73 | 02 | A6 | 00 | D5 | 01 | 05 | 00 | 8E | .......s........ |

```
0046F0  02 0A 00 D5  01 07 00 73  02 96 00 D5  01 0D 00 8E    .......s........
004700  02 0A 00 D5  01 08 00 73  02 86 00 D5  01 07 00 8E    .......s........
004710  02 0A 00 D5  01 09 00 73  02 76 00 D5  01 0F 00 8E    .......s.v......
004720  02 0A 00 D5  01 0A 00 73  02 66 00 5E  07 8E 02 0A    .......s.f.^....
004730  00 D5 01 0B  00 73 02 58  00 D5 01 0B  00 8E 02 0A    .....s.X........
004740  00 D5 01 0C  00 73 02 48  00 46 07 8E  02 0A 00 D5    .....s.H.F......
004750  01 0D 00 73  02 3A 00 D5  01 08 00 8E  02 0A 00 D5    ...s.:..........
004760  01 0E 00 73  02 2A 00 D5  01 04 00 8E  02 0A 00 D5    ...s.*..........
004770  01 0F 00 73  02 1A 00 D5  01 0C 00 8E  02 0A 00 D5    ...s............
004780  01 10 00 73  02 0A 00 D5  01 09 00 F9  05 F3 05 7A    ...s...........z
004790  01 6A 01 5E  07 D5 01 B9  87 99 15 95  45 D5 01 6B    .j.^........E..k
0047A0  83 80 06 7A  01 6A 01 95  45 4E 07 CB  07 7A 01 40    ...z.j..EN...z.@
0047B0  01 FF 00 40  01 01 00 40  01 03 00 40  01 05 00 40    ...@...@...@...@
0047C0  01 07 00 40  01 09 00 40  01 0B 00 40  01 0D 00 40    ...@...@...@...@
0047D0  01 11 00 40  01 13 00 6A  01 D5 01 38  82 D5 01 34    ...@...j...8...4
0047E0  82 08 06 77  06 08 06 42  04 D5 01 0F  00 8D 04 1B    ...w...B........
0047F0  06 80 06 60  04 30 04 08  06 D5 01 01  00 30 04 77    ...`.0.......0.w
004800  06 F9 05 D5  01 00 00 30  04 77 06 7A  01 6A 01 D5    .......0.w.z.j..
004810  01 2D 82 8D  05 D5 01 0E  00 D5 01 08  00 CB 07 8B    .-..............
004820  45 D5 01 04  00 4D 45 9A  04 D5 01 04  00 CB 07 12    E....ME.........
004830  0C AD 05 80  06 D5 01 08  00 CB 07 00  06 D5 01 05    ................
004840  00 4D 45 56  07 CB 07 9A  04 12 0C AD  05 42 04 80    .MEV.........B..
004850  06 56 07 CB  07 D5 01 0E  00 9A 04 D5  01 06 00 CB    .V..............
004860  07 12 0C AD  05 49 04 80  06 D5 01 08  00 CB 07 8B    .....I..........
004870  45 D5 01 04  00 4D 45 D5  01 06 00 CB  07 9A 04 12    E....ME.........
004880  0C AD 05 5E  07 30 04 80  06 D5 01 08  00 CB 07 F9    ...^.0..........
004890  05 D5 01 05  00 4D 45 D5  01 04 00 CB  07 9A 04 12    .....ME.........
0048A0  0C AD 05 D5  01 04 00 30  04 80 06 9D  05 D5 01 05    .......0........
0048B0  00 30 04 80  06 7A 01 6A  01 5E 07 D5  01 90 81 80    .0...z.j.^......
0048C0  06 D5 01 90  81 77 06 30  05 81 02 F6  FF 0D 48 D5    .....w.0......H.
0048D0  01 06 00 D5  01 2B 82 80  06 7A 01 6A  01 D5 01 2B    .....+...z.j...+
0048E0  82 77 06 30  05 D5 01 2C  82 77 06 30  05 8D 04 D5    .w.0...,.w.0....
0048F0  01 35 82 77  06 08 06 D5  01 07 00 32  19 F9 05 D5    .5.w.......2....
004900  01 01 00 32  19 B4 04 9A  04 8D 04 7A  01 6A 01 DB    ...2.......z.j..
004910  48 B4 04 7A  01 6A 01 08  06 77 06 08  06 42 04 2B    H..z.j...w...B.+
004920  11 F0 09 1B  06 80 06 D5  01 37 85 30  04 7A 01 6A    .........7.0.z.j
004930  01 D5 01 58  85 15 49 80  06 7A 01 6A  01 D5 01 57    ...X..I..z.j...W
004940  85 15 49 77  06 7A 01 6A  01 D5 01 57  85 77 06 D5    ..Iw.z.j...W.w..
004950  01 58 85 77  06 B2 09 7A  01 6A 01 47  49 D5 01 5B    .X.w...z.j.GI..[
004960  85 77 06 CA  09 9A 04 7A  01 6A 01 47  49 81 02 16    .w.....z.j.GI...
004970  00 3B 49 D5  01 5C 85 80  06 D5 01 59  85 77 06 D5    .;I..\.....Y.w..
004980  01 5B 85 80  06 7A 01 6A  01 D5 01 06  00 51 4C 42    .[...z.j.....QLB
004990  04 D5 01 A9  87 7F 15 7A  01 6A 01 09  4B 71 17 59    .......z.j..Kq.Y
0049A0  49 B4 04 81  02 F6 FF 7A  01 6A 01 8B  45 D5 01 60    I......z.j..E..`
0049B0  85 77 06 B2  09 81 02 04  00 EE 07 D5  01 61 85 77    .w...........a.w
0049C0  06 D3 47 8E  02 0E 00 4E  07 D5 01 63  85 80 06 73    ..G....N...c...s
0049D0  02 1A 00 CF  47 8E 02 12  00 46 07 D5  01 63 85 80    ....G....F...c..
0049E0  06 D3 47 2F  49 73 02 04  00 F3 07 5A  01 6A 01 D7    ..G/Is.....Z.j..
0049F0  47 2F 06 D5  01 60 85 80  06 D5 01 61  85 80 06 8B    G/...`.....a....
004A00  45 C1 04 F9  05 D5 01 5C  85 77 06 C1  04 8D 04 08    E......\.w......
004A10  06 D5 01 5D  85 80 06 D5  01 5A 85 77  06 CA 09 8D    ...].....Z.w....
004A20  04 81 02 16  00 46 07 D5  01 5B 85 80  06 46 07 D5    .....F...[...F..
004A30  01 5A 85 80  06 73 02 04  00 A9 49 7A  01 6A 01 0D    .Z...s....Iz.j..
004A40  49 81 02 04  00 EE 07 D5  01 5B 85 77  06 30 05 81    I........[.w.0..
004A50  02 08 00 69  49 73 02 24  00 D5 01 5B  85 08 06 77    ...iIs.$...[...w
004A60  06 51 04 46  07 F8 06 B1  18 D5 01 5C  85 77 06 B7    .Q.F.......\.w..
004A70  48 D5 01 32  00 D5 01 5A  85 80 06 7A  01 6A 01 D5    H..2...Z...z.j..
004A80  01 55 80 77  06 CA 09 D5  01 A3 81 77  06 9A 04 D5    .U.w.......w....
004A90  01 A9 87 77  06 CA 09 9A  04 81 02 04  00 EE 07 D5    ...w............
004AA0  01 90 81 77  06 CA 09 81  02 04 00 EE  07 D5 01 5B    ...w...........[
```

```
004AB0  82 77 06 81  02 16 00 46  07 D5 01 5A  85 80 06 46   .w.....F...Z...F
004AC0  07 D5 01 5B  82 80 06 87  49 EE 07 D5  01 33 82 77   ...[....I....3.w
004AD0  06 D5 01 34  82 77 06 B2  09 81 02 04  00 ED 49 D5   ...4.w........I.
004AE0  01 35 82 77  06 81 02 04  00 EE 07 D5  01 5A 85 08   .5.w.........Z..
004AF0  06 77 06 08  06 51 04 46  07 F8 06 1B  06 80 06 30   .w...Q.F.......0
004B00  05 81 02 04  00 3D 4A 7A  01 6A 01 D5  01 7D 4A 46   .....=Jz.j...}JF
004B10  07 D5 01 04  00 C1 17 7A  01 6A 01 08  06 AF 47 C1   .......z.j....G.
004B20  04 81 02 08  00 F3 05 73  02 06 00 A5  47 2F 49 2F   .......s....G/I/
004B30  49 7A 01 6A  01 D5 01 19  4B D5 01 FE  FF D5 01 05   Iz.j....K.......
004B40  00 C1 17 7A  01 6A 01 8D  05 08 06 1D  4F BF 47 00   ...z.j......O.G.
004B50  06 33 4B BB  47 00 06 33  4B C3 47 F9  05 9D 05 00   .3K.G..3K.G.....
004B60  06 30 04 77  06 D5 01 14  00 1F 07 4E  07 F8 06 46   .0.w.......N...F
004B70  07 F2 01 7D  4B 2F 06 33  4B 43 02 FA  FF 46 06 7A   ...}K/.3KC...F.z
004B80  01 6A 01 09  4B 71 17 59  49 B4 04 81  02 F6 FF 46   .j..Kq.YI......F
004B90  07 D5 01 63  85 80 06 CF  47 AF 47 33  4B 46 07 D5   ...c....G.G3KF..
004BA0  01 A9 87 80  06 71 17 D5  01 0A 00 D5  01 49 87 7F   .....q.......I.
004BB0  15 09 4B 71  17 D5 01 63  85 77 06 81  02 06 00 46   ..Kq...c.w.....F
004BC0  07 EE 07 D5  01 49 87 77  06 30 05 81  02 E4 FF 66   .....I.w.0.....f
004BD0  07 7A 01 6A  01 D5 01 62  85 77 06 81  02 04 00 EE   .z.j...b.w......
004BE0  07 4E 07 D5  01 62 85 80  06 D5 01 55  80 77 06 CA   .N...b.....U.w..
004BF0  09 81 02 04  00 EE 07 99  49 4E 07 D5  01 10 00 F2   ........IN......
004C00  01 23 4C B9  05 D5 01 08  00 38 04 D5  01 10 00 F0   .#L......8......
004C10  09 42 04 91  47 81 4B 81  02 04 00 33  02 66 07 5B   .B..G.K....3.f.[
004C20  02 E2 FF D5  01 1E 00 D5  01 A9 87 7F  15 7A 01 6A   .............z.j
004C30  01 D5 01 E7  86 63 06 D5  01 03 01 31  03 5E 07 30   .....c.....1.^.0
004C40  04 D5 01 FF  7F 8D 04 08  06 D5 01 E7  86 6D 06 7A   .............m.z
004C50  01 6A 01 2F  4C 04 0A D5  01 00 80 9E  03 CB 18 7A   .j./L..........z
004C60  01 6A 01 D5  01 19 87 77  06 CA 09 81  02 04 00 EE   .j.....w........
004C70  07 D5 01 09  87 77 06 CA  09 81 02 0A  00 46 07 66   .....w.......F.f
004C80  07 2B 50 EE  07 D5 01 F9  86 77 06 CA  09 81 02 0A   .+P......w......
004C90  00 46 07 46  07 2B 50 EE  07 D5 01 F4  86 08 06 77   .F.F.+P........w
004CA0  06 08 06 30  05 81 02 0E  00 46 06 46  07 46 07 2B   ...0.....F.F.F.+
004CB0  50 73 02 38  00 51 04 46  07 F8 06 B1  18 D5 01 F2   Ps.8.Q.F........
004CC0  86 77 06 08  06 D5 01 F3  86 77 06 31  03 D5 01 64   .w.......w.1...d
004CD0  00 1A 04 08  06 08 06 BD  05 D5 01 09  87 99 15 38   ...............8
004CE0  04 9D 05 30  04 D5 01 F9  86 99 15 7A  01 6A 01 D5   ...0.......z.j..
004CF0  01 61 4C 46  07 D5 01 13  00 C1 17 7A  01 40 01 01   .aLF.......z.@..
004D00  00 40 01 00  00 40 01 01  00 40 01 02  00 40 01 03   .@...@...@...@..
004D10  00 6A 01 D5  01 5A 80 04  06 77 06 5C  0C 9A 04 B1   .j...Z...w.\....
004D20  18 7A 01 6A  01 D5 01 5A  80 08 06 77  06 5C 0C B4   .z.j...Z...w.\..
004D30  04 8D 04 B1  18 7A 01 6A  01 33 4B 09  4B 71 17 59   .....z.j.3K.Kq.Y
004D40  49 B4 04 81  02 F6 FF 7A  01 6A 01 46  07 F2 01 5F   I......z.j.F..._
004D50  4D 2F 06 37  4D D5 01 FA  00 39 18 43  02 F4 FF 46   M/.7M....9.C...F
004D60  06 7A 01 6A  01 11 55 D5  01 FA 00 39  18 23 4D FF   .z.j..U....9.#M.
004D70  54 D5 01 FA  00 39 18 11  4D 11 55 D5  01 FA 00 39   T....9..M.U....9
004D80  18 23 4D FF  54 D5 01 FA  00 39 18 11  4D 11 55 D5   .#M.T....9..M.U.
004D90  01 A9 87 77  06 81 02 04  00 EE 07 D5  01 11 00 4E   ...w...........N
004DA0  07 F2 01 B9  4D BB 47 B9  05 4E 07 49  4D BF 47 B9   ....M.G..N.IM.G.
004DB0  05 4E 07 49  4D 43 02 EE  FF CB 47 AF  47 4E 07 49   .N.IMC....G.GN.I
004DC0  4D D5 01 FA  00 39 18 D5  01 FA 00 39  18 B7 47 AF   M....9.....9..G.
004DD0  47 4E 07 49  4D D5 01 FA  00 39 18 D5  01 FA 00 39   GN.IM....9.....9
004DE0  18 7A 01 6A  01 D5 01 6B  83 77 06 93  46 D5 01 10   .z.j...k.w..F...
004DF0  00 F0 09 42  04 91 47 46  07 D5 01 64  85 80 06 7A   ...B..GF...d...z
004E00  01 6A 01 D5  01 83 82 77  06 54 0C 8E  02 08 00 E3   .j.....w.T......
004E10  4D 73 02 22  00 50 0C 8E  02 0E 00 4E  07 D5 01 68   Ms.".P.....N...h
004E20  85 80 06 73  02 10 00 4C  0C 8E 02 08  00 63 4D 73   ...s...L.....cMs
004E30  02 04 00 F3  05 7A 01 6A  01 D5 01 05  00 D5 01 9B   .....z.j........
004E40  8A 80 06 D5  01 83 82 77  06 54 0C 8E  02 0C 00 F9   .......w.T......
004E50  35 F5 3B 8D  36 73 02 30  00 50 0C 8E  02 14 00 F5   5.;.6s.0.P......
004E60  35 F5 3B 85  36 4E 07 D5  01 68 85 80  06 73 02 18   5.;.6N...h...s..
```

```
004E70  00 4C 0C 8E  02 0C 00 FD  35 F5 3B 95  36 73 02 08   .L......5.;.6s..
004E80  00 85 36 F9  05 F3 5B 7B  39 F3 05 D5  01 6D 83 80   ..6...{9.....m..
004E90  06 46 07 D5  01 89 81 80  06 7A 01 6A  01 D5 01 BA   .F.......z.j....
004EA0  83 08 06 77  06 42 04 D5  01 05 00 F0  09 B1 18 D5   ...w.B..........
004EB0  01 55 80 77  06 81 02 08  00 37 4E 73  02 04 00 01   .U.w.....7Ns....
004EC0  4E 7A 01 6A  01 1F 11 31  03 D5 01 81  86 30 04 7A   Nz.j...1.....0.z
004ED0  01 6A 01 7A  01 6A 01 42  04 7A 01 6A  01 49 04 7A   .j.z.j.B.z.j.I.z
004EE0  01 6A 01 D5  01 04 00 CB  07 F9 05 D5  01 30 00 B4   .j...........0..
004EF0  04 8D 04 9A  04 7A 01 6A  01 D5 01 30  00 8D 04 D5   .....z.j...0....
004F00  01 FC FF CB  07 7A 01 6A  01 C3 4E D5  4E 08 06 77   .....z.j..N.N..w
004F10  06 D5 01 0F  00 B4 04 8D  04 E1 18 7A  01 6A 01 C3   ...........z.j..
004F20  4E D5 4E 08  06 77 06 D5  01 0F 00 9A  04 B1 18 7A   N.N.w.........z
004F30  01 6A 01 46  07 F8 06 08  06 23 11 51  04 E8 04 81   .j.F.....#.Q....
004F40  02 06 00 DB  18 EE 07 08  06 30 05 D5  01 55 80 77   .........0...U.w
004F50  06 CA 09 8D  04 81 02 30  00 49 3B 00  06 D5 01 34   .......0.I;....4
004F60  17 D1 04 B4  04 5E 07 23  06 56 07 D1  04 8D 04 81   .....^.#.V......
004F70  02 16 00 56  07 23 06 81  02 08 00 FD  36 73 02 04   ...V.#......6s..
004F80  00 07 37 DB  18 EE 07 08  06 07 4F C3  4E 8D 05 08   ..7.......O.N...
004F90  06 AD 05 DB  4E 6D 06 81  02 0C 00 9D  05 D1 4E 80   ....Nm........N.
004FA0  06 73 02 08  00 4E 07 1F  18 46 06 7A  01 6A 01 08   .s...N...F.z.j..
004FB0  06 23 11 C1  04 81 02 2C  00 F3 05 08  06 30 05 81   .#.....,.....0..
004FC0  02 0A 00 46  07 D5 01 B9  83 80 06 23  11 46 07 F2   ...F.......#.F..
004FD0  01 DD 4F 2F  06 B9 05 31  4F 43 02 F8  FF 46 06 73   ..O/...1OC...F.s
004FE0  02 24 00 D5  01 14 00 38  04 08 06 46  07 D1 04 B4   .$.....8...F....
004FF0  04 00 06 57  11 D1 04 8D  04 81 02 08  00 E3 20 73   ...W.......... s
005000  02 04 00 DB  18 7A 01 6A  01 08 06 23  11 D1 04 B4   .....z.j...#....
005010  04 81 02 08  00 AD 4F 73  02 C4 00 31  4F 7A 01 6A   ......Os...1Oz.j
005020  01 46 07 46  07 23 11 07  50 7A 01 6A  01 F9 05 C3   .F.F.#..Pz.j....
005030  4E D5 4E 08  06 77 06 1B  06 81 02 0C  00 D5 01 40   N.N.w..........@
005040  00 9A 04 73  02 0A 00 D5  01 40 00 B4  04 8D 04 B1   ...s.....@......
005050  18 7A 01 6A  01 08 06 8D  05 C3 4E 08  06 D5 4E 77   .z.j......N...Nw
005060  06 D5 01 40  00 8D 04 81  02 0C 00 4E  07 1F 18 46   ...@.......N...F
005070  06 46 07 EE  07 08 06 DB  4E 63 06 CA  09 81 02 0E   .F......Nc......
005080  00 4E 07 1F  18 F3 05 D1  4E 77 06 EE  07 F3 05 9D   .N......Nw......
005090  05 2B 1F 7A  01 6A 01 D5  01 5A 80 08  06 77 06 5C   .+.z.j...Z...w.\
0050A0  0C B4 04 8D  04 B1 18 7A  01 6A 01 D5  01 5A 80 08   .......z.j...Z..
0050B0  06 77 06 5C  0C 9A 04 B1  18 7A 01 6A  01 D5 01 55   .w.\.....z.j...U
0050C0  80 77 06 CA  09 81 02 08  00 F5 3B 73  02 0E 00 81   .w........;s....
0050D0  02 08 00 A9  50 73 02 04  00 95 50 7A  01 6A 01 08   ....Ps....Pz.j..
0050E0  06 1D 4F D5  01 7F 86 77  06 4E 07 F8  06 46 07 2F   ..O....w.N...F./
0050F0  06 8D 05 8D  05 F2 01 03  51 BF 47 00  06 33 4B 43   ........Q.G..3KC
005100  02 F8 FF 9D  05 9D 05 F2  01 15 51 BB  47 00 06 33   ..........Q.G..3
005110  4B 43 02 F8  FF F3 05 7A  01 6A 01 F9  05 41 45 8E   KC.....z.j...AE.
005120  02 08 00 DD  50 73 02 36  00 3D 45 8E  02 0C 00 BF   ....Ps.6.=E.....
005130  47 F9 05 33  4B 73 02 26  00 45 45 8E  02 0C 00 D5   G..3Ks.&.EE.....
005140  01 15 85 45  4B 73 02 16  00 49 45 8E  02 0C 00 D5   ...EKs...IE.....
005150  01 26 85 45  4B 73 02 06  00 F3 05 F3  05 7A 01 6A   .&.EKs.......z.j
005160  01 08 06 30  05 81 02 0A  00 F3 05 BB  50 73 02 04   ...0........Ps..
005170  00 19 51 7A  01 6A 01 F9  05 8D 05 C3  4E D5 4E 08   ..Qz.j......N.N.
005180  06 77 06 08  06 F7 4E AD  05 B2 09 81  02 0A 00 D5   .w....N.........
005190  01 0F 00 B4  04 8D 04 9D  05 E1 4E 08  06 D5 01 0F   ..........N.....
0051A0  00 8D 04 42  04 D5 01 0F  00 8D 04 F9  05 D5 01 0F   ...B............
0051B0  00 B4 04 8D  04 9A 04 B1  18 7A 01 6A  01 2F 06 C3   .........z.j./..
0051C0  4E D5 4E 77  06 08 06 F7  4E 1B 06 B2  09 F9 05 D5   N.Nw....N.......
0051D0  01 0F 00 8D  04 D5 01 7F  86 77 06 D1  04 9A 04 81   .........w......
0051E0  02 0C 00 2F  06 75 51 5F  51 73 02 04  00 46 06 7A   .../.uQ_Qs...F.z
0051F0  01 6A 01 D5  01 7C 83 77  06 30 05 50  0C D5 01 83   .j...|.w.0.P....
005200  82 77 06 C1  04 8D 04 D5  01 CE 81 77  06 30 05 8D   .w.........w.0..
005210  04 81 02 12  00 FF 54 D5  01 0A 00 39  18 11 55 D5   ......T....9..U.
005220  01 05 00 39  18 7A 01 6A  01 D5 01 55  80 77 06 81   ...9.z.j...U.w..
```

```
005230  02 1E 00 5E  07 D5 01 49  87 99 15 D5  01 0A 00 D5   ...^...I........
005240  01 59 87 99  15 D5 01 14  00 D5 01 79  87 99 15 7A   .Y.........y...z
005250  01 6A 01 D5  01 83 83 77  06 81 02 04  00 EE 07 D5   .j.....w........
005260  01 76 83 63  06 0F 06 30  05 81 02 04  00 EE 07 D5   .v.c...0........
005270  01 A2 83 08  06 3B 11 60  04 30 04 F9  05 F2 01 A5   .....;.`.0......
005280  52 08 06 B9  05 63 06 C1  04 81 02 14  00 4E 07 D5   R....c.......N..
005290  01 83 83 80  06 46 07 D5  01 7D 83 80  06 33 02 56   .....F...}...3.V
0052A0  07 5B 02 DE  FF F3 05 7A  01 6A 01 CF  16 D5 01 79   .[.....z.j.....y
0052B0  83 77 06 B2  09 81 02 0A  00 46 07 D5  01 7D 83 80   .w.......F...}..
0052C0  06 D5 01 7C  83 77 06 30  05 81 02 04  00 EE 07 D5   ...|.w.0........
0052D0  01 7E 83 77  06 30 05 81  02 0E 00 46  07 D5 01 7D   .~.w.0.....F...}
0052E0  83 80 06 27  52 EE 07 D5  01 7D 83 77  06 81 02 04   ...'R....}.w....
0052F0  00 EE 07 27  52 51 52 CF  16 D5 01 79  83 80 06 09   ...'RQR....y....
005300  1B 46 07 F2  01 13 53 B9  05 A9 1E B9  05 5D 20 43   .F....S......] C
005310  02 F6 FF 46  07 D5 01 6F  85 80 06 4E  07 D5 01 7D   ...F...o...N...}
005320  83 80 06 7A  01 6A 01 D5  01 A9 87 77  06 81 02 04   ...z.j.....w....
005330  00 EE 07 D5  01 69 87 77  06 CA 09 D5  01 55 80 77   .....i.w.....U.w
005340  06 CA 09 8D  04 81 02 04  00 EE 07 59  49 81 02 06   ...........YI...
005350  00 09 4B EE  07 D5 01 CE  81 77 06 30  05 D5 01 85   ..K......w.0....
005360  82 77 06 CA  09 8D 04 81  02 28 00 D5  01 D3 4B 46   .w.......(....KF
005370  07 D5 01 0F  00 C1 17 A9  52 D5 01 80  86 08 06 77   ........R......w
005380  06 08 06 53  50 00 06 BB  51 42 04 09  1B F0 09 B1   ...SP...QB......
005390  18 09 4B 7A  01 6A 01 D5  01 25 53 46  07 46 07 C1   ..Kz.j...%SF.F..
0053A0  17 7A 01 40  01 0A 00 40  01 0B 00 40  01 0C 00 40   .z.@...@...@...@
0053B0  01 57 04 40  01 F5 0D 40  01 30 75 40  01 00 00 40   .W.@...@.0u@...@
0053C0  01 01 00 40  01 02 00 40  01 03 00 40  01 04 00 40   ...@...@...@...@
0053D0  01 05 00 40  01 06 00 40  01 14 00 40  01 3C 00 40   ...@...@...@.<.@
0053E0  01 F0 00 40  01 19 00 40  01 08 00 40  01 1E 00 40   ...@...@...@...@
0053F0  01 07 00 6A  01 D5 01 72  80 D5 01 71  80 08 06 8D   ...j...r...q....
005400  05 77 06 08  06 8D 05 30  04 77 06 9D  05 42 04 D5   .w.....0.w...B..
005410  01 0F 00 8D  04 9D 05 80  06 7A 01 6A  01 D5 01 71   .........z.j...q
005420  80 77 06 D5  01 70 80 77  01 6A 01 D5  01 6A 01 D5   .w...p.w.j...j..
005430  01 70 80 77  06 D5 01 71  80 80 06 7A  01 6A 01 D5   .p.w...q...z.j..
005440  01 D9 86 80  06 D5 01 D8  86 80 06 D5  01 DA 86 80   ................
005450  06 7A 01 6A  01 D5 01 50  00 D5 01 1E  00 D5 01 96   .z.j...P........
005460  00 3D 54 7A  01 6A 01 D5  01 C6 86 77  06 D5 01 67   .=Tz.j.....w...g
005470  83 77 06 C2  09 7A 01 6A  01 46 07 D5  01 DB 86 80   .w...z.j.F......
005480  06 46 07 D5  01 AE 89 80  06 D5 01 5A  80 08 06 77   .F.........Z...w
005490  06 60 0C 9A  04 B1 18 7A  01 6A 01 53  54 D5 01 5A   .`.....z.j.ST..Z
0054A0  80 08 06 77  06 60 0C B4  04 8D 04 B1  18 7A 01 6A   ...w.`.......z.j
0054B0  01 D5 01 5A  80 77 06 60  0C 8D 04 7A  01 6A 01 6C   ...Z.w.`...z.j.l
0054C0  0C 42 19 70  0C BD 04 30  05 7A 01 6A  01 6C 0C 42   .B.p...0.z.j.l.B
0054D0  19 78 0C 8D  04 30 05 7A  01 6A 01 D5  01 5A 80 08   .x...0.z.j...Z..
0054E0  06 77 06 64  0C 9A 04 B1  18 7A 01 6A  01 D5 01 5A   .w.d.....z.j...Z
0054F0  80 08 06 77  06 64 0C B4  04 8D 04 B1  18 7A 01 6A   ...w.d.......z.j
005500  01 D5 01 5A  80 08 06 77  06 68 0C 9A  04 B1 18 7A   ...Z...w.h.....z
005510  01 6A 01 D5  01 5A 80 08  06 77 06 68  0C B4 04 8D   .j...Z...w.h....
005520  04 B1 18 7A  01 6A 01 D5  01 5A 80 77  06 68 0C 8D   ...z.j...Z.w.h..
005530  04 30 05 7A  01 6A 01 D5  01 91 81 77  06 30 05 81   .0.z.j.....w.0..
005540  02 F6 FF 7A  01 6A 01 35  55 08 06 D5  01 91 81 80   ...z.j.5U.......
005550  06 EB 54 08  06 D5 01 1E  00 E8 04 81  02 08 00 5D   ..T............]
005560  56 73 02 04  00 39 18 7A  01 6A 01 35  55 08 06 D5   Vs...9.z.j.5U...
005570  01 91 81 80  06 08 06 D5  01 1E 00 E8  04 81 02 08   ................
005580  00 5D 56 73  02 04 00 39  18 7A 01 6A  01 5D 5B D5   .]Vs...9.z.j.][.
005590  01 8F 81 77  06 30 05 7A  01 6A 01 CB  54 B4 04 81   ...w.0.z.j..T...
0055A0  02 06 00 46  07 EE 07 D5  01 32 00 CB  55 CB 54 B4   ...F.....2..U.T.
0055B0  04 81 02 06  00 46 07 EE  07 66 07 D5  01 71 83 77   .....F...f...q.w
0055C0  06 81 02 04  00 EE 07 9B  4E 7A 01 6A  01 D5 01 8F   ........Nz.j....
0055D0  81 C5 18 D5  01 6F 83 77  06 B8 7A 8B  55 81 02 04   .....o.w..z.U...
0055E0  00 EE 07 08  06 D5 01 08  00 8D 04 81  02 06 00 8A   ................
```

```
0055F0  79 95 53 8B  55 81 02 04  00 EE 07 08  06 D5 01 10   y.S.U...........
005600  00 8D 04 81  02 06 00 8A  79 1B 45 8B  55 81 02 04   ........y.E.U...
005610  00 EE 07 08  06 4E 07 8D  04 81 02 06  00 8A 79 65   .....N........ye
005620  2A 8B 55 81  02 04 00 EE  07 08 06 56  07 8D 04 81   *.U........V....
005630  02 06 00 8A  79 D9 35 8B  55 81 02 04  00 EE 07 08   ....y.5.U.......
005640  06 D5 01 20  00 8D 04 81  02 06 00 8A  79 ED 4C 8B   ... ........y.L.
005650  55 81 02 04  00 EE 07 73  02 80 FF 7A  01 6A 01 D5   U......s...z.j..
005660  01 89 87 77  06 30 05 81  02 06 00 99  55 F3 05 CB   ...w.0......U...
005670  55 F3 05 7A  01 6A 01 D5  01 0A 00 69  55 D5 01 0A   U..z.j.....iU...
005680  00 45 55 D5  01 0A 00 69  55 7A 01 6A  01 D5 01 50   .EU....iUz.j...P
005690  00 45 55 D5  01 28 00 69  55 D5 01 50  00 45 55 7A   .EU..(.iU..P.EUz
0056A0  01 6A 01 D5  01 50 00 45  55 D5 01 28  00 69 55 D5   .j...P.EU..(.iU.
0056B0  01 0A 00 45  55 D5 01 28  00 69 55 D5  01 0A 00 45   ...EU..(.iU....E
0056C0  55 D5 01 28  00 69 55 D5  01 0A 00 45  55 7A 01 6A   U..(.iU....EUz.j
0056D0  01 D5 01 29  87 B5 14 08  06 D5 01 19  00 E8 04 81   ...)............
0056E0  02 0A 00 F3  05 D5 01 08  00 EE 07 D5  01 0A 00 E8   ................
0056F0  04 81 02 0A  00 D5 01 04  00 73 02 04  00 56 07 7A   .........s...V.z
005700  01 6A 01 D5  01 0A 00 45  55 75 56 7A  01 6A 01 D5   .j.....EUuVz.j..
005710  01 DB 86 77  06 81 02 04  00 EE 07 D5  01 89 87 77   ...w...........w
005720  06 81 02 04  00 EE 07 CF  56 D5 01 89  87 7F 15 D9   ........V.......
005730  54 01 57 7A  01 6A 01 D5  01 C8 00 45  55 56 07 69   T.Wz.j.....EUV.i
005740  55 2D 54 7A  01 6A 01 8B  56 D5 01 50  00 69 55 8B   U-Tz.j..V..P.iU.
005750  56 4E 07 69  55 7A 01 6A  01 A1 56 D5  01 50 00 69   VN.iUz.j..V..P.i
005760  55 A1 56 D5  01 0A 00 69  55 7A 01 6A  01 D5 01 14   U.V....iUz.j....
005770  00 45 55 75  56 D5 01 14  00 45 55 75  56 D5 01 14   .EUuV....EUuV...
005780  00 45 55 75  56 D5 01 14  00 45 55 75  56 7A 01 6A   .EUuV....EUuVz.j
005790  01 69 55 7A  01 6A 01 D5  01 14 00 69  55 D5 01 28   .iUz.j.....iU..(
0057A0  00 45 55 75  56 D5 01 0A  00 45 55 D9  54 7A 01 6A   .EUuV....EU.Tz.j
0057B0  01 D5 01 55  80 77 06 81  02 08 00 D5  01 FA 00 69   ...U.w.........i
0057C0  55 95 57 7A  01 6A 01 D5  01 64 00 45  55 75 56 D5   U.Wz.j...d.EUuV.
0057D0  01 32 00 45  55 D5 01 0A  00 69 55 7A  01 6A 01 D5   .2.EU....iUz.j..
0057E0  01 0A 00 45  55 75 56 D5  01 0A 00 45  55 75 56 D5   ...EUuV....EUuV.
0057F0  01 0A 00 45  55 75 56 7A  01 6A 01 BB  53 D5 01 C5   ...EUuVz.j..S...
005800  86 80 06 D7  53 D5 01 8F  81 C5 18 7A  01 6A 01 D5   ....S......z.j..
005810  01 D9 86 77  06 45 55 D5  01 DA 86 77  06 69 55 7A   ...w.EU....w.iUz
005820  01 6A 01 D5  01 D8 86 77  06 45 55 D5  01 DA 86 77   .j.....w.EU....w
005830  06 69 55 7A  01 6A 01 CB  54 81 02 0C  00 D7 53 D5   .iUz.j..T.....S.
005840  01 8F 81 C5  18 EE 07 D5  01 64 00 5D  56 CB 54 81   .........d.]V.T.
005850  02 0C 00 D7  53 D5 01 8F  81 C5 18 EE  07 D5 01 39   ....S..........9
005860  87 B5 14 08  06 D5 01 14  00 E8 04 81  02 0C 00 F3   ................
005870  05 9B 4E 1F  50 F9 57 EE  07 81 02 36  00 D5 01 83   ..N.P.W....6....
005880  82 77 06 54  0C C1 04 81  02 0A 00 4E  07 91 47 73   .w.T.......N..Gs
005890  02 1C 00 AF  53 D5 01 CC  86 6D 06 D5  01 09 00 D5   ....S....m......
0058A0  01 67 83 80  06 46 07 D5  01 6A 83 80  06 73 02 04   .g...F...j...s..
0058B0  00 DB 6C F9  57 7A 01 6A  01 25 55 81  02 08 00 FF   ..l.Wz.j.%U.....
0058C0  54 73 02 04  00 11 55 D5  01 4B 00 D5  01 8D 81 80   Ts....U..K......
0058D0  06 7A 01 6A  01 25 55 81  02 CC 00 FF  54 D5 01 19   .z.j.%U.....T...
0058E0  00 73 02 28  00 D5 01 DE  86 08 06 77  06 5E 07 F0   .s.(.......w.^..
0058F0  09 08 06 42  04 1B 06 80  06 81 02 0C  00 11 55 D5   ...B..........U.
005900  01 19 00 73  02 06 00 D5  01 7D 00 D5  01 8D 81 80   ...s.....}......
005910  06 7A 01 6A  01 D5 01 BB  83 08 06 77  06 D5 01 05   .z.j.......w....
005920  00 F0 09 08  06 42 04 1B  06 80 06 81  02 10 00 46   .....B.........F
005930  07 EF 59 FF  54 D5 01 C8  00 73 02 08  00 11 55 D5   ..Y.T....s....U.
005940  01 0F 00 D5  01 8D 81 80  06 7A 01 6A  01 46 07 C3   .........z.j.F..
005950  4E D5 4E 77  06 D5 01 40  00 8D 04 81  02 06 00 4E   N.Nw...@.......N
005960  07 EE 07 D5  01 B9 83 77  06 F9 3C 9A  04 81 02 06   .......w..<.....
005970  00 56 07 EE  07 D5 01 99  87 77 06 30  05 81 02 06   .V.......w.0....
005980  00 5E 07 EE  07 46 07 53  50 81 02 08  00 46 07 73   .^...F.SP....F.s
005990  02 06 00 D5  01 04 00 7A  01 6A 01 D5  01 89 81 77   .......z.j.....w
0059A0  06 81 02 08  00 11 55 73  02 04 00 FF  54 7A 01 6A   ......Us....Tz.j
```

```
0059B0   01 D5 01 89   81 77 06 8D   05 61 36 7B   39 81 02 1A   .....w...a6{9...
0059C0   00 D5 01 6D   83 77 06 B2   09 81 02 08   00 FF 54 73   ...m.w........Ts
0059D0   02 04 00 11   55 73 02 04   00 F3 05 9D   05 D5 01 89   ....Us..........
0059E0   81 80 06 D5   01 C8 00 D5   01 8D 81 80   06 7A 01 6A   .............z.j
0059F0   01 D5 01 A3   81 77 06 30   05 81 02 06   00 F3 05 EE   .....w.0........
005A00   07 81 02 08   00 FF 54 73   02 04 00 11   55 D5 01 05   ......Ts....U...
005A10   00 39 18 7A   01 6A 01 D5   01 64 85 77   06 0F 06 81   .9.z.j...d.w....
005A20   02 2E 00 56   07 F0 09 81   02 0C 00 FF   54 D5 01 32   ...V........T..2
005A30   00 73 02 08   00 11 55 D5   01 64 00 D5   01 64 85 08   .s....U..d...d..
005A40   06 77 06 51   04 46 07 F8   06 B1 18 73   02 3C 00 FF   .w.Q.F.....s.<..
005A50   54 D5 01 BB   83 08 06 77   06 0F 06 81   02 12 00 51   T......w.......Q
005A60   04 46 07 F8   06 B1 18 D5   01 C8 00 73   02 1C 00 56   .F.........s...V
005A70   07 B1 18 D5   01 6B 83 77   06 93 46 56   07 31 03 D5   .....k.w..FV.1..
005A80   01 64 85 80   06 D5 01 64   00 D5 01 8D   81 80 06 7A   .d.....d.......z
005A90   01 6A 01 46   07 8E 02 16   00 4E 07 EF   59 11 55 D5   .j.F.....N..Y.U.
005AA0   01 C8 00 D5   01 8D 81 80   06 73 02 4C   00 4E 07 8E   .........s.L.N..
005AB0   02 08 00 D3   58 73 02 40   00 56 07 8E   02 08 00 B7   ....Xs.@.V......
005AC0   58 73 02 34   00 5E 07 8E   02 12 00 FF   54 D5 01 C8   Xs.4.^......T...
005AD0   00 D5 01 8D   81 80 06 73   02 1E 00 D5   01 04 00 8E   .......s........
005AE0   02 08 00 13   59 73 02 10   00 FF 54 D5   01 C8 00 D5   ....Ys....T.....
005AF0   01 8D 81 80   06 F3 05 7A   01 6A 01 D5   01 B9 87 77   .......z.j.....w
005B00   06 81 02 06   00 15 5A EE   07 4B 59 91   5A 7A 01 6A   ......Z..KY.Zz.j
005B10   01 D5 01 55   80 77 06 81   02 08 00 AF   59 73 02 04   ...U.w......Ys..
005B20   00 15 5A 7A   01 6A 01 D5   01 7C 83 77   06 CA 09 81   ..Zz.j...|.w....
005B30   02 0C 00 F9   5A 46 07 D5   01 BA 83 80   06 7A 01 6A   ....ZF.......z.j
005B40   01 D5 01 55   80 77 06 81   02 08 00 99   59 73 02 0C   ...U.w......Ys..
005B50   00 D5 01 C8   00 D5 01 8D   81 80 06 7A   01 6A 01 D5   ...........z.j..
005B60   01 8D 81 77   06 81 02 04   00 EE 07 6C   0C 42 19 48   ...w.......l.B.H
005B70   0C 8D 04 54   0C 8E 02 08   00 0F 58 73   02 1C 00 50   ...T......[s...P
005B80   0C 8E 02 08   00 25 5B 73   02 10 00 4C   0C 8E 02 08   .....%[s...L....
005B90   00 3F 5B 73   02 04 00 F3   05 7A 01 6A   01 BD 54 81   .?[s.....z.j..T.
005BA0   0C 00 BF      53 D5 01 C5   86 80 06 EE   07 D5 01 68   ....S..........h
005BB0   85 77 06 81   02 0E 00 11   55 CB 53 D5   01 C5 86 80   .w......U.S.....
005BC0   06 EE 07 CB   54 81 02 14   00 EB 53 D5   01 39 87 7F   ....T.....S..9..
005BD0   15 CF 53 D5   01 C5 86 80   06 EE 07 5D   5B D7 53 D5   ..S........][.S.
005BE0   01 8F 81 C5   18 D5 01 86   8A 63 06 81   02 12 00 46   .........c.....F
005BF0   07 D5 01 86   8A 6D 06 46   07 D5 01 7D   83 80 06 7A   .....m.F...}...z
005C00   01 6A 01 81   02 08 00 45   57 73 02 04   00 57 57 D5   .j.....EWs...WW.
005C10   01 28 00 8F   57 7A 01 6A   01 D5 01 C6   86 B9 18 7A   .(..Wz.j.......z
005C20   01 6A 01 65   54 B4 04 D5   01 6A 83 77   06 30 05 8D   .j.eT....j.w.0..
005C30   04 81 02 06   00 F9 57 EE   07 99 54 D5   01 32 00 5D   ......W...T..2.]
005C40   56 2D 54 65   54 81 02 0C   00 C5 57 EF   53 60 04 73   V-TeT.....W.S`.s
005C50   02 04 00 EF   53 D5 01 29   87 7F 15 1B   54 81 02 0C   ....S..)....T...
005C60   00 C3 53 D5   01 C5 86 80   06 EE 07 D5   01 0A 00 5D   ..S............]
005C70   56 D5 01 29   87 77 06 30   05 81 02 E0   FF 77 54 F9   V..).w.0.....wT.
005C80   57 7A 01 6A   01 D5 01 04   00 D5 01 29   87 7F 15 BD   Wz.j.......)....
005C90   54 D5 01 29   87 77 06 CA   09 8D 04 81   02 08 00 71   T..).w.........q
005CA0   17 73 02 EC   FF 7A 01 6A   01 56 07 D5   01 29 87 7F   .s...z.j.V...)..
005CB0   15 BD 54 81   02 06 00 46   07 EE 07 71   17 D5 01 29   ..T....F...q...)
005CC0   87 77 06 30   05 81 02 EA   FF 66 07 7A   01 6A 01 BD   .w.0.....f.z.j..
005CD0   54 81 02 0A   00 83 5C A7   5C 81 02 FA   FF E7 53 D5   T.....\.\.....S.
005CE0   01 39 87 7F   15 BD 54 B4   04 81 02 1E   00 D5 01 39   .9....T........9
005CF0   87 B5 14 D5   01 66 83 77   06 BA 09 81   02 06 00 66   .....f.w.......f
005D00   07 EE 07 71   17 73 02 DE   FF D5 01 39   87 B5 14 56   ...q.s.....9...V
005D10   07 38 04 4E   07 F8 06 D5   01 66 83 80   06 46 07 7A   .8.N.....f...F.z
005D20   01 6A 01 46   07 D5 01 DB   86 80 06 46   07 D5 01 C6   .j.F.......F....
005D30   86 80 06 56   07 D5 01 66   83 80 06 17   5C 65 54 81   ...V...f....\eT.
005D40   02 08 00 66   07 73 02 04   00 CD 5C 81   02 EE FF 21   ...f.s....\....!
005D50   5C 7A 01 6A   01 D5 01 29   87 7F 15 5E   07 D5 01 CE   \z.j...)...^....
005D60   86 80 06 1B   54 B4 04 81   02 1C 00 0D   57 56 07 5D   ....T.......WV.]
```

```
005D70  56 D5 01 29  87 77 06 30  05 81 02 06  00 46 07 EE   V..).w.0.....F..
005D80  07 73 02 E0  FF F3 53 66  07 7A 01 6A  01 DB 53 53   .s....Sf.z.j..SS
005D90  5D 7A 01 6A  01 08 06 A3  53 C1 04 81  02 06 00 F3   ]z.j....S.......
005DA0  05 46 07 7A  01 6A 01 08  06 4E 07 D1  04 81 02 08   .F.z.j...N......
005DB0  00 46 06 46  07 EE 07 D5  01 05 00 1F  07 46 07 D5   .F.F.........F..
005DC0  01 D0 86 80  06 66 07 D3  18 46 07 F9  05 46 07 F2   .....f...F...F..
005DD0  01 19 5E D5  01 0A 00 31  03 00 06 53  5D B4 04 81   ..^....1...S]...
005DE0  02 0C 00 1B  06 F3 05 46  07 D3 18 33  02 08 06 D5   .......F...3....
005DF0  01 D0 86 80  06 08 06 A7  53 C1 04 00  06 AB 53 C1   ........S.....S.
005E00  04 9A 04 81  02 0C 00 F3  05 D5 01 0A  00 1A 04 33   ...............3
005E10  02 93 5D 30  04 43 02 BC  FF CB 18 F9  05 81 02 0A   ..]0.C..........
005E20  00 66 07 00  06 73 02 08  00 F3 05 46  07 46 07 D5   .f...s.....F.F..
005E30  01 AF 89 6D  06 7A 01 6A  01 A5 5D 08  06 D5 01 D0   ...m.z.j..].....
005E40  86 77 06 A7  53 C1 04 8D  04 81 02 06  00 46 06 46   .w..S........F.F
005E50  07 7A 01 6A  01 2F 06 8D  05 8D 05 A5  5D B4 04 81   .z.j./......]...
005E60  02 0C 00 56  07 1F 18 46  06 46 07 EE  07 9D 05 9D   ...V...F.F......
005E70  05 D5 01 D0  86 77 06 A7  53 C1 04 81  02 0A 00 46   .....w..S......F
005E80  06 00 06 F9  05 EE 07 A5  5D B4 04 81  02 08 00 F3   ........].......
005E90  05 46 07 EE  07 2F 06 E8  04 B4 04 81  02 0C 00 2F   .F.../........./
005EA0  06 66 07 D3  18 73 02 0A  00 46 06 46  07 46 07 46   .f...s...F.F.F.F
005EB0  07 D5 01 B2  89 80 06 D5  01 B1 89 80  06 7A 01 6A   .............z.j
005EC0  01 D5 01 14  00 D5 01 04  00 37 5E 81  02 0E 00 D5   .........7^.....
005ED0  01 64 00 09  04 F9 05 73  02 06 00 46  07 56 07 F9   .d.....s...F.V..
005EE0  05 D5 01 3C  00 31 03 30  04 1B 06 07  50 7A 01 6A   ...<.1.0....Pz.j
005EF0  01 02 4D 46  07 1B 06 07  50 7A 01 6A  01 46 07 00   ..MF....Pz.j.F..
005F00  06 51 04 46  07 F8 06 0A  19 D3 18 46  07 1D 02 29   .Q.F.......F...)
005F10  5F 2F 06 8D  04 81 02 08  00 CD 58 73  02 04 00 21   _/........Xs...!
005F20  58 4E 07 CB  07 43 02 EA  FF 46 06 7A  01 6A 01 08   XN...C...F.z.j..
005F30  06 53 50 56  07 FB 5E D5  01 32 00 69  55 C3 4E DB   .SPV..^..2.iU.N.
005F40  4E 63 06 CA  09 81 02 04  00 DD 57 7A  01 6A 01 56   Nc........Wz.j.V
005F50  07 FB 5E D5  01 32 00 0A  00 09 04 56  ..^..2.]V.....V
005F60  07 FB 5E D5  01 32 00 5D  56 D5 01 04  00 FB 5E D5   ..^..2.]V.....^.
005F70  01 46 00 5D  56 D5 01 0A  00 09 04 5E  07 FB 5E D5   .F.]V......^..^.
005F80  01 3C 00 5D  56 D5 01 04  00 FB 5E 7A  01 6A 01 D5   .<.]V.....^z.j..
005F90  01 79 83 77  06 F9 05 2F  06 46 07 D7  1E 08 06 35   .y.w.../.F.....5
005FA0  1B C1 04 81  02 0A 00 F3  05 35 57 73  02 04 00 4D   .........5Ws...M
005FB0  5F 8B 5D 81  02 1E 00 08  06 D5 01 08  00 E8 04 81   _.].............
005FC0  02 06 00 DB  18 EE 07 8D  05 2F 06 9D  05 51 04 73   ........./...Q.s
005FD0  02 06 00 46  06 EE 07 73  02 C2 FF 7A  01 6A 01 43   ...F...s...z.j.C
005FE0  11 31 03 D5  01 94 91 30  04 63 06 B7  1E 4D 5F 7A   .1.....0.c...M_z
005FF0  01 6A 01 D5  01 74 83 77  06 D5 01 0F  00 D1 04 7A   .j...t.w.......z
006000  01 6A 01 2F  06 D5 01 76  82 80 06 D5  01 75 82 80   .j./...v.....u..
006010  06 A7 53 8E  02 0C 00 05  4D BF 5E AF  57 73 02 74   ..S.....M.^.Ws.t
006020  00 AB 53 8E  02 0C 00 01  4D BF 5E AF  57 73 02 64   ..S.....M.^.Ws.d
006030  00 A3 53 8E  02 0A 00 EF  5E AF 57 73  02 56 00 D5   ..S.....^.Ws.V..
006040  01 08 00 8E  02 08 00 2D  5F 73 02 48  00 D5 01 07   .......-_s.H....
006050  00 8E 02 0C  00 09 4D BF  5E AF 57 73  02 36 00 D5   ......M.^.Ws.6..
006060  01 09 00 8E  02 0C 00 0D  4D BF 5E AF  57 73 02 24   ........M.^.Ws.$
006070  00 4E 07 8E  02 0A 00 8D  5F AF 57 73  02 16 00 56   .N......_.Ws...V
006080  07 8E 02 0A  00 DD 5F AF  57 73 02 08  00 35 57 F3   ......_.Ws...5W.
006090  05 F3 05 7A  01 6A 01 8B  5D 81 02 3A  00 08 06 A7   ...z.j..]..:....
0060A0  53 8E 02 0A  00 F3 05 66  07 73 02 26  00 AB 53 8E   S......f.s.&..S.
0060B0  02 0A 00 F3  05 66 07 73  02 18 00 A3  53 8E 02 0C   .....f.s....S...
0060C0  00 F3 05 46  07 46 07 73  02 08 00 46  07 F9 05 F3   ...F.F.s...F....
0060D0  05 73 02 04  00 66 07 7A  01 6A 01 D5  01 0A 00 31   .s...f.z.j.....1
0060E0  03 95 60 81  02 06 00 F3  05 EE 07 30  04 08 06 D5   ..`........0....
0060F0  01 FF 00 E8  04 81 02 08  00 F3 05 35  57 EE 07 8B   ...........5W...
006100  5D 81 02 08  00 01 60 73  02 04 00 F3  05 7A 01 6A   ].....`s.....z.j
006110  01 77 54 F9  57 7A 01 6A  01 08 06 A3  53 C1 04 81   .wT.Wz.j....S...
006120  02 06 00 F3  05 46 07 08  06 56 07 BA  09 81 02 08   .....F...V......
```

```
006130   00 D9 60 73   02 06 00 F3   05 35 57 46   07 7A 01 6A    ..'s.....SWF.z.j
006140   01 08 06 D5   01 D0 07 D1   04 D5 01 55   80 77 06 CA    ...........U.w..
006150   09 8D 04 81   02 10 00 D5   01 E8 03 38   04 7B 39 F3    ...........8.{9.
006160   05 73 02 08   00 B7 53 30   04 77 06 7A   01 6A 01 08    .s....S0.w.z.j..
006170   06 D5 01 D0   07 D1 04 D5   01 55 80 77   06 CA 09 8D    .........U.w....
006180   04 81 02 10   00 D5 01 E8   03 38 04 C5   3A 65 18 73    .........8..:e.s
006190   02 08 00 B7   53 30 04 80   06 7A 01 6A   01 D5 01 08    ....S0...z.j....
0061A0   00 FB 5E 7A   01 6A 01 D5   01 50 00 53   5D B4 04 81    ..^z.j...P.S]...
0061B0   02 04 00 EE   07 08 06 A3   53 8E 02 0A   00 F3 05 EE    ........S.......
0061C0   07 73 02 72   00 A7 53 8E   02 18 00 F3   05 D5 01 DC    .s.r..S.........
0061D0   86 63 06 3F   61 D5 01 64   00 69 55 9B   61 73 02 56    .c.?a..d.iU.as.V
0061E0   00 AB 53 8E   02 22 00 F3   05 D5 01 DC   86 63 06 42    ..S.."........c.B
0061F0   04 08 06 D5   01 DC 86 6D   06 3F 61 D5   01 64 00 69    .......m.?a..d.i
006200   55 9B 61 73   02 30 00 D5   01 E8 03 31   03 D5 01 1E    U.as.0.....1....
006210   00 5E 07 37   5E 81 02 1A   00 30 04 08   06 D5 01 DC    .^.7^....0......
006220   86 6D 06 3F   61 D5 01 64   00 69 55 9B   61 73 02 04    .m.?a..d.iU.as..
006230   00 F3 05 F3   05 73 02 70   FF 7A 01 6A   01 A5 61 8B    .....s.p.z.j..a.
006240   5D B4 04 81   02 04 00 EE   07 A3 53 8E   02 08 00 EE    ].........S.....
006250   07 73 02 26   00 A7 53 8E   02 1C 00 95   57 D5 01 1E    .s.&..S.....W...
006260   00 5E 07 37   5E 81 02 0A   00 D5 01 DC   86 63 06 6D    .^.7^........c.m
006270   61 73 02 06   00 35 57 F3   05 73 02 C2   FF 7A 01 6A    as...5W..s...z.j
006280   01 66 07 F9   05 56 07 8E   02 0A 00 B5   37 EE 07 73    .f...V......7..s
006290   02 44 00 D5   01 06 00 8E   02 18 00 D5   01 68 82 AE    .D...........h..
0062A0   06 D5 01 00   00 D5 01 00   00 61 05 B4   04 73 02 26    .........a...s.&
0062B0   00 D5 01 08   00 8E 02 0A   00 5B 6E 46   07 73 02 16    .........[nF.s..
0062C0   00 D5 01 09   00 8E 02 08   00 0B 6C 73   02 08 00 46    ..........ls...F
0062D0   07 1B 06 F3   05 F9 05 81   02 08 00 01   5C 73 02 06    ............\s..
0062E0   00 F3 05 35   57 7A 01 6A   01 D5 01 8F   81 C5 18 D5    ...5Wz.j........
0062F0   01 8F 81 77   06 30 05 81   02 F6 FF 7A   01 6A 01 D5    ...w.0.....z.j..
006300   01 6B 85 63   06 D5 01 69   85 63 06 08   06 E7 62 00    .k.c...i.c....b.
006310   06 46 07 F2   01 27 63 EB   54 08 06 E7   62 D9 54 08    .F...'c.T...b.T.
006320   06 E7 62 43   02 F2 FF F9   05 D5 01 04   00 31 03 46    ..bC.........1.F
006330   07 F2 01 3F   63 08 06 60   04 E7 62 43   02 F8 FF F3    ...?c..`..bC....
006340   05 7A 01 6A   01 D5 01 6B   85 63 06 D5   01 69 85 63    .z.j...k.c...i.c
006350   06 08 06 E7   62 00 06 5E   07 31 03 46   07 F2 01 71    ....b..^.1.F...q
006360   63 EB 54 08   06 E7 62 D9   54 08 06 E7   62 43 02 F2    c.T...b.T...bC..
006370   FF F9 05 5E   07 31 03 46   07 F2 01 87   63 08 06 60    ...^.1.F....c..`
006380   04 E7 62 43   02 F8 FF F3   05 7A 01 6A   01 81 02 08    ..bC.....z.j....
006390   00 FD 62 73   02 04 00 43   63 5D 56 1B   54 7A 01 6A    ..bs...Cc]V.Tz.j
0063A0   01 D5 01 64   00 5D 56 2D   54 D5 01 0F   00 46 07 F2    ...d.]V-T....F..
0063B0   01 F3 63 11   55 D5 01 0A   00 66 07 8B   63 81 02 04    ..c.U....f..c...
0063C0   00 33 02 D5   01 0A 00 46   07 8B 63 81   02 20 00 33    .3.....F..c.. .3
0063D0   02 D5 01 0A   00 46 07 8B   63 81 02 04   00 33 02 FF    .....F..c....3..
0063E0   54 D5 01 1E   00 66 07 8B   63 81 02 04   00 33 02 43    T....f..c....3.C
0063F0   02 C2 FF 7A   01 6A 01 08   06 AB 53 C1   04 81 02 08    ...z.j....S.....
006400   00 F3 05 73   02 58 00 D5   01 C7 86 77   06 30 05 81    ...s.X.....w.0..
006410   02 04 00 EE   07 A7 53 8E   02 0E 00 8B   5D 81 02 04    ......S.....]...
006420   00 7F 62 73   02 38 00 A3   53 8E 02 08   00 3B 62 73    ..bs.8..S....;bs
006430   02 2C 00 4E   07 8E 02 08   00 E9 6C 73   02 20 00 56    .,.N......ls. .V
006440   07 8E 02 08   00 DB 6C 73   02 14 00 D5   01 08 00 8E    ......ls........
006450   02 0A 00 1D   6D 11 37 73   02 04 00 F3   05 7A 01 6A    ....m.7s.....z.j
006460   01 AB 53 8E   02 0E 00 8B   5D 81 02 04   00 F3 05 73    ..S.....]......s
006470   02 2A 00 A7   53 8E 02 08   00 1F 50 73   02 1E 00 A3    .*..S.....Ps....
006480   53 8E 02 0E   00 46 07 D5   01 66 83 80   06 73 02 0C    S....F...f...s..
006490   00 D5 01 67   83 80 06 46   07 F3 05 01   57 7A 01 6A    ...g...F....Wz.j
0064A0   01 8B 5D 81   02 34 00 A7   53 8E 02 08   00 0F 61 73    ..].4..S......as
0064B0   02 28 00 AB   53 8E 02 0E   00 8B 5D 81   02 04 00 F5    .(..S.....].....
0064C0   63 73 02 16   00 A3 53 8E   02 0E 00 8B   5D 81 02 04    cs....S.....]...
0064D0   00 5F 64 73   02 04 00 F3   05 7A 01 6A   01 8B 5D 81    ._ds.....z.j..].
0064E0   02 28 00 D5   01 06 00 8E   02 1E 00 C0   79 12 0C F9    .(..........y...
```

```
0064F0  05 9B 61 D5  01 64 00 69  55 56 07 FB  5E D5 01 32   ..a..d.iUV..^..2
006500  00 69 55 73  02 04 00 F3  05 7A 01 6A  01 46 07 D5   .iUs.....z.j.F..
006510  01 69 87 80  06 4E 07 D5  01 C7 86 80  06 8B 5D 81   .i...N........].
006520  02 30 00 A7  53 8E 02 08  00 9F 64 73  02 20 00 AB   .0..S.....ds. ..
006530  53 8E 02 08  00 DB 64 73  02 14 00 D5  01 09 00 8E   S.....ds........
006540  02 08 00 35  57 73 02 06  00 17 61 F3  05 73 02 08   ...5Ws....a..s..
006550  00 77 54 F9  57 EE 07 D5  01 0A 00 5D  56 AF 54 81   .wT.W......]V.T.
006560  02 BC FF 7A  01 6A 01 D5  01 CA 86 63  06 B3 53 C1   ...z.j.....c..S.
006570  04 81 02 08  00 D3 53 73  02 04 00 C7  53 7A 01 6A   ......Ss....Sz.j
006580  01 11 55 5E  07 D5 01 0A  00 5D 56 D5  01 14 00 D5   ..U^.....]V.....
006590  01 04 00 37  5E 81 02 3A  00 08 06 D5  01 CA 86 6D   ...7^..:.......m
0065A0  06 08 06 D5  01 CC 86 63  06 C1 04 F9  05 B3 53 C1   .......c......S.
0065B0  04 9A 04 81  02 18 00 F3  05 65 65 D5  01 C5 86 80   .........ee.....
0065C0  06 6B 57 46  07 D5 01 DB  86 80 06 EE  07 73 02 06   .kWF.........s..
0065D0  00 F3 05 4E  07 35 57 4E  07 38 04 46  07 F8 06 08   ...N.5WN.8.F....
0065E0  06 30 05 81  02 A0 FF F3  05 77 54 F9  57 7A 01 6A   .0.......wT.Wz.j
0065F0  01 D5 01 0A  00 F0 09 D5  01 B9 89 80  06 46 07 D5   .............F..
006600  01 B9 89 42  04 7C 0C 51  04 00 06 30  04 D5 01 CF   ...B.|.Q...0....
006610  86 77 06 81  02 0A 00 51  04 08 06 73  02 04 00 46   .w.....Q...s...F
006620  07 8D 05 F9  05 F2 01 49  66 D5 01 06  00 53 5D 30   .......If....S]0
006630  05 81 02 08  00 F3 05 66  07 33 02 D5  01 0A 00 F0   .......f.3......
006640  09 B9 05 80  06 43 02 E2  FF 9D 05 D5  01 CF 86 77   .....C.........w
006650  06 81 02 12  00 D5 01 B9  89 7C 0C 51  04 83 26 B1   .........|.Q..&.
006660  1B 73 02 04  00 F3 05 95  57 7A 01 6A  01 D5 01 CF   .s......Wz.j....
006670  86 80 06 D5  01 06 00 53  5D 81 02 46  00 EF 65 81   .......S]..F..e.
006680  02 08 00 35  57 66 07 EE  07 D5 01 7A  82 77 06 CA   ...5Wf.....z.w..
006690  09 81 02 04  00 D9 35 46  07 D5 01 82  82 80 06 D5   ......5F........
0066A0  01 B9 89 ED  26 D5 01 82  82 77 06 30  05 81 02 0A   ....&....w.0....
0066B0  00 D9 35 46  07 73 02 06  00 35 57 66  07 73 02 06   ..5F.s...5Wf.s..
0066C0  00 66 07 35  57 7A 01 6A  01 46 07 D5  01 C7 86 80   .f.5Wz.j.F......
0066D0  06 DB 53 D5  01 29 87 7F  15 6D 6A 7A  01 6A 01 D5   ..S..)...mjz.j..
0066E0  01 C7 66 46  07 5E 07 C1  17 7A 01 6A  01 D5 01 64   ..fF.^...z.j...d
0066F0  00 5D 56 1B  54 81 02 04  00 EE 07 D5  01 3C 00 46   .]V.T........<.F
006700  07 F2 01 1B  67 66 07 65  18 56 07 53  5D 81 02 08   ....gf.e.V.S]...
006710  00 F3 05 9F  63 33 02 43  02 EC FF 7A  01 6A 01 77   ....c3.C...z.j.w
006720  54 D5 01 C8  00 5D 56 99  54 D5 01 64  00 5D 56 7A   T....]V.T..d.]Vz
006730  01 6A 01 D5  01 64 00 5D  56 66 07 D5  01 0F 00 46   .j...d.]Vf.....F
006740  07 F2 01 69  67 11 55 2D  54 D5 01 32  00 5D 56 1B   ...ig.U-T..2.]V.
006750  54 30 05 81  02 08 00 F3  05 46 07 33  02 FF 54 D5   T0.......F.3..T.
006760  01 32 00 5D  56 43 02 DE  FF 7A 01 6A  01 D5 01 AE   .2.]VC...z.j....
006770  89 08 06 77  06 4E 07 9A  04 B1 18 7A  01 6A 01 6B   ...w.N.....z.j.k
006780  67 46 07 6B  66 F3 05 7A  01 6A 01 D5  01 AE 89 08   gF.kf..z.j......
006790  06 77 06 46  07 1B 06 80  06 4E 07 C1  04 7A 01 6A   .w.F.....N...z.j
0067A0  01 D5 01 05  00 F9 05 37  5E 81 02 08  00 C1 04 73   .......7^......s
0067B0  02 06 00 F3  05 46 07 7A  01 6A 01 D5  01 55 00 77   .....F.z.j...U.w
0067C0  06 81 02 32  00 59 36 7B  39 81 02 22  00 D5 01 3F   ...2.Y6{9.."...?
0067D0  00 8D 04 D5  01 05 00 5E  07 37 5E 81  02 08 00 C1   .......^.7^.....
0067E0  04 73 02 06  00 F3 05 46  07 73 02 06  00 F3 05 46   .s.....F.s.....F
0067F0  07 73 02 04  00 66 07 7A  01 6A 01 D5  01 92 16 D5   .s...f.z.j......
006800  01 04 00 9F  67 81 02 12  00 6D 6E 46  07 D5 01 7D   ....g....mnF...}
006810  83 80 06 66  07 73 02 04  00 46 07 7A  01 6A 01 D5   ...f.s...F.z.j..
006820  01 05 00 D5  01 04 00 37  5E B4 04 81  02 04 00 EE   .......7^.......
006830  07 D5 01 05  00 5E 07 37  5E B4 04 81  02 06 00 F3   .....^.7^.......
006840  05 EE 07 F9  05 6D 61 7A  01 6A 01 D5  01 FF 00 9B   .....maz.j......
006850  61 46 07 9B  61 D5 01 AA  00 9B 61 D5  01 55 00 9B   aF..a.....a..U..
006860  61 7A 01 6A  01 D5 01 05  00 5E 07 37  5E B4 04 81   az.j.....^.7^...
006870  02 04 00 EE  07 D5 01 05  00 5E 07 37  5E B4 04 81   .........^.7^...
006880  02 06 00 F3  05 EE 07 D5  01 05 00 5E  07 37 5E B4   ...........^.7^.
006890  04 81 02 06  00 46 06 EE  07 3D 54 49  68 7A 01 6A   .....F...=TIhz.j
0068A0  01 D5 01 05  00 53 5D 81  02 88 00 4E  07 8E 02 08   .....S]....N....
```

| | | | | | |
|---|---|---|---|---|---|
| 0068B0 | 00 89 67 73 | 02 76 00 56 | 07 8E 02 0C | 00 C0 79 5E | ..gs.v.V.....y^ |
| 0068C0 | 07 9F 67 73 | 02 66 00 5E | 07 8E 02 0C | 00 8D 73 56 | ..gs.f.^.....sV |
| 0068D0 | 07 9F 67 73 | 02 56 00 D5 | 01 04 00 8E | 02 0C 00 A0 | ..gs.V.......... |
| 0068E0 | 73 56 07 9F | 67 73 02 44 | 00 D5 01 05 | 00 8E 02 08 | sV..gs.D........ |
| 0068F0 | 00 B9 67 73 | 02 36 00 D5 | 01 06 00 8E | 02 0A 00 1D | ..gs.6.......... |
| 006900 | 68 46 07 73 | 02 26 00 D5 | 01 07 00 8E | 02 08 00 F9 | hF.s.&.......... |
| 006910 | 67 73 02 18 | 00 D5 01 08 | 00 8E 02 0A | 00 63 68 46 | gs...........chF |
| 006920 | 07 73 02 08 | 00 46 07 F9 | 05 F3 05 81 | 02 04 00 9F | .s...F.......... |
| 006930 | 63 7A 01 6A | 01 3F 61 08 | 06 8D 05 D1 | 04 9D 05 1B | cz.j.?a......... |
| 006940 | 06 D1 04 9A | 04 08 06 81 | 02 CC 00 D5 | 01 FF 00 D5 | ................ |
| 006950 | 01 AE 89 80 | 06 7A 01 6A | 01 6B 67 D5 | 01 05 00 D5 | .....z.j.kg..... |
| 006960 | 01 04 00 37 | 5E B4 04 81 | 02 04 00 EE | 07 D5 01 05 | ...7^........... |
| 006970 | 00 D5 01 04 | 00 37 5E B4 | 04 81 02 06 | 00 F3 05 EE | .....7^......... |
| 006980 | 07 D5 01 05 | 00 5E 07 53 | 5E B4 04 81 | 02 06 00 46 | .....^.S^......F |
| 006990 | 06 EE 07 38 | 06 00 06 30 | 04 F9 05 F2 | 01 AF 69 2F | ...8...0......i/ |
| 0069A0 | 06 B9 05 33 | 69 81 02 04 | 00 33 02 43 | 02 F2 FF 46 | ...3i....3.C...F |
| 0069B0 | 06 7A 01 6A | 01 4E 07 8E | 02 0E 00 53 | 54 2D 54 9F | .z.j.N.....ST-T. |
| 0069C0 | 63 46 07 73 | 02 A6 00 56 | 07 8E 02 1A | 00 D5 01 64 | cF.s...V.......d |
| 0069D0 | 00 5D 56 1B | 54 81 02 08 | 00 46 07 73 | 02 04 00 66 | .]V.T....F.s...f |
| 0069E0 | 07 73 02 88 | 00 5E 07 8E | 02 1C 00 46 | 07 D5 01 AE | .s...^.....F.... |
| 0069F0 | 89 80 06 46 | 07 6B 66 B4 | 04 81 02 04 | 00 9F 63 46 | ...F.kf.......cF |
| 006A00 | 07 73 02 68 | 00 D5 01 04 | 00 8E 02 0A | 00 EB 66 46 | .s.h..........fF |
| 006A10 | 07 73 02 58 | 00 D5 01 05 | 00 8E 02 0A | 00 7D 67 46 | .s.X.........}gF |
| 006A20 | 07 73 02 48 | 00 D5 01 06 | 00 8E 02 0A | 00 9F 68 46 | .s.H..........hF |
| 006A30 | 07 73 02 38 | 00 D5 01 07 | 00 8E 02 0A | 00 57 69 46 | .s.8.........WiF |
| 006A40 | 07 73 02 28 | 00 D5 01 08 | 00 8E 02 1A | 00 D5 01 05 | .s.(............ |
| 006A50 | 00 D5 01 04 | 00 37 5E 81 | 02 06 00 3F | 61 9B 61 46 | .....7^....?a.aF |
| 006A60 | 07 73 02 08 | 00 46 07 F9 | 05 F3 05 7A | 01 6A 01 46 | .s...F.....z.j.F |
| 006A70 | 07 D5 01 68 | 85 80 06 4E | 07 D5 01 71 | 83 80 06 4E | ...h...N...q...N |
| 006A80 | 07 D5 01 DB | 86 80 06 2D | 54 99 54 9F | 63 66 07 65 | .......-T.T.cf.e |
| 006A90 | 18 31 67 81 | 02 0A 00 1D | 67 66 07 73 | 02 20 00 FF | .1g.....gf.s. .. |
| 006AA0 | 54 D5 01 19 | 00 5D 56 01 | 57 D5 01 3C | 00 53 5D 81 | T....]V.W..<.S]. |
| 006AB0 | 02 08 00 B3 | 69 73 02 06 | 00 1D 67 66 | 07 11 55 81 | ....is....gf..U. |
| 006AC0 | 02 D0 FF 46 | 07 D5 01 71 | 83 80 06 46 | 07 D5 01 DB | ...F...q...F.... |
| 006AD0 | 86 80 06 77 | 54 F9 57 7A | 01 6A 01 BB | 53 8E 02 0A | ...wT.Wz.j..S... |
| 006AE0 | 00 9B 5B D9 | 54 73 02 6C | 00 BF 53 8E | 02 08 00 21 | ..[.Ts.l..S....! |
| 006AF0 | 5D 73 02 60 | 00 C3 53 8E | 02 08 00 7F | 65 73 02 54 | ]s.`..S....es.T |
| 006B00 | 00 C7 53 8E | 02 14 00 11 | 55 0B 65 FF | 54 46 07 D5 | ..S.....U.e.TF.. |
| 006B10 | 01 29 87 80 | 06 73 02 3C | 00 D3 53 8E | 02 14 00 11 | .)...s.<..S..... |
| 006B20 | 55 DD 66 FF | 54 46 07 D5 | 01 29 87 80 | 06 73 02 24 | U.f.TF...)...s.$ |
| 006B30 | 00 CB 53 8E | 02 08 00 6D | 6A 73 02 18 | 00 CF 53 8E | ..S....mjs....S. |
| 006B40 | 02 08 00 35 | 58 73 02 0C | 00 BB 53 D5 | 01 C5 86 80 | ...5Xs....S..... |
| 006B50 | 06 F3 05 D7 | 53 D5 01 8F | 81 C5 18 7A | 01 6A 01 D5 | ....S......z.j.. |
| 006B60 | 01 8F 81 77 | 06 CA 09 81 | 02 04 00 EE | 07 D5 01 C5 | ...w............ |
| 006B70 | 86 77 06 D9 | 6A 7A 01 6A | 01 D5 01 5D | 6B 46 07 D5 | .w..jz.j...]kF.. |
| 006B80 | 01 10 00 C1 | 17 7A 01 6A | 01 D5 01 D5 | 80 BC 79 83 | .....z.j...]..y. |
| 006B90 | 07 7A 01 40 | 01 1E 00 40 | 01 46 00 6A | 01 D5 01 55 | .z.@...@.F.j...U |
| 006BA0 | 80 77 06 81 | 02 0A 00 D5 | 01 30 00 73 | 02 06 00 D5 | .w.......0.s.... |
| 006BB0 | 01 0C 00 D5 | 01 5E 82 80 | 06 7A 01 40 | 01 55 55 6A | .....^...z.@.UUj |
| 006BC0 | 01 BB 6B 08 | 06 D5 01 50 | 80 6D 06 08 | 06 D5 01 65 | ..k....P.m.....e |
| 006BD0 | 82 6D 06 08 | 06 D5 01 6D | 80 6D 06 08 | 06 D5 01 99 | .m.....m.m...... |
| 006BE0 | 81 6D 06 08 | 06 D5 01 C8 | 8A 6D 06 08 | 06 D5 01 92 | .m.......m...... |
| 006BF0 | 91 6D 06 08 | 06 D5 01 D9 | 91 6D 06 08 | 06 D5 01 C8 | .m.......m...... |
| 006C00 | 86 6D 06 D5 | 01 DE 91 6D | 06 7A 01 6A | 01 BB 6B 8D | .m.....m.z.j..k. |
| 006C10 | 05 AD 05 D5 | 01 50 80 63 | 06 C1 04 AD | 05 D5 01 65 | .....P.c.......e |
| 006C20 | 82 63 06 C1 | 04 8D 04 AD | 05 D5 01 6D | 80 63 06 C1 | .c.........m.c.. |
| 006C30 | 04 8D 04 AD | 05 D5 01 99 | 81 63 06 C1 | 04 8D 04 AD | .........c...... |
| 006C40 | 05 D5 01 C8 | 8A 63 06 C1 | 04 8D 04 AD | 05 D5 01 92 | .....c.......... |
| 006C50 | 91 63 06 C1 | 04 8D 04 AD | 05 D5 01 D9 | 91 63 06 C1 | .c...........c.. |
| 006C60 | 04 8D 04 AD | 05 D5 01 C8 | 86 63 06 C1 | 04 8D 04 9D | .........c...... |

```
006C70   05 D5 01 DE   91 63 06 C1   04 8D 04 7A   01 6A 01 46   .....c.....z.j.F
006C80   07 08 06 D5   01 50 80 6D   06 08 06 D5   01 65 82 6D   .....P.m.....e.m
006C90   06 08 06 D5   01 6D 80 6D   06 08 06 D5   01 99 81 6D   .....m.m.......m
006CA0   06 08 06 D5   01 C8 8A 6D   06 08 06 D5   01 92 91 6D   .......m.......m
006CB0   06 08 06 D5   01 D9 91 6D   06 08 06 D5   01 C8 86 6D   .......m.......m
006CC0   06 D5 01 DE   91 6D 06 7A   01 CB 6C 3E   D7 D3 03 C7   .....m.z..l>....
006CD0   0A 03 6F 0A   03 67 5E 23   56 EB E9 6A   01 77 54 FF   ..o..g^#V..j.wT.
006CE0   54 35 57 7D   6C CB 6E 7A   01 6A 01 77   54 C9 6C 7A   T5W}l.nz.j.wT.lz
006CF0   01 6A 01 46   07 C3 4E 23   11 1F 11 31   03 83 07 7A   .j.F..N#...1...z
006D00   01 6A 01 F1   6C 7A 01 6A   01 6C 0C 42   19 48 0C 8D   .j..lz.j.l.B.H..
006D10   04 4C 0C C1   04 CB 54 8D   04 CA 09 7A   01 6A 01 56   .L....T....z.j.V
006D20   07 D5 01 73   8A 80 06 D5   01 0F 00 D5   01 85 8A 80   ...s............
006D30   06 D5 01 78   00 D5 01 84   8A 80 06 D5   01 04 00 D5   ...x............
006D40   01 A4 8A 80   06 D5 01 14   00 D5 01 A3   8A 80 06 D5   ................
006D50   01 08 00 D5   01 6F 8A 80   06 D5 01 08   00 D5 01 70   .....o.........p
006D60   8A 80 06 4E   07 D5 01 77   8A 80 06 D5   01 3C 00 D5   ...N...w.....<..
006D70   01 83 8A 80   06 77 37 7A   01 6A 01 6C   0C 42 19 48   .....w7z.j.l.B.H
006D80   0C 8D 04 54   0C C1 04 81   02 04 00 1D   6D 7A 01 6A   ...T........mz.j
006D90   01 46 07 D5   01 61 82 80   06 D5 01 61   82 77 06 81   .F...a.....a.w..
006DA0   02 F8 FF 46   07 D5 01 61   82 80 06 46   07 42 04 D5   ...F...a...F.B..
006DB0   01 00 7F 1F   07 D5 01 61   82 77 06 81   02 F0 FF 08   .......a.w......
006DC0   06 D5 01 57   80 6D 06 7A   01 6A 01 8F   6D 97 6B E8   ...W.m.z.j..m.k.
006DD0   04 81 02 08   00 4E 07 73   02 04 00 46   07 D5 01 A3   .....N.s...F....
006DE0   81 80 06 7A   01 6A 01 8F   6D 93 6B D1   04 81 02 08   ...z.j..m.k.....
006DF0   00 4E 07 73   02 06 00 C9   6D 46 07 D5   01 55 80 80   .N.s....mF...U..
006E00   06 7A 01 6A   01 D5 01 55   80 77 06 81   02 1A 00 38   .z.j...U.w.....8
006E10   0C 08 06 D5   01 5A 80 80   06 3C 0C 08   06 D5 01 59   .....Z...<.....Y
006E20   80 80 06 73   02 16 00 40   0C 08 06 D5   01 5A 80 80   ...s...@.....Z..
006E30   06 44 0C 08   06 D5 01 59   80 80 06 9A   04 7A 01 6A   .D.....Y.....z.j
006E40   01 D5 01 15   85 23 11 D5   01 07 00 6E   07 D5 01 26   .....#.....n...&
006E50   85 23 11 D5   01 0C 00 6E   07 7A 01 6A   01 D5 01 00   .#.....n.z.j....
006E60   00 D5 01 00   00 D5 01 68   82 9F 06 7A   01 6A 01 6A   .......h...z.j.j
006E70   01 0A 91 3F   11 4B 11 31   03 7F 11 6E   07 D5 01 CA   ...?.K.1...n....
006E80   8A 53 11 4F   11 31 03 7F   11 6E 07 46   07 D5 01 F6   .S.O.1...n.F....
006E90   82 80 06 46   07 D5 01 F7   82 80 06 D5   01 94 91 3F   ...F...........?
006EA0   11 43 11 31   03 7F 11 6E   07 D5 01 C7   91 D5 01 B6   .C.1...n........
006EB0   91 3F 11 97   07 7A 01 6A   01 D5 01 92   83 37 11 56   .?...z.j.....7.V
006EC0   07 1A 04 D5   01 07 00 6E   07 7A 01 6A   01 07 6D 81   .......n.z.j..m.
006ED0   02 0E 00 46   07 D5 01 8A   82 4E 07 73   02 12 00 D5   ...F.....N.s....
006EE0   01 8A 82 08   06 77 06 4E   07 F8 06 F9   05 46 07 87   .....w.N.....F..
006EF0   6B D5 01 71   82 80 06 80   06 CF 19 F1   6C 46 07 D5   k..q........lF..
006F00   01 66 83 80   06 56 07 D5   01 67 83 80   06 46 07 D5   .f...V...g...F..
006F10   01 7C 83 80   06 6D 6E B7   6E 46 07 D5   01 64 80 80   .|...mn.nF...d..
006F20   06 3F 6E D5   01 3C 00 D5   01 7D 8A 80   06 D5 01 05   .?n..<...}......
006F30   00 D5 01 F6   82 80 06 D5   01 C7 91 3F   11 83 07 4E   ...........?...N
006F40   07 D5 01 C7   91 80 06 D5   01 07 00 D5   01 6B 83 80   .............k..
006F50   06 46 07 D5   01 62 85 80   06 4E 07 D5   01 6A 83 80   .F...b...N...j..
006F60   06 AF 53 D5   01 CC 86 6D   06 1D 6D D5   01 E9 86 D5   ..S....m..m.....
006F70   01 08 00 D5   01 FF 00 6E   07 D5 01 07   00 D5 01 7B   .......n.......{
006F80   83 80 06 D5   01 05 00 D5   01 9B 8A 80   06 46 07 D5   .............F..
006F90   01 9C 8A 80   06 4E 07 D5   01 7F 86 80   06 D5 01 00   .....N..........
006FA0   80 34 0C 83   07 D5 01 4A   80 D5 01 00   00 83 07 BF   .4.....J........
006FB0   6B C9 6C 7A   01 6A 01 46   07 D5 01 70   85 80 06 D5   k.lz.j.F...p....
006FC0   01 00 80 D5   01 77 85 6D   06 D5 01 80   00 D5 01 74   .....w.m.......t
006FD0   85 80 06 46   07 D5 01 75   85 6D 06 46   07 D5 01 79   ...F...u.m.F...y
006FE0   85 80 06 7A   01 6A 01 D5   01 FE 00 D5   01 89 8A 80   ...z.j..........
006FF0   06 46 07 D5   01 9C 8A 80   06 46 07 D5   01 9A 8A 80   .F.......F......
007000   06 D5 01 07   00 D5 01 98   8A 80 06 46   07 D5 01 99   ...........F....
007010   8A 80 06 46   07 D5 01 7D   83 80 06 46   07 D5 01 7E   .......}...F...~
007020   83 80 06 46   07 D5 01 69   87 80 06 46   07 D5 01 89   ...F...i...F....
```

```
007030  81 80 06 5B  6E D5 01 07  00 D5 01 3C  00 31 03 D5   ...[n......<.1..
007040  01 10 85 6D  06 D5 01 12  00 D5 01 3C  00 31 03 D5   ...m.......<.1..
007050  01 12 85 6D  06 46 07 D5  01 37 82 80  06 D5 01 0F   ...m.F...7......
007060  00 D5 01 14  85 80 06 7A  01 6A 01 6C  0C 42 19 48   .......z.j.l.B.H
007070  0C 8D 04 4C  0C C1 04 81  02 04 00 EE  07 6B 3C 46   ...L.........k<F
007080  07 D5 01 59  8A 6D 06 46  07 D5 01 AB  89 6D 06 D5   ...Y.m.F.....m..
007090  01 0A 00 D5  01 59 87 99  15 D5 01 3C  00 D5 01 49   .....Y.....<...I
0070A0  87 7F 15 46  07 D5 01 51  8A 6D 06 46  07 D5 01 7E   ...F...Q.m.F...~
0070B0  8A 80 06 46  07 D5 01 8C  8A 80 06 46  07 D5 01 8B   ...F.......F....
0070C0  8A 80 06 46  07 D5 01 8D  8A 80 06 46  07 D5 01 57   ...F.......F...W
0070D0  8A 80 06 46  07 D5 01 54  8A 6D 06 46  07 D5 01 6F   ...F...T.m.F...o
0070E0  85 80 06 46  07 D5 01 56  8A 80 06 46  07 D5 01 78   ...F...V...F...x
0070F0  8A 80 06 7A  01 6A 01 46  07 D5 01 65  85 80 06 46   ...z.j.F...e...F
007100  07 D5 01 A9  87 80 06 46  07 D5 01 5B  85 80 06 46   .......F...[...F
007110  07 D5 01 57  85 80 06 46  07 D5 01 58  85 80 06 4E   ...W...F...X...N
007120  07 D5 01 59  85 80 06 46  07 D5 01 5A  85 80 06 46   ...Y...F...Z...F
007130  07 D5 01 5D  85 80 06 46  07 D5 01 5E  85 6D 06 46   ...]...F...^.m.F
007140  07 D5 01 64  85 80 06 46  07 D5 01 B9  87 80 06 46   ...d...F.......F
007150  07 D5 01 33  82 80 06 46  07 D5 01 34  82 80 06 46   ...3...F...4...F
007160  07 D5 01 35  82 80 06 46  07 D5 01 36  82 80 06 46   ...5...F...6...F
007170  07 D5 01 5B  82 80 06 46  07 D5 01 27  82 80 06 46   ...[...F...'...F
007180  07 D5 01 2B  82 80 06 46  07 D5 01 2C  82 80 06 D5   ...+...F...,....
007190  01 38 82 D5  01 20 00 83  07 7A 01 6A  01 D5 01 63   .8... ...z.j...c
0071A0  80 77 06 30  05 81 02 08  00 D5 01 64  80 B9 18 D5   .w.0.......d....
0071B0  01 B4 00 D5  01 63 80 80  06 D5 01 66  80 B9 18 D5   .....c.....f....
0071C0  01 74 83 77  06 D5 01 67  80 80 06 D5  01 75 83 77   .t.w...g.....u.w
0071D0  06 D5 01 68  80 D5 01 69  80 63 06 D5  01 69 80 6D   ...h...i.c...i.m
0071E0  06 7A 01 6A  01 E5 6D 46  07 D5 01 DF  86 6D 06 D5   .z.j..mF.....m..
0071F0  01 F9 86 D5  01 D9 88 00  06 38 04 83  07 07 6D 0B   .........8....m.
007200  6C B4 04 9A  04 81 02 08  00 CB 6E 73  02 0C 00 D5   l.........ns....
007210  01 0A 00 D5  01 99 87 99  15 B5 6F 9B  71 79 6D A1   ..........o.qym.
007220  25 D5 01 8A  82 B9 18 BB  53 D5 01 C5  86 80 06 D7   %.......S.......
007230  53 D5 01 8F  81 80 06 46  07 D5 01 9B  81 80 06 46   S......F.......F
007240  07 D5 01 70  80 80 06 46  07 D5 01 71  80 80 06 D5   ...p...F...q....
007250  01 FF 00 D5  01 6F 80 80  06 4E 07 D5  01 77 82 80   .....o...N...w..
007260  06 4E 07 D5  01 DD 91 80  06 46 07 D5  01 C6 82 80   .N.......F......
007270  06 46 07 D5  01 C5 82 80  06 4E 07 D5  01 75 82 80   .F.......N...u..
007280  06 46 07 D5  01 8D 82 80  06 46 07 D5  01 18 83 80   .F.......F......
007290  06 D5 01 09  00 D5 01 69  83 80 06 46  07 D5 01 7E   .......i...F...~
0072A0  82 80 06 46  07 D5 01 78  82 80 06 46  07 D5 01 85   ...F...x...F....
0072B0  82 80 06 46  07 D5 01 3A  83 80 06 46  07 D5 01 80   ...F...:...F....
0072C0  86 80 06 46  07 D5 01 74  83 80 06 46  07 D5 01 75   ...F...t...F...u
0072D0  83 80 06 46  07 D5 01 7F  83 80 06 46  07 D5 01 83   ...F.......F....
0072E0  83 80 06 46  07 D5 01 76  83 6D 06 46  07 D5 01 6C   ...F...v.m.F...l
0072F0  83 80 06 46  07 D5 01 BB  83 80 06 46  07 D5 01 71   ...F.......F...q
007300  83 80 06 4E  07 D5 01 69  85 6D 06 D5  01 0A 00 D5   ...N...i.m......
007310  01 6B 85 6D  06 46 07 D5  01 63 89 80  06 46 07 D5   .k.m.F...c...F..
007320  01 62 89 80  06 46 07 D5  01 68 85 80  06 46 07 D5   .b...F...h...F..
007330  01 68 82 6D  06 46 07 D5  01 86 8A 6D  06 E5 6F 69   .h.m.F.....m..oi
007340  70 F5 70 D5  01 7B 83 77  06 D5 01 79  83 80 06 D5   p.p..{.w...y....
007350  01 C7 91 D5  01 B6 91 3F  11 97 07 D5  01 94 91 3F   .......?.......?
007360  11 43 11 31  03 7F 11 6E  07 89 2A 01  6D 9B 6B C0   .C.1...n..*.m.k.
007370  79 D5 01 63  04 31 03 D5  01 B7 86 6D  06 03 6E 48   y..c.1.....m..nH
007380  19 7A 01 87  56 45 52 53  49 4F 4E 00  00 6A 01 D5   .z..VERSION..j..
007390  01 07 00 7A  01 88 52 45  56 49 53 49  4F 4E 83 73   ...z..REVISION.s
0073A0  6A 01 46 07  7A 01 6A 01  D5 01 76 83  63 06 D5 01   j.F.z.j...v.c...
0073B0  2B 02 C1 04  5F 25 8D 04  F1 5F 8D 04  7A 01 6A 01   +..._%..._..z.j.
0073C0  D5 01 20 92  27 11 83 07  7A 01 6A 01  D5 01 B4 00   .. .'...z.j.....
0073D0  D5 01 63 80  80 06 7D 05  D5 01 20 92  D1 04 81 02   ..c...}... .....
0073E0  0C 00 7D 05  D5 01 5D 80  6D 06 C9 6C  7A 01 6A 01   ..}...].m..lz.j.
```

```
0073F0   D5 01 8F 81   C5 18 B8 7A   8B 55 81 02   04 00 EE 07   .......z.U......
007400   D5 01 6F 83   77 06 D5 01   08 00 8D 04   81 02 04 00   ..o.w...........
007410   95 53 8B 55   81 02 04 00   EE 07 73 02   DA FF 7A 01   .S.U......s...z.
007420   6A 01 8D 05   66 07 D5 01   14 00 46 07   F2 01 5E 74   j...f.....F...^t
007430   D5 01 2F 0C   77 06 D5 01   00 00 32 19   B4 04 D5 01   ../.w.....2.....
007440   6C 80 77 06   4E 07 C1 04   8D 04 81 02   08 00 F3 05   l.w.N...........
007450   46 07 33 02   D5 01 05 00   EE 73 43 02   D4 FF 9D 05   F.3......sC.....
007460   F9 05 81 02   08 00 F3 05   66 07 EE 07   D5 01 6B 80   ........f.....k.
007470   80 06 46 07   D5 01 6C 80   80 06 46 07   7A 01 6A 01   ..F...l...F.z.j.
007480   46 07 66 07   D5 01 1E 00   46 07 F2 01   CA 74 D5 01   F.f.....F....t..
007490   2F 0C 77 06   D5 01 01 00   32 19 81 02   24 00 46 06   /.w.....2...$.F.
0074A0   D5 01 2E 0C   77 06 08 06   D5 01 71 85   77 06 81 02   ....w.....q.w...
0074B0   08 00 D5 01   FF 00 A7 04   20 74 F3 05   46 07 33 02   ........ t..F.3.
0074C0   D5 01 05 00   EE 73 43 02   C6 FF 08 06   81 02 06 00   .....sC.........
0074D0   66 07 65 18   7A 01 6A 01   D5 01 64 00   46 07 F2 01   f.e.z.j...d.F...
0074E0   08 75 D5 01   2E 0C 77 06   F3 05 D5 01   0A 00 EE 73   .u....w........s
0074F0   D5 01 2F 0C   77 06 D5 01   01 00 32 19   B4 04 81 02   ../.w.....2.....
007500   04 00 33 02   43 02 DC FF   7A 01 6A 01   D5 01 7A 85   ..3.C...z.j...z.
007510   D5 01 00 01   83 07 7A 01   6A 01 12 0C   46 07 20 74   ......z.j...F. t
007520   F3 05 20 74   F3 05 20 74   F3 05 7A 01   6A 01 D5 01   .. t.. t..z.j...
007530   75 85 63 06   1B 75 7A 01   6A 01 D5 01   77 85 63 06   u.c..uz.j...w.c.
007540   1B 75 7A 01   6A 01 7E 74   F9 05 CA 09   9A 04 8D 05   .uz.j.~t........
007550   7E 74 8D 05   7E 74 9D 05   9A 04 9D 05   9A 04 81 02   ~t..~t..........
007560   0A 00 F3 05   66 07 73 02   08 00 F9 05   1F 0C 46 07   ....f.s.......F.
007570   7A 01 6A 01   44 75 81 02   0C 00 46 06   D6 74 66 07   z.j.Du....F..tf.
007580   73 02 08 00   F9 05 6D 06   46 07 7A 01   6A 01 D5 01   s.....m.F.z.j...
007590   75 85 72 75   7A 01 6A 01   D5 01 FF 00   1F 07 2F 06   u.ruz.j......./.
0075A0   D5 01 74 85   80 06 D5 01   77 85 6D 06   46 07 D5 01   ..t.....w.m.F...
0075B0   79 85 80 06   0A 75 D5 01   7A 85 F9 05   97 07 D5 01   y....u..z.......
0075C0   7A 85 77 06   D5 01 7E 86   80 06 46 07   D5 01 7D 86   z.w...~...F...}.
0075D0   80 06 7A 01   6A 01 44 75   81 02 0A 00   F3 05 D6 74   ..z.j.Du.......t
0075E0   73 02 0E 00   7E 74 81 02   06 00 F3 05   EE 07 96 75   s...~t.........u
0075F0   7A 01 6A 01   3C 79 D5 01   10 8A D5 01   80 00 96 75   z.j.<y.........u
007600   7A 01 6A 01   D5 01 7E 86   77 06 D5 01   7D 86 77 06   z.j...~.w...}.w.
007610   20 74 81 02   06 00 F3 05   EE 07 20 74   F3 05 7A 01    t........ t..z.
007620   6A 01 D5 01   79 85 77 06   08 06 D5 01   77 85 63 06   j...y.w.....w.c.
007630   30 04 77 06   7A 01 6A 01   D5 01 79 85   08 06 77 06   0.w.z.j...y...w.
007640   42 04 D5 01   FF 00 8D 04   D5 01 74 85   77 06 4E 07   B.........t.w.N.
007650   F8 06 F0 09   B1 18 7A 01   6A 01 D5 01   74 85 77 06   ......z.j...t.w.
007660   46 07 1D 02   9A 76 36 76   20 76 F9 05   2F 06 D5 01   F....v6v v../...
007670   7A 85 30 04   2F 06 77 06   C1 04 81 02   0A 00 46 06   z.0./.w.......F.
007680   46 06 73 02   12 00 80 06   D5 01 7D 86   80 06 D5 01   F.s.......}.....
007690   7E 86 80 06   33 02 43 02   CE FF 7A 01   6A 01 D5 01   ~...3.C...z.j...
0076A0   77 85 63 06   D5 01 7A 85   D5 01 74 85   77 06 97 07   w.c...z...t.w...
0076B0   D5 01 7A 85   D5 01 74 85   77 06 00 06   30 04 F9 05   ..z...t.w...0...
0076C0   F2 01 D4 76   B9 05 77 06   20 74 81 02   04 00 33 02   ...v..w. t....3.
0076D0   43 02 F2 FF   7A 01 6A 01   58 76 02 76   7A 01 6A 01   C...z.j.Xv.vz.j.
0076E0   2C 75 D5 01   75 85 63 06   77 06 20 74   F3 05 7A 01   ,u..u.c.w. t..z.
0076F0   6A 01 8C 75   81 02 04 00   EE 07 D5 01   75 85 63 06   j..u........u.c.
007700   77 06 20 74   F3 05 7A 01   6A 01 D5 01   75 85 08 06   w. t..z.j...u...
007710   63 06 42 04   08 06 1B 06   6D 06 2C 75   77 06 20 74   c.B.....m.,uw. t
007720   F3 05 7A 01   6A 01 4E 07   D5 01 71 85   80 06 7E 74   ..z.j.N...q...~t
007730   46 07 D5 01   71 85 80 06   7A 01 6A 01   44 75 81 02   F...q...z.j.Du..
007740   06 00 F3 05   EE 07 7E 74   81 02 06 00   46 06 EE 07   ......~t....F...
007750   44 75 81 02   06 00 DB 18   EE 07 1B 06   00 06 B2 09   Du..............
007760   81 02 08 00   46 06 73 02   04 00 80 06   7A 01 6A 01   ....F.s.....z.j.
007770   44 75 81 02   06 00 F3 05   EE 07 44 75   81 02 06 00   Du........Du....
007780   46 06 EE 07   44 75 81 02   06 00 DB 18   EE 07 1B 06   F...Du..........
007790   00 06 B2 09   81 02 08 00   46 06 73 02   04 00 6D 06   ........F.s...m.
0077A0   7A 01 6A 01   D5 01 7C 86   77 06 D5 01   00 80 D5 01   z.j...|.w.......
```

| Address | Hex bytes | | | | | | | | | | | | ASCII |
|---|---|---|---|---|---|---|---|---|---|---|---|---|---|
| 0077B0 | 20 | 92 | D5 | 01 | 75 | 85 | 63 | 06 | 2F | 06 | 42 | 04 | E8 04 B4 04 | ...u.c./.B..... |
| 0077C0 | 81 | 02 | 10 | 00 | F3 | 05 | D5 | 01 | 00 | 80 | 08 | 06 | D5 01 75 85 | ..............u. |
| 0077D0 | 6D | 06 | F2 | 01 | EC | 77 | 00 | 06 | B9 | 05 | 77 | 06 | C1 04 81 02 | m....w....w..... |
| 0077E0 | 08 | 00 | F3 | 05 | B9 | 05 | 33 | 02 | 43 | 02 | EC | FF | 51 04 D5 01 | ......3.C...Q... |
| 0077F0 | 75 | 85 | 6D | 06 | F3 | 05 | 08 | 77 | 7A | 01 | 6A | 01 | 7E 74 81 02 | u.m....wz.j.~t.. |
| 007800 | 06 | 00 | F3 | 05 | EE | 07 | D5 | 01 | 7C | 86 | 80 | 06 | A2 77 7A 01 | ........|....wz. |
| 007810 | 6A | 01 | 0F | 06 | 30 | 05 | 81 | 02 | 04 | 00 | EE | 07 | D5 01 1D 00 | j...0........... |
| 007820 | 8E | 02 | 08 | 00 | D6 | 76 | 73 | 02 | BC | 00 | D5 | 01 | 1A 00 8E 02 | .....vs......... |
| 007830 | 08 | 00 | 08 | 77 | 73 | 02 | AE | 00 | D5 | 01 | 1C | 00 | 8E 02 08 00 | ...ws........... |
| 007840 | DE | 76 | 73 | 02 | A0 | 00 | D5 | 01 | 12 | C0 | 8E | 02 | 08 00 F0 76 | .vs............v |
| 007850 | 73 | 02 | 92 | 00 | D5 | 01 | 1F | 00 | 8E | 02 | 08 | 00 | 9C 76 73 02 | s............vs. |
| 007860 | 84 | 00 | D5 | 01 | 19 | 00 | 8E | 02 | 08 | C0 | D4 | 75 | 73 02 76 00 | ...........us.v. |
| 007870 | D5 | 01 | 11 | 00 | 8E | 02 | 08 | 00 | 3A | 77 | 73 | 02 | 68 00 D5 01 | ........:ws.h... |
| 007880 | 21 | 00 | 8E | 02 | 08 | 00 | 6E | 77 | 73 | 02 | 5A | 00 | D5 01 20 00 | !.....nws.Z..... |
| 007890 | 8E | 02 | 08 | 00 | F2 | 75 | 73 | 02 | 4C | 00 | D5 | 01 | 1E 00 8E 02 | .....us.L....... |
| 0078A0 | 08 | 00 | 38 | 75 | 73 | 02 | 3E | 00 | D5 | 01 | 1B | 00 | 8E 02 08 00 | ..8us.>......... |
| 0078B0 | 2C | 75 | 73 | 02 | 30 | 00 | D5 | 01 | 99 | 00 | 8E | 02 | 08 00 D6 74 | ,us.0..........t |
| 0078C0 | 73 | 02 | 22 | 00 | D5 | 01 | 22 | 00 | 8E | 02 | 08 | 00 | FA 77 73 02 | s."..."......ws. |
| 0078D0 | 14 | 00 | D5 | 01 | 23 | 00 | 8E | 02 | 08 | 00 | A2 | 77 | 73 02 06 00 | ....#....ws.... |
| 0078E0 | D6 | 74 | F3 | 05 | 7A | 01 | 6A | 01 | 24 | 77 | 81 | 02 | 06 00 F3 05 | .t..z.j.$w...... |
| 0078F0 | EE | 07 | 10 | 78 | 7A | 01 | 6A | 01 | D5 | 01 | 10 | 8A | D5 01 77 85 | ...xz.j.......w. |
| 007900 | 63 | 06 | B2 | 09 | 81 | 02 | 04 | 00 | EE | 07 | D5 | 01 | 50 8A 08 06 | c...........P... |
| 007910 | 77 | 06 | 42 | 04 | ED | 35 | 42 | 04 | F0 | 09 | 08 | 06 | 1B 06 80 06 | w.B..5B......... |
| 007920 | 08 | 06 | 7B | 39 | 81 | 02 | 12 | 00 | D5 | 01 | 7E | 86 | 80 06 D5 01 | ..{9......~..... |
| 007930 | 7D | 86 | 80 | 06 | 73 | 02 | 04 | 00 | 46 | 06 | 7A | 01 | 6A 01 D6 74 | }...s...F.z.j..t |
| 007940 | ED | 35 | 42 | 04 | 46 | 07 | F2 | 01 | 70 | 79 | B9 | 05 | 7B 39 CB 18 | .5B.F...py..{9.. |
| 007950 | B4 | 04 | D5 | 01 | 2F | 0C | 77 | 06 | D5 | 01 | 01 | 00 | 32 19 9A 04 | ..../.w.....2... |
| 007960 | 81 | 02 | 04 | 00 | 33 | 02 | D5 | 01 | 05 | 00 | EE | 73 | 43 02 DC FF | ....3......sC... |
| 007970 | 7A | 01 | 6A | 01 | D5 | 01 | 2F | 0C | 77 | 06 | D5 | 01 | 01 00 32 19 | z.j.../.w.....2. |
| 007980 | 81 | 02 | 06 | 00 | E6 | 78 | F6 | 78 | 7A | 01 | 6A | 01 | F1 51 D5 01 | .....x.xz.j..Q.. |
| 007990 | 70 | 85 | 08 | 06 | 77 | 06 | 81 | 02 | 0A | 00 | F3 | 05 | EE 07 73 02 | p...w.........s. |
| 0079A0 | 06 | 00 | 4E | 07 | B1 | 18 | D5 | 01 | 72 | 79 | 46 | 07 | D5 01 16 00 | ..N.....ryF..... |
| 0079B0 | C1 | 17 | 46 | 07 | D5 | 01 | 70 | 85 | 80 | 06 | 7A | 01 | 40 01 03 12 | ..F...p...z.@... |
| 0079C0 | 6A | 01 | D5 | 01 | 30 | 00 | 8D | 05 | 46 | 07 | AD | 05 | 5E 07 30 04 | j...0...F...^.0. |
| 0079D0 | 77 | 06 | D5 | 01 | 30 | 00 | 38 | 04 | D5 | 01 | E8 | 03 | 31 03 30 04 | w...0.8.....1.0. |
| 0079E0 | AD | 05 | D5 | 01 | 04 | 00 | 30 | 04 | 77 | 06 | D5 | 01 | 30 00 38 04 | ......0.w...0.8. |
| 0079F0 | D5 | 01 | 64 | 00 | 31 | 03 | 30 | 04 | AD | 05 | D5 | 01 | 05 00 30 04 | ..d.1.0.......0. |
| 007A00 | 77 | 06 | D5 | 01 | 30 | 00 | 38 | 04 | D5 | 01 | 0A | 00 | 31 03 30 04 | w...0.8.....1.0. |
| 007A10 | 9D | 05 | D5 | 01 | 06 | 00 | 30 | 04 | 77 | 06 | D5 | 01 | 30 00 38 04 | ......0.w...0.8. |
| 007A20 | 30 | 04 | 08 | 06 | D5 | 01 | 66 | 85 | 6D | 06 | 7A | 01 | 6A 01 D5 01 | 0.....f.m.z.j... |
| 007A30 | 6F | 83 | 77 | 06 | 8D | 05 | AD | 05 | 4E | 07 | 8D | 04 | 81 02 06 00 | o.w.....N....... |
| 007A40 | 8A | 79 | 65 | 2A | AD | 05 | 56 | 07 | 8D | 04 | 81 | 02 | 06 00 8A 79 | .ye*..V........y |
| 007A50 | D9 | 35 | AD | 05 | D5 | 01 | 04 | 00 | 8D | 04 | 81 | 02 | 06 00 8A 79 | .5.............y |
| 007A60 | 77 | 6B | AD | 05 | D5 | 01 | 08 | 00 | 8D | 04 | 81 | 02 | 06 00 8A 79 | wk.............y |
| 007A70 | 95 | 53 | AD | 05 | D5 | 01 | 10 | 00 | 8D | 04 | 81 | 02 | 06 00 8A 79 | .S.............y |
| 007A80 | 1B | 45 | AD | 05 | D5 | 01 | 20 | 00 | 8D | 04 | 81 | 02 | 06 00 8A 79 | .E.............y |
| 007A90 | ED | 4C | 9D | 05 | D5 | 01 | 80 | 00 | 8D | 04 | 81 | 02 | 1A 00 8A 79 | .L.............y |
| 007AA0 | D5 | 01 | 6F | 82 | 63 | 06 | 0F | 06 | 81 | 02 | 0C | 00 | E3 05 46 07 | ..o.c.........F. |
| 007AB0 | D5 | 01 | 6F | 82 | 6D | 06 | 7A | 01 | 6A | 01 | 71 | 17 | 8A 79 D5 01 | ..o.m.z.j.q..y.. |
| 007AC0 | 01 | 00 | 42 | 19 | 08 | 06 | D5 | 01 | B6 | 89 | 80 | 06 | 48 0C 8D 04 | ..B.........H... |
| 007AD0 | D5 | 01 | 83 | 82 | 80 | 06 | CA | 73 | 7A | 01 | 6A | 01 | BE 73 D5 01 | .......sz.j..s.. |
| 007AE0 | 55 | 80 | 77 | 06 | 65 | 18 | 11 | 55 | D5 | 01 | FA | 00 | 39 18 FF 54 | U.w.e..U....9..T |
| 007AF0 | D5 | 01 | FA | 00 | 39 | 18 | F1 | 1A | D5 | 01 | 14 | 00 | D5 01 A9 87 | ....9........... |
| 007B00 | 7F | 15 | 11 | 37 | 27 | 52 | D5 | 01 | 3F | 00 | D5 | 01 | 6F 83 80 06 | ...7'R..?...o... |
| 007B10 | 2C | 7A | B8 | 7A | 73 | 02 | FA | FF | 7A | 01 | 6A | 01 | E3 71 D5 01 | ,z.zs...z.j..q.. |
| 007B20 | EE | 00 | D5 | 01 | 5C | 80 | 80 | 06 | C0 | 79 | F3 | 05 | DA 7A 7A 01 | ....\....y...zz. |

APPENDIX II

| | |
|---|---|
| 020 | Air Conditioner |
| 021 | |
| 022 | All Lights |
| 023 | And |
| 024 | Appliance |
| 025 | Arm |
| 026 | Basement |
| 027 | |
| 028 | Bathroom |
| 029 | |
| 030 | Bedroom |
| 031 | |
| 032 | Boy's Room |
| 033 | |
| 034 | Breakfast Room |
| 035 | |
| 036 | CD Player |
| 037 | |
| 038 | Ceiling |
| 039 | |
| 040 | Central |
| 041 | |
| 042 | Children's |
| 043 | |
| 044 | Clothes Dryer |
| 045 | |
| 046 | Coffee Maker |
| 047 | |
| 048 | Deck |
| 049 | |
| 050 | Decorative |
| 051 | |
| 052 | Den |
| 053 | |
| 054 | Dining Room |
| 055 | Disarm |
| 056 | Dish Washer |
| 057 | |
| 058 | Disposal |
| 059 | |
| 060 | Dock |
| 061 | Door |
| 062 | Downstairs |
| 063 | |
| 064 | Dryer |
| 065 | |
| 066 | East |
| 067 | |
| 068 | Eighth |
| 069 | |
| 070 | Electric Heater |
| 071 | |

| | |
|---|---|
| 072 | Electric Stove |
| 073 | |
| 074 | Entrance |
| 075 | |
| 076 | Entry |
| 077 | |
| 078 | Family Room |
| 079 | Fan |
| 080 | Fifth |
| 081 | |
| 082 | Fireplace |
| 083 | |
| 084 | First |
| 085 | Flood Lights |
| 086 | Floor |
| 087 | |
| 088 | Fourth |
| 089 | |
| 090 | Foyer |
| 091 | |
| 092 | Front |
| 093 | |
| 094 | Furnace |
| 095 | |
| 096 | Garage |
| 097 | |
| 098 | Gas |
| 099 | |
| 100 | Girl's Room |
| 101 | |
| 102 | Guest |
| 103 | |
| 104 | Guest House |
| 105 | |
| 106 | Guest Room |
| 107 | |
| 198 | Hall |
| 109 | |
| 110 | HVAC |
| 111 | |
| 112 | Heater |
| 113 | |
| 114 | House |
| 115 | |
| 116 | Inside |
| 117 | |
| 118 | Kitchen |
| 119 | |
| 120 | Lamps |
| 121 | |
| 122 | Laundry Lights |
| 123 | |

| | |
|---|---|
| 124 | Lights |
| 125 | |
| 126 | Living Room |
| 127 | |
| 128 | Maid's Room |
| 129 | Malibu Lights |
| 130 | Master Bedroom |
| 131 | |
| 132 | Nanny's Room |
| 133 | |
| 134 | Ninth |
| 135 | |
| 136 | North |
| 137 | |
| 138 | Number one |
| 139 | |
| 140 | Number two |
| 141 | |
| 142 | Nursery |
| 143 | |
| 144 | Oil |
| 145 | |
| 146 | Outside |
| 147 | |
| 148 | Patio |
| 149 | |
| 150 | Play Room |
| 151 | |
| 152 | Pool |
| 153 | |
| 154 | Porch |
| 155 | |
| 156 | Powder Room |
| 157 | |
| 158 | Pump |
| 159 | |
| 160 | Quarters |
| 161 | |
| 162 | Rear |
| 163 | |
| 164 | Record Player |
| 165 | |
| 166 | Room |
| 167 | |
| 168 | Sconces |
| 169 | |
| 170 | Second |
| 171 | |
| 172 | Servant's |
| 173 | Security |
| 174 | Seventh |
| 175 | |

| | |
|---|---|
| 176 | Side |
| 177 | |
| 178 | Sixth |
| 179 | |
| 180 | South |
| 181 | |
| 182 | Stairway |
| 183 | |
| 184 | Stereo FM |
| 185 | System |
| 186 | Tape Player |
| 187 | |
| 188 | Tenth |
| 189 | |
| 190 | Third |
| 191 | |
| 192 | Toaster |
| 193 | |
| 194 | TV |
| 195 | |
| 196 | Upstairs |
| 197 | |
| 198 | VCR |
| 199 | |
| 200 | Washing Machine |
| 201 | |
| 202 | Water Heater |
| 203 | |
| 204 | West |
| 205 | Window |
| 206 | Window Air Conditioner |
| 207 | |
| 208 | Whole House |
| 209 | |
| 210 | |
| 211 | |
| 212 | |
| 213 | |
| 214 | |
| 215 | |
| 216 | |
| 217 | |
| 218 | |
| 219 | |
| 220 | |
| 221 | |
| 222 | |
| 223 | |
| 224 | |
| 225 | |
| 226 | |
| 227 | |

228
229
230
231
232
233
234
235
236
237
238
239
240
241
242
243
244
245
246
247
248
249
250
251
252
253
254
255
256
267
258
259
260
262
262
263
264
265
266
267
268
269
270
271
272
273
274
275
276
277 Weekdays
278 Weekends and Holidays
279 Sundays

| | |
|---|---|
| 280 | Mondays |
| 281 | Tuesdays |
| 282 | Wednesdays |
| 283 | Thursdays |
| 284 | Fridays |
| 285 | Saturdays |
| 286 | Holidays |
| 287 | Every day |
| 288 | On Weekends |
| 289 | On Weekends and Holidays |
| 290 | On Sundays |
| 291 | On Mondays |
| 292 | On Tuesdays |
| 293 | On Wednesdays |
| 294 | On Thursdays |
| 295 | On Fridays |
| 296 | On Saturdays |
| 297 | On Holidays |
| 298 | Every day |
| 299 | |
| 300 | Zero |
| 301 | One |
| 302 | Two |
| 303 | Three |
| 304 | Four |
| 305 | Five |
| 306 | Six |
| 307 | Seven |
| 308 | Eight |
| 309 | Nine |
| 310 | Ten |
| 311 | Eleven |
| 312 | Twelve |
| 313 | Thirteen |
| 314 | Fourteen |
| 315 | Fifteen |
| 316 | Sixteen |
| 317 | Seventeen |
| 318 | Eighteen |
| 319 | Nineteen |
| 320 | Twenty |
| 321 | |
| 322 | |
| 323 | |
| 324 | |
| 325 | Twenty-five |
| 326 | |
| 327 | |
| 328 | |
| 329 | |
| 330 | Thirty |
| 331 | |

| | |
|---|---|
| 332 | |
| 333 | |
| 334 | |
| 335 | Thirty-five |
| 336 | |
| 337 | |
| 338 | |
| 339 | |
| 340 | Forty |
| 341 | |
| 342 | |
| 343 | |
| 344 | |
| 345 | Forty-five |
| 346 | |
| 347 | |
| 348 | |
| 349 | |
| 350 | Fifty |
| 351 | |
| 352 | |
| 353 | |
| 354 | |
| 355 | Fifty-five |
| 356 | |
| 357 | |
| 358 | |
| 359 | |
| 360 | Sixty |
| 361 | |
| 362 | |
| 363 | |
| 364 | |
| 365 | |
| 366 | |
| 367 | |
| 368 | |
| 369 | |
| 370 | Seventy |
| 371 | |
| 372 | |
| 373 | |
| 374 | |
| 375 | |
| 376 | |
| 377 | |
| 387 | |
| 379 | |
| 380 | Eighty |
| 381 | |
| 382 | |
| 383 | |

| | |
|---|---|
| 384 | |
| 385 | |
| 386 | |
| 387 | |
| 388 | |
| 389 | |
| 390 | Ninety |
| 391 | |
| 392 | |
| 393 | Hours |
| 394 | Minutes |
| 395 | Degree Fahrenhiet |
| 396 | When at HOME |
| 397 | When ASLEEP |
| 398 | When AWAY |
| 399 | This choice is not yet available. Please make another selection. |
| 400 | Hundred |
| 401 | Hundred and |
| 402 | Index Number |
| 403 | Is |
| 404 | And |
| 405 | Your |
| 406 | |
| 407 | |
| 408 | |
| 409 | |
| 410 | |
| 411 | |
| 412 | |
| 413 | |
| 414 | |
| 415 | Your Personal Identification Number is now |
| 416 | Your new Personal Identification Number must have exactly four digits. Please etr this four digit number now or press * to return to Help Menu. |
| 417 | Remember these two buttons: The star (*) button to back up, the operator button for help. The operator button is used to get the system help menu. The operator button can be used at any time a menu is being offered. The star (*) button is used to back up to the menu before the current menu. The star (*) button is also used to cancel or back out of a number being entered. Some helpful pointers: You do not have to wait for a message to complete before entering a response. If you know what your response will be, you may enter it at any time. You may hang up at any time. It is suggested that you explore some menu choices. Use the star (*) button. Become familiar with the system. |
| 418 | To talk to a TESS representative, call 1-800-654-7897.......1-800-654-7897 |
| 419 | |
| 420 | |

421 HELLO. This is the TESS Command Center. Please enter your home area code a n d telephone number.
422 You have entered an incorrect area code and telephone number. Please re- enter.
423 Thank you. Please enter your Personal Identification Number.
424 You have entered an incorrect Identification Number. Please re-enter.
425 Please choose a category:
For HEATING and AIR CONDITIONING, press 1
For WATER HEATING, press 2
For LIGHTS THAT YOU ONLY TURN ON OR OFF, press 3
For LIGHTS THAT YOU DIM, press 4
For APPLIANCES, press 5
For UNUSED X-10 DEVICES, press 6
426 Thank you. You are now at the Main Menu.
427 The following Help Menu will always be given first if your PIN Number is still 1111.
428 TESS Help Menu follows:
To review how this Menu system works, press 1
To change your Personal Identification Number, press 2
To talk to a TESS representative, press 3
To hang up, press 4
To return to the Main Menu, press 5
To return to the last menu, press star (*)
429
430 Star (*)
431 OFF
432 To ON at MEDIUM BRIGHTNESS
433 To ON at LOW BRIGHTNESS
434 In the HOME mode
435 In the OFF mode
436 In the AWAY mode
437 In the SLEEP mode
438 To ON at Full Brightness
439 Your requested action is now being communicated to your Home Controller.
440 Hours and
441 Hour and
442 Minutes
443 Minute
444 To put
445 To normal schedule
446 To return
447 To assign
448 Schedule Number
449 Press 1
To perform this action at a later time and \or date, press 2
To choosee a different action for this device, press 3
450 X-10
451 For
452 For more choices, press 9

| | |
|---|---|
| 453 | There are no devices in this category being controlled. |
| 454 | Device choices |
| 455 | Device selected is |
| 456 | |
| 457 | Switch channel |
| 458 | |
| 459 | |
| 460 | Action choices follow |
| 461 | To return to normal schedule, press 5<br>For more action choices, press 6 |
| 462 | To change to the OFF mode, press 1<br>To change to the HOME mode, press 2<br>To change to AWAY mode, press 3<br>To change to the SLEEP mode, press 4 |
| 463 | To turn OFF, press 1<br>To turn ON, press 2 |
| 464 | Additional |
| 465 | To review an assigned schedule, press 1<br>To assign an Energy Guide schedule, press 2<br>To change the name for this device, press 3 |
| 466 | To change the temperature setpoint, press 4 |
| 467 | To make your own schedule, press 4 |
| 468 | To turn OFF, press 1<br>To turn ON at MEDIUM BRIGHTNESS, press 3<br>To turn ON at LOW BRIGHTNESS, press 4 |
| 469 | To set to LOW BRIGHTNESS, press 1<br>To set to MEDIUM BRIGHTNESS, press 2<br>To set to FULL BRIGHTNESS, press 3 |
| 470 | |
| 471 | |
| 472 | Then you schedule |
| 473 | Schedules to be assigned are as follows:<br>You scheduled_____ |
| 474 | _____ was the schedule number entered. However, this schedule is not presently available. |
| 475 | |
| 476 | Please enter desired schedule number for _____ |
| 477 | |
| 478 | If you want the same schedule for every day of the week, including holidays, press 1<br>If you want the same schedule for each day of the week and a different schedule for weekends (Saturdays, Sundays, and Holidays), press 2<br>If you want a different schedule for certain days, press 3 |
| 479 | To make this asssignment now |
| 480 | Up to three voice phrase numbers may be used to describe this device. Please etr the first phrase number. |
| 481 | Please enter the second phrase number or pound sign if no phrase. |
| 482 | Please enter the third phrase number or pound sign if no phrase. |

| | |
|---|---|
| 483 | The current device is named |
| 484 | To change the device name, press 1 |
| | To change the device category, press 2 |
| 485 | The category of this device cannot be changed |
| 486 | |
| 487 | |
| 488 | |
| 489 | For YES, press 1 |
| | For NO, press 3 |
| 490 | Please enter the override duration in hours and minutes. |
| | First enter the number of hours |
| 491 | Now please enter the number of minutes |
| 492 | No shedule assigned |
| 493 | ON all day |
| 494 | OFF all day |
| 495 | |
| 496 | |
| 497 | |
| 498 | |
| 499 | |
| 500 | Press 0 |
| 501 | Press 1 |
| 502 | Press 2 |
| 503 | Press 3 |
| 504 | Press 4 |
| 505 | Press 5 |
| 506 | Press 6 |
| 507 | Press 7 |
| 508 | |
| 509 | |
| 510 | Please enter the index Number |

121

What is claimed is:

1. A utility commodity load reduction system comprising:
   a plurality of controller means, each located within a different one of a plurality of facilities, for controlling the operation of various utility commodity consuming devices within said one facility;
   central command means for providing general commands to each of said controllers, each controller responding to said general command by controlling the operation of those devices within the facility in which that controller is located; and
   utility command means fbor causing selected utility commands to be provided to selected ones of said controllers for causing selected ones of the devices being controlled by said selected controllers to operate in a manner consuming less of said utility commodity.

2. The system according to claim 1 wherein said utility commodity is an energy commodity.

3. The system according to claim 1 wherein said controller may be addressed individually or globally by said central command means and regionally by said utility command means.

4. The system according to claim 1, wherein:
   one of said devices being controlled by a controller in each facility is a heating/cooling unit; and
   said utility command means causes each controller receiving a utility command to control said heating/cooling device so as to heat only to a first temperature and to cool only to a second temperature.

5. The system according to claim 4 wherein said utility commodity is an energy commodity.

6. The system according to claim 5 wherein said first and second temperatures are less energy consuming than would normally be considered ideally comfortable within a facility.

7. The system according to claim 4, wherein:
   each controller means controlling a heating/cooling unit is programmed with a heating and a cooling set-point temperature, said heating set-point temperature being a user selected temperature used to determine the temperature of said facility below which heating is to occur and said cooling set-point temperature being a user selected temperature used to determine the temperature of said facility above which cooling is to occur;
   said utility message contains a first set-point temperature manifesting a temperature for heating and a second set-point temperature manifesting a temperature for cooling; and
   the receipt of the utility command by each controller controlling a heating/cooling unit results in said first and second temperatures being used determine the temperature of said facility in place of the programmed heating set-point temperature and cooling set-point temperature.

8. The system according to claim 1 wherein said selective devices including heating/cooling means.

9. The system according to claim 1 wherein said selective devices including heating/cooling means and water heating means.

10. The system according to claim 1 wherein said selective devices exclude lights and household appliances.

122

11. The system according to claim 1 wherein each of said controllers is addressable by an address code in contained in said general commands, one of said general commands addressing each controller and causing a multi-digit utility recognition code to be stored therein, said utility command containing a code addressing each of said controllers by the stored utility recognition code, said utility command including wildcard digits to permit said utility command to address a plurality of said controllers.

12. A system for reducing usage energy in participating facilities containing a heating/cooling unit in response to commands from a utility comprising:
   a controller in each participating facility for storing certain designated heating and cooling set-point temperatures used in controlling the temperature at which said heating/cooling device heats and cools said facility;
   said controller responding to commands provided thereto over a common communications link to effect the control of said heating cooling unit; and
   a utility central control center for providing utility commands over said link for causing said controller to lower the heating set-point temperature and to raise the cooling set-point temperature.

13. The system according to claim 12 wherein said utility command designates a period of time during which said controller is to lower the heating set-point temperature and to raise the cooling set-point temperature.

14. The system according to claim 12 wherein each controller further stores a multi-digit utility recognition code, said utility command addressing each controller which is to lower the heating set-point temperature and to raise the cooling set-point temperature by its recognition code.

15. The system according to claim 14 wherein said utility command includes wildcard digits which address any corresponding digit of the recognition code stored in a controller, whereby a single utility command may globally enable a plurality of controllers to lower the heating set-point temperature and to raise the cooling set-point temperature.

16. The system according to claim 15 wherein said utility command designates a period of time during which said controller is to lower the heating set-point temperature and to raise the cooling set-point temperature.

17. The system according to claim 12 wherein each facility further includes other energy consuming devices each coupled to said controller, which manages the energy usage of said other devices by controlling the periods of time during which said other devices are permitted to operate, said utility command further causing controller to disable said other devices from operating during designated portions of a defined time cycle following the provision of said utility command.

18. A method of energy consumption reduction over a wide area by reducing the energy consumption of selective energy consuming units within participating facilities, said method comprising the steps of:
   coupling each energy consuming unit to a common controller for a facility;
   operating said controller in a manner which enables each device coupled thereto to operate in accordance with a schedule programmed in said controller;

communicating general commands from a central station to said controller to selectively program said schedule pursuant to the needs of the facility; and communicating a utility command from a utility company to said controller to cause said controller to selectively disable a subset of said devices for periods of time regardless of the prior communications or subsequent communications from said central station during a defined period of time following said utility command, wherein said step of communicating from said utility company includes disabling said subset of devices for portions of said defined Deriod of time.

19. The method according to claim 18 wherein said step of communicating from said utility company includes disabling and thereafter permitting operation of said subset of devices during alternating portions of said defined period of time.

* * * * *